(12) United States Patent
Schnittman et al.

(10) Patent No.: US 9,480,381 B2
(45) Date of Patent: *Nov. 1, 2016

(54) COMPACT AUTONOMOUS COVERAGE ROBOT

(71) Applicant: iRobot Corporation, Bedford, MA (US)

(72) Inventors: Mark Steven Schnittman, Somerville, MA (US); Zivthan A. Dubrovsky, Waltham, MA (US); Jeffrey W. Mammen, Westford, MA (US); Aaron Solochek, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,293

(22) Filed: Aug. 11, 2014

(65) Prior Publication Data

US 2015/0020326 A1 Jan. 22, 2015

Related U.S. Application Data

(63) Continuation of application No. 13/719,784, filed on Dec. 19, 2012, now Pat. No. 8,839,477, which is a continuation of application No. 13/245,118, filed on Sep. 26, 2011, now Pat. No. 8,370,985, which is a (Continued)

(51) Int. Cl.
*A47L 11/24* (2006.01)
*A47L 11/40* (2006.01)
(Continued)

(52) U.S. Cl.
CPC .............. *A47L 11/4041* (2013.01); *A47L 9/00* (2013.01); *A47L 9/0477* (2013.01); *A47L 9/0488* (2013.01);

(Continued)

(58) Field of Classification Search
CPC .......... A47L 11/4061; A47L 11/4011; A47L 9/0488; A47L 9/0477; A47L 11/408
USPC ............... 15/41.1, 52.1, 319, 340.4, 23, 258
See application file for complete search history.

(56) References Cited

U.S. PATENT DOCUMENTS 1,755,054 A   4/1930   Darst
1,780,221 A   11/1930  Buchmann (Continued)

FOREIGN PATENT DOCUMENTS

AU    2003275566      6/2004
DE       2128842 C3   12/1980

(Continued)

OTHER PUBLICATIONS

Barker, "Navigation by the Stars—Ben Barker 4th Year Project," Nov. 2004, 20 pages.

(Continued)

*Primary Examiner* — Michael Jennings
(74) *Attorney, Agent, or Firm* — Fish & Richardson P.C.

(57) ABSTRACT

An autonomous coverage robot includes a chassis having forward and rearward portions and a drive system carried by the chassis. The forward portion of the chassis defines a substantially rectangular shape. The robot includes a cleaning assembly mounted on the forward portion of the chassis and a bin disposed adjacent the cleaning assembly and configured to receive debris agitated by the cleaning assembly. A bin cover is pivotally attached to a lower portion of the chassis and configured to rotate between a first, closed position providing closure of an opening defined by the bin and a second, open position providing access to the bin opening. The robot includes a body attached to the chassis and a handle disposed on an upper portion of the body. A bin cover release is actuatable from substantially near the handle.

18 Claims, 30 Drawing Sheets

Related U.S. Application Data continuation of application No. 12/118,117, filed on May 9, 2008, now Pat. No. 8,239,992.

(60) Provisional application No. 60/938,699, filed on May 17, 2007, provisional application No. 60/917,065, filed on May 9, 2007.

(51) Int. Cl.
| | |
|---|---|
| A47L 11/34 | (2006.01) |
| A47L 9/04 | (2006.01) |
| A47L 9/00 | (2006.01) |
| A47L 9/28 | (2006.01) |
| B60L 11/18 | (2006.01) |
| B60L 15/20 | (2006.01) |
| G05D 1/02 | (2006.01) |

(52) U.S. Cl.
CPC ............ *A47L 9/2805* (2013.01); *A47L 11/34* (2013.01); *A47L 11/408* (2013.01); *A47L 11/4011* (2013.01); *A47L 11/4061* (2013.01); *A47L 11/4066* (2013.01); *B60L 11/1805* (2013.01); *B60L 11/1816* (2013.01); *B60L 11/1861* (2013.01); *B60L 15/2036* (2013.01); *G05D 1/0227* (2013.01); *G05D 1/0242* (2013.01); *A47L 2201/00* (2013.01); *A47L 2201/04* (2013.01); *B60L 2200/40* (2013.01); *B60L 2220/44* (2013.01); *B60L 2240/12* (2013.01); *B60L 2240/421* (2013.01); *B60L 2240/423* (2013.01); *B60L 2250/16* (2013.01); *B60L 2260/32* (2013.01); *B60L 2270/145* (2013.01); *G05D 1/0225* (2013.01); *G05D 1/0255* (2013.01); *G05D 2201/0215* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/72* (2013.01); *Y02T 10/7275* (2013.01); *Y02T 90/14* (2013.01); *Y02T 90/16* (2013.01)

(56) References Cited

U.S. PATENT DOCUMENTS

| | | | |
|---|---|---|---|
| 1,970,302 | A | 8/1934 | Gerhardt |
| 2,136,324 | A | 11/1938 | John |
| 2,302,111 | A | 11/1942 | Dow et al. |
| 2,353,621 | A | 7/1944 | Sav et al. |
| 2,770,825 | A | 11/1956 | Pullen |
| 3,119,369 | A | 1/1964 | Harland et al. |
| 3,166,138 | A | 1/1965 | Dunn |
| 3,333,564 | A | 8/1967 | Waters |
| 3,375,375 | A | 3/1968 | Robert et al. |
| 3,381,652 | A | 5/1968 | Schaefer et al. |
| 3,457,575 | A | 7/1969 | Bienek |
| 3,550,714 | A | 12/1970 | Bellinger |
| 3,569,727 | A | 3/1971 | Aggarwal et al. |
| 3,674,316 | A | 7/1972 | De Brey |
| 3,678,882 | A | 7/1972 | Kinsella |
| 3,744,586 | A | 7/1973 | Leinauer |
| 3,756,667 | A | 9/1973 | Bombardier et al. |
| 3,809,004 | A | 5/1974 | Leonheart |
| 3,816,004 | A | 6/1974 | Bignardi |
| 3,845,831 | A | 11/1974 | James |
| RE28,268 | E | 12/1974 | Autrand |
| 3,853,086 | A | 12/1974 | Asplund |
| 3,863,285 | A | 2/1975 | Hukuba |
| 3,888,181 | A | 6/1975 | Kups |
| 3,937,174 | A | 2/1976 | Haaga |
| 3,952,361 | A | 4/1976 | Wilkins |
| 3,989,311 | A | 11/1976 | Debrey |
| 3,989,931 | A | 11/1976 | Phillips |
| 4,004,313 | A | 1/1977 | Capra |
| 4,012,681 | A | 3/1977 | Finger et al. |
| 4,070,170 | A | 1/1978 | Leinfelt |
| 4,099,284 | A | 7/1978 | Shinozaki et al. |
| 4,119,900 | A | 10/1978 | Kremnitz |
| 4,175,589 | A | 11/1979 | Nakamura et al. |
| 4,175,892 | A | 11/1979 | De bray |
| 4,196,727 | A | 4/1980 | Verkaart et al. |
| 4,198,727 | A | 4/1980 | Farmer |
| 4,199,838 | A | 4/1980 | Simonsson |
| 4,209,254 | A | 6/1980 | Reymond et al. |
| D258,901 | S | 4/1981 | Keyworth |
| 4,297,578 | A | 10/1981 | Carter |
| 4,306,329 | A | 12/1981 | Yokoi |
| 4,309,758 | A | 1/1982 | Halsall et al. |
| 4,328,545 | A | 5/1982 | Halsall et al. |
| 4,367,403 | A | 1/1983 | Miller |
| 4,369,543 | A | 1/1983 | Chen et al. |
| 4,401,909 | A | 8/1983 | Gorsek |
| 4,416,033 | A | 11/1983 | Specht |
| 4,445,245 | A | 5/1984 | Lu |
| 4,465,370 | A | 8/1984 | Yuasa et al. |
| 4,477,998 | A | 10/1984 | You |
| 4,481,692 | A | 11/1984 | Kurz |
| 4,482,960 | A | 11/1984 | Pryor |
| 4,492,058 | A | 1/1985 | Goldfarb et al. |
| 4,513,469 | A | 4/1985 | Godfrey et al. |
| D278,732 | S | 5/1985 | Ohkado |
| 4,518,437 | A | 5/1985 | Sommer |
| 4,534,637 | A | 8/1985 | Suzuki et al. |
| 4,556,313 | A | 12/1985 | Miller et al. |
| 4,575,211 | A | 3/1986 | Matsumura et al. |
| 4,580,311 | A | 4/1986 | Kurz |
| 4,601,082 | A | 7/1986 | Kurz |
| 4,618,213 | A | 10/1986 | Chen |
| 4,620,285 | A | 10/1986 | Perdue |
| 4,624,026 | A | 11/1986 | Olson et al. |
| 4,626,995 | A | 12/1986 | Lofgren et al. |
| 4,628,454 | A | 12/1986 | Ito |
| 4,638,445 | A | 1/1987 | Mattaboni |
| 4,644,156 | A | 2/1987 | Takahashi et al. |
| 4,649,504 | A | 3/1987 | Krouglicof et al. |
| 4,652,917 | A | 3/1987 | Miller |
| 4,654,492 | A | 3/1987 | Koerner et al. |
| 4,654,924 | A | 4/1987 | Getz et al. |
| 4,660,969 | A | 4/1987 | Sorimachi et al. |
| 4,662,854 | A | 5/1987 | Fang |
| 4,674,048 | A | 6/1987 | Okumura |
| 4,679,152 | A | 7/1987 | Perdue |
| 4,680,827 | A | 7/1987 | Hummel |
| 4,696,074 | A | 9/1987 | Cavalli |
| D292,223 | S | 10/1987 | Trumbull |
| 4,700,301 | A | 10/1987 | Dyke |
| 4,700,427 | A | 10/1987 | Knepper |
| 4,703,820 | A | 11/1987 | Reinaud |
| 4,710,020 | A | 12/1987 | Maddox et al. |
| 4,716,621 | A | 1/1988 | Zoni |
| 4,728,801 | A | 3/1988 | O'Connor |
| 4,733,343 | A | 3/1988 | Yoneda et al. |
| 4,733,430 | A | 3/1988 | Westergren |
| 4,733,431 | A | 3/1988 | Martin |
| 4,735,136 | A | 4/1988 | Lee et al. |
| 4,735,138 | A | 4/1988 | Gawler et al. |
| 4,748,336 | A | 5/1988 | Fujie et al. |
| 4,748,833 | A | 6/1988 | Nagasawa |
| 4,756,049 | A | 7/1988 | Uehara |
| 4,767,213 | A | 8/1988 | Hummel |
| 4,769,700 | A | 9/1988 | Pryor |
| 4,777,416 | A | 10/1988 | George et al. |
| D298,766 | S | 11/1988 | Tanno et al. |
| 4,782,550 | A | 11/1988 | Jacobs |
| 4,796,198 | A | 1/1989 | Boultinghouse et al. |
| 4,806,751 | A | 2/1989 | Abe et al. |
| 4,811,228 | A | 3/1989 | Hyyppa |
| 4,813,906 | A | 3/1989 | Matsuyama et al. |
| 4,815,157 | A | 3/1989 | Tsuchiya |
| 4,817,000 | A | 3/1989 | Eberhardt |
| 4,818,875 | A | 4/1989 | Weiner |
| 4,829,442 | A | 5/1989 | Kadonoff et al. |

(56) References Cited

U.S. PATENT DOCUMENTS

| | | |
|---|---|---|
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,105,502 A | 4/1992 | Takashima |
| 5,105,550 A | 4/1992 | Shenoha |
| 5,109,566 A | 5/1992 | Kobayashi et al. |
| 5,111,401 A | 5/1992 | Everett, Jr. et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,154,617 A | 10/1992 | Suman et al. |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,187,662 A | 2/1993 | Kamimura et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,352,901 A | 10/1994 | Poorman |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |

(56) References Cited

U.S. PATENT DOCUMENTS

| | | |
|---|---|---|
| 5,546,631 A | 8/1996 | Chambon |
| 5,548,511 A | 8/1996 | Bancroft |
| 5,551,119 A | 9/1996 | Worwag |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,732,401 A | 3/1998 | Conway |
| 5,735,017 A | 4/1998 | Barnes et al. |
| 5,735,959 A | 4/1998 | Kubo et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,767,960 A | 6/1998 | Orman |
| 5,770,936 A | 6/1998 | Hirai et al. |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,839,156 A | 11/1998 | Park et al. |
| 5,839,532 A | 11/1998 | Yoshiji et al. |
| 5,841,259 A | 11/1998 | Kim et al. |
| 5,867,800 A | 2/1999 | Leif |
| 5,867,861 A | 2/1999 | Kasen et al. |
| 5,869,910 A | 2/1999 | Colens |
| 5,894,621 A | 4/1999 | Kubo |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,943,933 A | 8/1999 | Evans et al. |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A | 11/1999 | Allen et al. |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,012,618 A | 1/2000 | Matsuo |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,108,859 A | 8/2000 | Burgoon |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |

(56) References Cited

U.S. PATENT DOCUMENTS

| | | |
|---|---|---|
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,482,252 B1 | 11/2002 | Conrad et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,525,509 B1 | 2/2003 | Petersson et al. |
| D471,243 S | 3/2003 | Cioffi et al. |
| 6,532,404 B2 | 3/2003 | Colens |
| 6,535,793 B2 | 3/2003 | Allard |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| 6,597,076 B2 | 7/2003 | Scheible et al. |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,711,280 B2 | 3/2004 | Stafsudd et al. |
| 6,732,826 B2 | 5/2004 | Song et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |

(56) References Cited

U.S. PATENT DOCUMENTS

| | | |
|---|---|---|
| 6,845,297 B2 | 1/2005 | Allard |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B2 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,041,029 B2 | 5/2006 | Fulghum et al. |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| D526,753 S | 8/2006 | Tani et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer e |
| 7,225,500 B2 | 6/2007 | Diehl et al. |
| 7,246,405 B2 | 7/2007 | Yan |
| 7,248,951 B2 | 7/2007 | Hulden |
| D548,411 S | 8/2007 | Schroter |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 | 1/2008 | Huffman et al. |
| 7,324,870 B2 | 1/2008 | Lee |
| 7,328,196 B2 | 2/2008 | Peters |
| 7,332,890 B2 | 2/2008 | Cohen et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,166 B2 * | 6/2008 | Harwig et al. .................. 701/23 |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 * | 10/2008 | Svendsen et al. ............. 15/49.1 |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 * | 1/2009 | Kim et al. .................... 700/258 |
| 7,503,096 B2 | 3/2009 | Lin |
| 7,515,991 B2 | 4/2009 | Egawa et al. |
| D593,265 S | 5/2009 | Carr et al. |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 * | 8/2009 | Jaworski et al. .............. 15/50.3 |
| 7,600,521 B2 | 10/2009 | Woo |
| 7,603,744 B2 | 10/2009 | Reindle |
| 7,617,557 B2 | 11/2009 | Reindle |
| 7,620,476 B2 | 11/2009 | Morse et al. |
| 7,636,928 B2 | 12/2009 | Uno |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,765,635 B2 | 8/2010 | Park |
| 7,784,139 B2 | 8/2010 | Sawalski et al. |
| 7,801,645 B2 | 9/2010 | Taylor et al. |
| 7,805,220 B2 | 9/2010 | Taylor et al. |
| 7,809,944 B2 | 10/2010 | Kawamoto |
| 7,832,048 B2 | 11/2010 | Harwiig et al. |
| 7,849,555 B2 | 12/2010 | Hahm et al. |
| 7,853,645 B2 | 12/2010 | Brown et al. |
| 7,860,680 B2 | 12/2010 | Arms et al. |
| 7,920,941 B2 | 4/2011 | Park et al. |
| 7,937,800 B2 | 5/2011 | Yan |
| 7,953,526 B2 * | 5/2011 | Durkos et al. .................. 701/25 |
| 7,957,836 B2 | 6/2011 | Myeong et al. |
| 8,087,117 B2 | 1/2012 | Kapoor et al. |
| 8,239,992 B2 * | 8/2012 | Schnittman et al. .......... 15/41.1 |
| 8,347,444 B2 * | 1/2013 | Schnittman et al. .......... 15/41.1 |
| 8,370,985 B2 * | 2/2013 | Schnittman et al. .......... 15/41.1 |
| 8,392,021 B2 | 3/2013 | Konandreas et al. |
| 8,584,305 B2 * | 11/2013 | Won et al. ...................... 15/319 |
| 8,839,477 B2 * | 9/2014 | Schnittman et al. .......... 15/41.1 |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |

(56) References Cited

U.S. PATENT DOCUMENTS

| | | |
|---|---|---|
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1* | 9/2004 | Jones et al. ..................... 15/319 |
| 2004/0187457 A1 | 9/2004 | Colens |
| 2004/0196451 A1 | 10/2004 | Aoyama |
| 2004/0200505 A1 | 10/2004 | Taylor et al. |
| 2004/0201361 A1 | 10/2004 | Koh et al. |
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015914 A1 | 1/2005 | You et al. |
| 2005/0015920 A1 | 1/2005 | Kim et al. |
| 2005/0021181 A1 | 1/2005 | Kim et al. |
| 2005/0067994 A1 | 3/2005 | Jones et al. |
| 2005/0076466 A1* | 4/2005 | Yan .............................. 15/319 |
| 2005/0085947 A1 | 4/2005 | Aldred et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0162119 A1 | 7/2005 | Landry et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | De Guzman |
| 2006/0000050 A1 | 1/2006 | Cipolla et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0119839 A1 | 6/2006 | Bertin et al. |
| 2006/0143295 A1 | 6/2006 | Costa-Requena et al. |

(56) References Cited

U.S. PATENT DOCUMENTS

| | | |
|---|---|---|
| 2006/0146776 A1 | 7/2006 | Kim |
| 2006/0150361 A1 | 7/2006 | Aldred et al. |
| 2006/0185690 A1 | 8/2006 | Song et al. |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0196003 A1 | 9/2006 | Song et al. |
| 2006/0220900 A1 | 10/2006 | Ceskutti et al. |
| 2006/0229774 A1 | 10/2006 | Park et al. |
| 2006/0259194 A1 | 11/2006 | Chiu |
| 2006/0259494 A1 | 11/2006 | Watson et al. |
| 2006/0288519 A1 | 12/2006 | Jaworski et al. |
| 2006/0293787 A1 | 12/2006 | Kanda et al. |
| 2006/0293808 A1 | 12/2006 | Qian |
| 2007/0006404 A1 | 1/2007 | Cheng et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0114975 A1 | 5/2007 | Cohen et al. |
| 2007/0136981 A1* | 6/2007 | Dilger et al. .................. 15/319 |
| 2007/0142964 A1 | 6/2007 | Abramson |
| 2007/0150096 A1 | 6/2007 | Yeh et al. |
| 2007/0156286 A1 | 7/2007 | Yamauchi |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1* | 10/2007 | Ozick et al. .................. 701/23 |
| 2007/0245511 A1 | 10/2007 | Hahm et al. |
| 2007/0250212 A1 | 10/2007 | Halloran et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0109126 A1 | 5/2008 | Sandin et al. |
| 2008/0184518 A1 | 8/2008 | Taylor et al. |
| 2008/0266748 A1 | 10/2008 | Lee |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0082193 A1 | 4/2010 | Chiappetta |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 3317376 C2 | 12/1987 |
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DE | 19849978 | 2/2001 |
| DE | 10242257 | 4/2003 |
| DE | 102004038074 | 6/2005 |
| DE | 10357636 | 7/2005 |
| DE | 102004041021 B3 | 8/2005 |
| DE | 202005019993 | 2/2006 |
| DE | 102005046813 A1 | 4/2007 |
| DK | 338988 A | 12/1988 |
| EP | 0114926 | 8/1984 |
| EP | 0265542 A1 | 5/1988 |
| EP | 0281085 A2 | 9/1988 |
| EP | 0294101 A2 | 12/1988 |
| EP | 0307381 | 7/1990 |
| EP | 0358628 | 5/1991 |
| EP | 0433697 A2 | 6/1991 |
| EP | 0437024 A1 | 7/1991 |
| EP | 0479273 | 5/1993 |
| EP | 0554978 A2 | 8/1993 |
| EP | 0615719 A1 | 9/1994 |
| EP | 0748006 | 12/1996 |
| EP | 0792726 A1 | 9/1997 |
| EP | 0930040 A2 | 7/1999 |
| EP | 0845237 B1 | 4/2000 |
| EP | 0861629 B1 | 9/2001 |
| EP | 1172719 | 1/2002 |
| EP | 1228734 | 8/2002 |
| EP | 1331537 | 7/2003 |
| EP | 1380245 | 1/2004 |
| EP | 1380246 A2 | 1/2004 |
| EP | 1018315 B1 | 11/2004 |
| EP | 1553472 A1 | 7/2005 |
| EP | 1557730 | 7/2005 |
| EP | 1642522 A2 | 4/2006 |
| EP | 1717658 | 11/2006 |
| EP | 1806086 | 7/2007 |
| EP | 1836941 | 9/2007 |
| ES | 2238196 A1 | 8/2005 |
| FR | 2601443 A1 | 1/1988 |
| FR | 2828589 A1 | 2/2003 |
| GB | 381622 | 10/1932 |
| GB | 449815 | 7/1936 |
| GB | 702426 | 1/1954 |
| GB | 1403860 | 8/1975 |
| GB | 2128842 A | 5/1984 |
| GB | 2213047 | 8/1989 |
| GB | 2225221 A | 5/1990 |
| GB | 2267360 A | 12/1993 |
| GB | 2283838 A | 5/1995 |
| GB | 2284957 A | 6/1995 |
| GB | 2300082 A | 10/1996 |
| GB | 2404330 A | 2/2005 |
| GB | 2417354 A | 2/2006 |
| GB | 2430863 | 4/2007 |
| JP | 53021869 | 2/1978 |
| JP | 53110257 A2 | 9/1978 |
| JP | S55088749 U | 6/1980 |
| JP | 57014726 | 1/1982 |
| JP | 57064217 | 4/1982 |
| JP | 59005315 | 1/1984 |
| JP | 59033511 U | 3/1984 |
| JP | 59094005 | 5/1984 |
| JP | 59099308 | 6/1984 |
| JP | 59112311 | 6/1984 |
| JP | 59120124 A | 7/1984 |
| JP | 59131668 U | 9/1984 |
| JP | 59164973 | 9/1984 |
| JP | 59184917 A | 10/1984 |
| JP | 2283343 A2 | 11/1984 |
| JP | 59212924 | 12/1984 |
| JP | 59226909 | 12/1984 |
| JP | 60089213 A | 5/1985 |
| JP | 60211510 A | 10/1985 |
| JP | 60259895 | 12/1985 |
| JP | 61023221 | 1/1986 |
| JP | 61097712 A | 5/1986 |
| JP | 62070709 | 4/1987 |
| JP | 62074018 A | 4/1987 |
| JP | 62120510 A | 6/1987 |
| JP | 62154008 | 7/1987 |

(56) References Cited

FOREIGN PATENT DOCUMENTS

| | | |
|---|---|---|
| JP | 62164431 | 7/1987 |
| JP | 62263507 A | 11/1987 |
| JP | 62263508 A | 11/1987 |
| JP | 62189057 U | 12/1987 |
| JP | 63079623 A | 4/1988 |
| JP | S63127310 A | 5/1988 |
| JP | 63158032 | 7/1988 |
| JP | 63183032 | 7/1988 |
| JP | 63241610 A | 10/1988 |
| JP | 1118752 | 8/1989 |
| JP | 2-6312 U | 1/1990 |
| JP | 2006312 | 2/1990 |
| JP | 2026312 | 6/1990 |
| JP | 3051023 A | 3/1991 |
| JP | 4019586 | 1/1992 |
| JP | 4074285 A | 3/1992 |
| JP | 4084921 A | 3/1992 |
| JP | 4300516 | 10/1992 |
| JP | 5023269 A | 2/1993 |
| JP | 5042076 A | 2/1993 |
| JP | 5046246 | 2/1993 |
| JP | 5091604 A | 4/1993 |
| JP | 5095879 | 4/1993 |
| JP | 5150827 A | 6/1993 |
| JP | 5150829 A | 6/1993 |
| JP | 5054620 U | 7/1993 |
| JP | 5175933 | 7/1993 |
| JP | 5040519 Y2 | 10/1993 |
| JP | 05257527 A | 10/1993 |
| JP | 5257533 | 10/1993 |
| JP | 05285861 A | 11/1993 |
| JP | 5302836 | 11/1993 |
| JP | 5312514 | 11/1993 |
| JP | 5341904 | 11/1993 |
| JP | 05046239 Y2 | 12/1993 |
| JP | 6154143 | 12/1993 |
| JP | 6003251 U | 1/1994 |
| JP | 6026312 | 4/1994 |
| JP | 6105781 A | 4/1994 |
| JP | 6137828 A | 5/1994 |
| JP | 7047046 | 6/1994 |
| JP | 6293095 A | 10/1994 |
| JP | 06327598 A | 11/1994 |
| JP | 8084696 | 2/1995 |
| JP | 07129239 A | 5/1995 |
| JP | 7059702 B | 6/1995 |
| JP | 07222705 A2 | 8/1995 |
| JP | 7270518 A | 10/1995 |
| JP | 7281742 | 10/1995 |
| JP | 7281752 | 10/1995 |
| JP | 7102204 | 11/1995 |
| JP | 7295636 | 11/1995 |
| JP | 7311041 | 11/1995 |
| JP | 7313417 A | 12/1995 |
| JP | 7319542 | 12/1995 |
| JP | 8000393 A | 1/1996 |
| JP | 8016241 | 1/1996 |
| JP | 8016776 A | 1/1996 |
| JP | 8063229 | 3/1996 |
| JP | 8083125 | 3/1996 |
| JP | 8089449 A | 4/1996 |
| JP | 08089451 A | 4/1996 |
| JP | 2520732 | 5/1996 |
| JP | 8123548 A | 5/1996 |
| JP | 8152916 A | 6/1996 |
| JP | 8256960 | 10/1996 |
| JP | 8263137 A | 10/1996 |
| JP | 8286741 | 11/1996 |
| JP | 8322774 | 12/1996 |
| JP | 8335112 A | 12/1996 |
| JP | 943901 | 2/1997 |
| JP | 9043901 | 2/1997 |
| JP | 9044240 A | 2/1997 |
| JP | 9047413 | 2/1997 |
| JP | 9066855 A | 3/1997 |
| JP | 9145309 A | 6/1997 |
| JP | 09160644 A | 6/1997 |
| JP | 09179625 A | 7/1997 |
| JP | 9179685 | 7/1997 |
| JP | 09185410 | 7/1997 |
| JP | 9192069 A | 7/1997 |
| JP | 2555263 Y2 | 8/1997 |
| JP | 9204223 A | 8/1997 |
| JP | 09206258 A | 8/1997 |
| JP | 09233712 A | 9/1997 |
| JP | 9251318 | 9/1997 |
| JP | 9265319 A | 10/1997 |
| JP | 9269807 A | 10/1997 |
| JP | 9269810 A | 10/1997 |
| JP | 9319431 A1 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10105236 A | 4/1998 |
| JP | 10117973 A | 5/1998 |
| JP | 10118963 A | 5/1998 |
| JP | 10165738 | 6/1998 |
| JP | 10177414 A | 6/1998 |
| JP | 10214114 | 8/1998 |
| JP | 10228316 | 8/1998 |
| JP | 10240342 | 9/1998 |
| JP | 10260727 | 9/1998 |
| JP | 10295595 A | 11/1998 |
| JP | 10314088 | 12/1998 |
| JP | H10314078 A | 12/1998 |
| JP | 11015941 A | 1/1999 |
| JP | 11065655 | 3/1999 |
| JP | 11085269 | 3/1999 |
| JP | 11102219 | 4/1999 |
| JP | 11102220 A | 4/1999 |
| JP | 11162454 A | 6/1999 |
| JP | 11174145 A | 7/1999 |
| JP | 11175149 A | 7/1999 |
| JP | 11178764 A | 7/1999 |
| JP | 11178765 A | 7/1999 |
| JP | 11212642 A | 8/1999 |
| JP | 11213157 A | 8/1999 |
| JP | 11508810 | 8/1999 |
| JP | 11248806 | 9/1999 |
| JP | 11510935 | 9/1999 |
| JP | 11282532 A | 10/1999 |
| JP | 11282533 A | 10/1999 |
| JP | 11295412 A | 10/1999 |
| JP | 11346964 | 12/1999 |
| JP | 2000047728 | 2/2000 |
| JP | 2000056006 A | 2/2000 |
| JP | 2000056831 A | 2/2000 |
| JP | 2000060782 | 2/2000 |
| JP | 2000066722 A | 3/2000 |
| JP | 2000075925 A | 3/2000 |
| JP | 2000102499 | 4/2000 |
| JP | 10240343 | 5/2000 |
| JP | 2000510750 | 8/2000 |
| JP | 2000275321 | 10/2000 |
| JP | 2000279353 | 10/2000 |
| JP | 2000342497 | 12/2000 |
| JP | 2000342498 | 12/2000 |
| JP | 2000353014 A | 12/2000 |
| JP | 2001022443 A | 1/2001 |
| JP | 2001067588 | 3/2001 |
| JP | 2001087182 | 4/2001 |
| JP | 2001121455 | 5/2001 |
| JP | 2001125641 | 5/2001 |
| JP | 2001508572 | 6/2001 |
| JP | 2001197008 | 7/2001 |
| JP | 3197758 B2 | 8/2001 |
| JP | 3201903 B2 | 8/2001 |
| JP | 2001216482 A | 8/2001 |
| JP | 2001258807 | 9/2001 |
| JP | 2001265437 A | 9/2001 |
| JP | 2001275908 A | 10/2001 |
| JP | 2001289939 | 10/2001 |
| JP | 2001306170 A | 11/2001 |

(56) References Cited

FOREIGN PATENT DOCUMENTS

| | | |
|---|---|---|
| JP | 2001320781 | 11/2001 |
| JP | 2001525567 | 12/2001 |
| JP | 2002073170 | 3/2002 |
| JP | 2002204768 A | 7/2002 |
| JP | 2002204769 A | 7/2002 |
| JP | 2002247510 A | 8/2002 |
| JP | 2002532178 | 10/2002 |
| JP | 2002532180 | 10/2002 |
| JP | 2002323925 | 11/2002 |
| JP | 2002333920 A | 11/2002 |
| JP | 2002-366226 | 12/2002 |
| JP | 3356170 | 12/2002 |
| JP | 2002355206 | 12/2002 |
| JP | 2002360471 A | 12/2002 |
| JP | 2002360479 | 12/2002 |
| JP | 2002360482 A | 12/2002 |
| JP | 2002366227 | 12/2002 |
| JP | 2002369778 | 12/2002 |
| JP | 2003005296 A | 1/2003 |
| JP | 2003010076 A | 1/2003 |
| JP | 2003010088 A | 1/2003 |
| JP | 2003015740 | 1/2003 |
| JP | 2003028528 A | 1/2003 |
| JP | 3375843 | 2/2003 |
| JP | 2003036116 A | 2/2003 |
| JP | 2003038401 | 2/2003 |
| JP | 2003038402 | 2/2003 |
| JP | 2003047579 | 2/2003 |
| JP | 2003052596 | 2/2003 |
| JP | 2003505127 | 2/2003 |
| JP | 2003061882 A | 3/2003 |
| JP | 2003079550 | 3/2003 |
| JP | 2003084994 | 3/2003 |
| JP | 2003167628 A | 6/2003 |
| JP | 2003180586 A | 7/2003 |
| JP | 2003180587 A | 7/2003 |
| JP | 2003186539 A | 7/2003 |
| JP | 2003190064 A | 7/2003 |
| JP | 2003228421 | 8/2003 |
| JP | 2003241836 A | 8/2003 |
| JP | 2003-271242 | 9/2003 |
| JP | 2003262520 A | 9/2003 |
| JP | 2003285288 | 10/2003 |
| JP | 2003304992 A | 10/2003 |
| JP | 2003310489 | 11/2003 |
| JP | 2003310509 A | 11/2003 |
| JP | 2003330543 A | 11/2003 |
| JP | 2004016385 A | 1/2004 |
| JP | 2004123040 A | 4/2004 |
| JP | 2004125479 | 4/2004 |
| JP | 2004148021 A | 5/2004 |
| JP | 2004160102 A | 6/2004 |
| JP | 2004166968 A | 6/2004 |
| JP | 2004174228 | 6/2004 |
| JP | 2004-194715 | 7/2004 |
| JP | 2004-522231 | 7/2004 |
| JP | 2004198330 A | 7/2004 |
| JP | 2004219185 | 8/2004 |
| JP | 2004267236 | 9/2004 |
| JP | 2004304714 | 10/2004 |
| JP | 2004306242 | 11/2004 |
| JP | 2004337632 A | 12/2004 |
| JP | 2005040578 | 2/2005 |
| JP | 2005117295 | 4/2005 |
| JP | 2005118354 A | 5/2005 |
| JP | 2005135400 | 5/2005 |
| JP | 2005142800 | 6/2005 |
| JP | 2005-211494 | 8/2005 |
| JP | 2005-211496 | 8/2005 |
| JP | 2005-218560 | 8/2005 |
| JP | 2005211360 A | 8/2005 |
| JP | 2005224265 A | 8/2005 |
| JP | 2005230032 A | 9/2005 |
| JP | 2005245916 A | 9/2005 |
| JP | 2005528967 | 9/2005 |
| JP | 2005296511 | 10/2005 |
| JP | 2005309700 | 11/2005 |
| JP | 2005346700 | 12/2005 |
| JP | 2005352707 A | 12/2005 |
| JP | 2006031503 A | 2/2006 |
| JP | 2006043071 A | 2/2006 |
| JP | 2006155274 A | 6/2006 |
| JP | 2006164223 A | 6/2006 |
| JP | 2006209644 A | 8/2006 |
| JP | 2006227673 A | 8/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2006318483 A | 11/2006 |
| JP | 2007014668 | 1/2007 |
| JP | 2007034866 A | 2/2007 |
| JP | 2007-209392 | 8/2007 |
| JP | 2007213180 A | 8/2007 |
| JP | 2009015611 A | 1/2009 |
| JP | 2010198552 A | 9/2010 |
| KR | 1020043088 | 1/2004 |
| WO | 9526512 A1 | 10/1995 |
| WO | 9530887 A1 | 11/1995 |
| WO | 9617258 A1 | 6/1996 |
| WO | 9715224 A1 | 5/1997 |
| WO | 9740734 A1 | 11/1997 |
| WO | 9741451 A1 | 11/1997 |
| WO | 9853456 A1 | 11/1998 |
| WO | 9905580 A2 | 2/1999 |
| WO | 9908584 | 2/1999 |
| WO | 9916078 A1 | 4/1999 |
| WO | 9928800 | 6/1999 |
| WO | 9938056 A1 | 7/1999 |
| WO | 9938237 A1 | 7/1999 |
| WO | 9943250 A1 | 9/1999 |
| WO | 9959042 | 11/1999 |
| WO | 0036962 | 6/2000 |
| WO | 0038026 A1 | 6/2000 |
| WO | 0038028 A1 | 6/2000 |
| WO | 0038029 A1 | 6/2000 |
| WO | 0004430 A1 | 10/2000 |
| WO | 0078410 A1 | 12/2000 |
| WO | 0106904 A1 | 2/2001 |
| WO | 0106905 A1 | 2/2001 |
| WO | 0180703 A1 | 11/2001 |
| WO | 0191623 A2 | 12/2001 |
| WO | 0239864 A1 | 5/2002 |
| WO | 0239868 A1 | 5/2002 |
| WO | 02058527 A1 | 8/2002 |
| WO | 02062194 A1 | 8/2002 |
| WO | 02/071175 | 9/2002 |
| WO | 02067744 A1 | 9/2002 |
| WO | 02067745 A1 | 9/2002 |
| WO | 02067752 A1 | 9/2002 |
| WO | 02069774 A1 | 9/2002 |
| WO | 02069775 A2 | 9/2002 |
| WO | 02075350 A1 | 9/2002 |
| WO | 02075356 A1 | 9/2002 |
| WO | 02075469 A1 | 9/2002 |
| WO | 02075470 A1 | 9/2002 |
| WO | 02101477 A2 | 12/2002 |
| WO | 03002492 | 2/2003 |
| WO | 03015220 A1 | 2/2003 |
| WO | 03024292 A2 | 3/2003 |
| WO | 03040546 A1 | 5/2003 |
| WO | 03040845 A1 | 5/2003 |
| WO | 03040846 A1 | 5/2003 |
| WO | 03062850 A2 | 7/2003 |
| WO | 03062852 A1 | 7/2003 |
| WO | 03026474 | 11/2003 |
| WO | 2004004533 A1 | 1/2004 |
| WO | 2004004534 A1 | 1/2004 |
| WO | 2004005956 | 1/2004 |
| WO | 2004006034 A2 | 1/2004 |
| WO | 2004025947 A2 | 3/2004 |
| WO | 2004043215 | 5/2004 |
| WO | 2004/059409 | 7/2004 |
| WO | 2004058028 A2 | 7/2004 |

(56) References Cited

FOREIGN PATENT DOCUMENTS

| WO | 2005006935 A1 | 1/2005 |
|---|---|---|
| WO | 2005036292 | 4/2005 |
| WO | 2005037496 | 4/2005 |
| WO | 2005/055795 | 6/2005 |
| WO | 2005055796 A2 | 6/2005 |
| WO | 2005062271 | 7/2005 |
| WO | 2005076545 A1 | 8/2005 |
| WO | 2005077243 A1 | 8/2005 |
| WO | 2005077244 A1 | 8/2005 |
| WO | 2005081074 A1 | 9/2005 |
| WO | 2005082223 | 9/2005 |
| WO | 2005083541 A1 | 9/2005 |
| WO | 2005098475 A1 | 10/2005 |
| WO | 2005098476 A1 | 10/2005 |
| WO | 2006046400 A1 | 5/2006 |
| WO | 2006/061133 | 6/2006 |
| WO | 2006068403 A1 | 6/2006 |
| WO | 2006073248 A1 | 7/2006 |
| WO | 2006089307 | 8/2006 |
| WO | 2007028049 A2 | 3/2007 |
| WO | 2007036490 A2 | 4/2007 |
| WO | 2007065033 A2 | 6/2007 |
| WO | 2007137234 A2 | 11/2007 |

OTHER PUBLICATIONS

CleanMate 365, Intelligent Automatic Vacuum Cleaner, Model No. QQ-1, User Manual www.metapo.com/support/user_manual.pdf, Dec. 2005, 11 pages.

Euroflex Intelligente Monstre, (English excerpt only), 2006, 15 pages.

eVac Robotic Vacuum S1727 Instruction Manual, Sharper Image Corp, Copyright 2004, 16 pages.

Hitachi, accessed at http://www.hitachi.co.jp/New/cnews/hi_030529_hi_030529.pdf, May 29, 2003, 15 pages (with English translation).

"IT Media," Retrieved from the Internet: URL<http://www.itmedia.co.jp/news/0111/16/robofesta_m.html>. Accessed Nov. 1, 2011, 8 pages (with English translation).

"It's eye," Retrieved from the Internet: URL< www.hitachi.co.jp/rd/pdf/topics/hitac2003_10.pdf>. 2003, 11 pages (with English translation).

KOOLVAC Robotic Vacuum Cleaner Owner's Manual, Koolatron, 2004, 13 pages.

Maschinemarkt Würzburg 105, No. 27, pp. 3, Jul. 30, 1999 (with English translation).

Matsumura Camera Online Shop: Retrieved from the Internet: URL< http://www.rakuten.co.jp/matsucame/587179/711512/>. accessed Nov. 2011, 15 pages (with English translation).

"NorthStar, Low-Cost, Indoor Localization," Evolution Robotics—Powering Intelligent Products, 2005, 2 pages.

"Tech-on!," Retrieved from the Internet: URL http://techon.nikkeibp.co.jp/members/01db/200203/1006501/, accessed Nov. 2011, 7 pages (with English translation).

European Search Report issued in EP Application No. 12195264.2, dated Feb. 15, 2013, 3 pages.

European Search Report issued in EP Application No. 12195256.8, dated Mar. 5, 2013, 2 pages.

European Search Report issued in EP Application No. 12195252.7, dated Mar. 4, 2013, 3 pages.

Andersen et al., "Landmark based navigation strategies," SPIE Conference on Mobile Robots XIII, SPIE vol. 3525, pp. 170-181, Jan. 8, 1999.

Ascii, Mar. 25, 2002, http://ascii.jp/elem/000/000/330/330024/, accessed Nov. 2011, 15 pages (with English translation).

Becker et al., "Reliable Navigation Using Landmarks," IEEE International Conference on Robotics and Automation, 0-7803-1965-6, pp. 401-406, 1995.

Benayad-Cherif et al., "Mobile Robot Navigation Sensors," SPIE vol. 1831 Mobile Robots, VII, pp. 378-387, 1992.

Betke et al. "Mobile robot localization using landmarks," Proceedings of the IEEE/RSJ/GI International Conference on Intelligent Robots and Systems '94 Advanced Robotic Systems and the Real World' (IROS '94), Accessed via IEEE Xplore, 1994, 8 pages.

Bison et al., "Using a structured beacon for cooperative position estimation," *Robotics and Autonomous Systems*, 29(1):33-40, Oct. 1999.

Blaasvaer et al., "AMOR—An Autonomous Mobile Robot Navigation System," Proceedings of the IEEE International Conference on Systems, Man, and Cybernetics, pp. 2266-2271, 1994.

Borges et al., "Optimal Mobile Robot Pose Estimation Using Geometrical Maps," IEEE Transactions on Robotics and Automation, 18(1): 87-94, Feb. 2002.

Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.

Bulusu et al., "Self Configuring Localization systems: Design and Experimental Evaluation,"*ACM Transactions on Embedded Computing Systems*, 3(1):24-60, 2003.

Caccia et al., "Bottom-Following for Remotely Operated Vehicles,"5th IFAC Conference, Alaborg, Denmark, pp. 245-250, Aug. 2000.

Certified copy of U.S. Appl. No. 60/605,066 as provided to WIPO in PCT/US2005/030422, corresponding to U.S. National Stage Entry U.S. Appl. No. 11/574,290, U.S.publication 2008/0184518, filing date Aug. 27, 2004.

Certified copy of U.S. Appl. No. 60/605,181 as provided to WIPO in PCT/US2005/030422, corresponding to U.S. National Stage Entry U.S. Appl. No. 11/574,290, U.S.publication 2008/0184518, filing date Aug. 27, 2004.

Chae et al., "StarLITE: A new artificial landmark for the navigation of mobile robots," http://www.irc.atr.jp/jk-nrs2005/pdf/Starlite.pdf, 4 pages, 2005.

Chamberlin et al., "Team 1: Robot Locator Beacon System," NASA Goddard SFC, Design Proposal, 15 pages, Feb. 2006.

Champy, "Physical management of IT assets in Data Centers using RFID technologies," RFID 2005 University, Oct. 12-14, 2005 , 19 pages.

Chiri, "Joystick Control for Tiny OS Robot," http://www.eecs.berkeley.edu/Programs/ugrad/superb/papers2002/chiri.pdf.    12 pages, Aug. 2002.

Christensen et al. "Theoretical Methods for Planning and Control in Mobile Robotics," 1997 First International Conference on Knowledge-Based Intelligent Electronic Systems, Adelaide, Australia, pp. 81-86, May 1997.

Clerentin et al., "A localization method based on two omnidirectional perception systems cooperation," *Proc of IEEE International Conference on Robotics & Automation*, San Francisco, CA vol. 2, pp. 1219-1224, Apr. 2000.

Corke, "High Performance Visual serving for robots end-point control," SPIE vol. 2056, Intelligent Robots and Computer Vision, 1993, 10 pages.

Cozman et al., "Robot Localization using a Computer Vision Sextant," IEEE International Midwest Conference on Robotics and Automation, pp. 106-111, 1995.

D'Orazio et al., "Model based Vision System for mobile robot position estimation", *SPIE*, vol. 2058 Mobile Robots VIII, pp. 38-49, 1992.

De Bakker et al., "Smart PSD—array for sheet of light range imaging", Proc. of *SPIE*, vol. 3965, pp. 1-12, May 2000.

Dyson's Robot Vacuum Cleaner—the DC06, May 2004, Retrieved from the Internet: URL< http://www.gizmag.com/go/1282/>. Accessed Nov. 2011, 3 pages.

Desaulniers et al., "An Efficient Algorithm to find a shortest path for a car-like Robot," *IEEE Transactions on robotics and Automation* , 11(6):819-828, Dec. 1995.

Dorfmüller-Ulhaas, "Optical Tracking From User Motion to 3D Interaction,"    http://www.cg.tuwien.ac.at/research/publications/2002/Dorfmueller-Ulhaas-thesis, 182 pages, 2002.

Dorsch et al., "Laser Triangulation: Fundamental uncertainty in distance measurement," *Applied Optics*, 33(7):1306-1314, Mar. 1994.

(56) References Cited

OTHER PUBLICATIONS

Dudek et al., "Localizing a Robot with Minimum Travel" *Proceedings of the sixth annual ACM-SIAM symposium on Discrete Algorithms*, 27(2):583-604, Apr. 1998.
Dulimarta et al., "Mobile Robot Localization in Indoor Environment", *Pattern Recognition*, 30(1):99-111, 1997.
EBay, "Roomba Timer—> Timed Cleaning—Floorvac Robotic Vacuum," Retrieved from the Internet: URL Cgi.ebay.com/ws/eBay|SAP|.d11?viewitem&category=43526&item=4375198387&rd=1, 5 pages, Apr. 2005.
Electrolux Trilobite, "Time to enjoy life," Retrieved from the Internet: URL<http://www.robocon.co.kr/trilobite/Presentation_Trilobite_Kor_030104.ppt, 26 pages, accessed Dec. 2011.
Electrolux Trilobite, Jan. 12, 2001, http://www.electroluxui.com:8080/2002%5C822%5C833102EN.pdf, accessed Jul. 2, 2012, 10 pages.
Electrolux, "Welcome to the Electrolux Trilobite—Designed for the well-lived home," Retrieved from the Internet: URL<http://www.electroluxusa.com/node57.as[?currentURL=node142.asp%3F >. Accessed Mar. 2005, 2 pages.
Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.
Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.
Facchinetti Claudio et al., "Self-Positioning Robot Navigation Using Ceiling Images Sequences," ACCV '95, 5 pages, Dec. 1995.
Facchinetti Claudio et al., "Using and Learning Vision-Based Self-Positioning for Autonomous Robot Navigation," ICARCV '94, vol. 3, pp. 1694-1698, 1994.
Facts on Trilobite, webpage, Retrieved from the Internet: URL< http://trilobiteelectroluxse/presskit_en/model11335asp?print=yes&pressID=>. 2 pages, accessed Dec. 2003.
Fairfield et al., "Mobile Robot Localization with Sparse Landmarks," SPIE vol. 4573, pp. 148-155, 2002.
Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.
Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.
Floorbot GE Plastics—Image, available at http://www.fuseid.com/, 1989-1990, Accessed Sep. 2012, 1 page.
Floorbotics, VR8 Floor Cleaning Robot, Product Description for Manufacturing, URL: <http://www.consensus.sem.au/SoftwareAwards/CSAarchive/CSA2004/CSAart04/FloorBot/F>. Mar. 2004, 11 pages.
Franz et al., "Biomimetric robot navigation", Robotics and Autonomous Systems, vol. 30 pp. 133-153, 2000.
Friendly Robotics, "Friendly Robotics-Friendly Vac, Robotic Vacuum Cleaner," Retrieved from the Internet: URL< www.friendlyrobotics.com/vac.htm > 5 pages, Apr. 2005.
Friendly Robotics, Retrieved from the Internet: URL<http://www.robotsandrelax.com/PDFs/RV400Manual.pdf>. 18 pages, accessed Dec. 2011.
Fuentes et al., "Mobile Robotics 1994," University of Rochester. Computer Science Department, TR 588, 44 pages, Dec. 1994.
Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466/1471, Aug. 1995.

Gionis, "A hand-held optical surface scanner for environmental Modeling and Virtual Reality," Virtual Reality World, 16 pages, 1996.
Goncalves et al., "A Visual Front-End for Simultaneous Localization and Mapping", Proceedings of the 2005 IEEE International Conference on Robotics and Automation, Barcelona, Spain, pp. 44-49, Apr. 2005.
Gregg et al., "Autonomous Lawn Care Applications," 2006 Florida Conference on Recent Advances in Robotics, Miami, Florida, May 25-26, 2006, Florida International University, 5 pages.
Grumet, "Robots Clean House," Popular Mechanics, Nov. 2003, 3 pages.
Hamamatsu "SI PIN Diode S5980, S5981 S5870—Multi-element photodiodes for surface mounting," Hamatsu Photonics, 2 pages, Apr. 2004.
Haralick et al. "Pose Estimation from Corresponding Point Data", *IEEE Transactions on Systems, Man, and Cybernetics*, 19(6):1426-1446, Nov. 1989.
Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.
Hitachi, accessed at http://www.hitachi.co.jp/New/cnews/hi_030529_hi_030529.pdf , May 29, 2003, 15 pages (with English translation).
Hoag et al., "Navigation and Guidance in interstellar space," ACTA Astronautica, vol. 2, pp. 513-533 , Feb. 1975.
Home Robot—UBOT; Microbotusa.com, retrieved from the WWW at www.microrobotusa.com, accessed Dec. 2, 2008, 2 pages.
Huntsberger et al., "CAMPOUT: A Control Architecture for Tightly Coupled Coordination of Multirobot Systems for Planetary Surface Exploration," *IEEE Transactions on Systems, Man, and Cybernetics—Part A: Systems and Humans*, 33(5):550-559, Sep. 2003.
Iirobotics.com, "Samsung Unveils Its Multifunction Robot Vacuum," Retrieved from the Internet: URL<.www.iirobotics.com/webpages/hotstuff.php?ubre=111>. 3 pages, Mar. 2005.
InMach "Intelligent Machines," Retrieved from the Internet: URL<www.inmach.de/inside.html>. 1 page , Nov. 2008.
Innovation First, "2004 EDU Robot Controller Reference Guide," Retrieved from the Internet: URL<http://www.ifirobotics.com>. 13 pages, Mar. 2004.
Jarosiewicz et al., "Final Report—Lucid," University of Florida, Departmetn of Electrical and Computer Engineering, EEL 5666—Intelligent Machine Design Laboratory, 50 pages, Aug. 1999.
Jensfelt et al., "Active Global Localization for a mobile robot using multiple hypothesis tracking," *IEEE Transactions on Robots and Automation*, 17(5): 748-760, Oct. 2001.
Jeong et al., "An intelligent map-building system for indoor mobile robot using low cost photo sensors,"*SPIE*, vol. 6042, 6 pages, 2005.
Kahney, "Robot Vacs are in the House," Retrieved from the Internet: URL<www.wired.com/news/technology/o,1282,59237,00.html>. 6 pages, Jun. 2003.
Karcher "Karcher RoboCleaner RC 3000," Retrieved from the Internet: URL<www.robocleaner.de/english/screen3.html>. 4 pages, Dec. 2003.
Karcher RC3000 RoboCleaner,—IMAGE, Accessed at <http://www.karcher.de/versions/int/assets/video/2_4_robo_en.swf>. Accessed Sep. 2009, 1 page.
Karcher USA, RC3000 Robotic Cleaner, website: http://www.karcher-usa.com/showproducts.php?op=view prod¶m1=143&param2=&param3=, 3 pages, accessed Mar. 2005.
Karcher, "Product Manual Download Karch", available at www.karcher.com, 16 pages, 2004.
Karlsson et al, "Core Technologies for service Robotics," IEEE/RSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
King and Weiman, "HelpmateTM Autonomous Mobile Robots Navigation Systems," SPIE vol. 1388 Mobile Robots, pp. 190-198, 1990.

(56) References Cited

OTHER PUBLICATIONS

Kleinberg, The Localization Problem for Mobile Robots, Laboratory for Computer Science, Massachusetts Institute of Technology, 1994 IEEE, pp. 521-531, 1994.

Knights, et al., "Localization and Identification of Visual Landmarks," *Journal of Computing Sciences in Colleges*, 16(4):312-313, May 2001.

Kolodko et al., "Experimental System for Real-Time Motion Estimation," Proceedings of the 2003 IEEE/ASME International Conference on Advanced Intelligent Mechatronics (AIM 2003), pp. 981-986, 2003.

Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.

Krotkov et al., "Digital Sextant," Downloaded from the internet at: http://www.cs.cmu.edu/~epk/ , 1 page, 1995.

Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.

Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.

Kurs et al, Wireless Power transfer via Strongly Coupled Magnetic Resonances, Downloaded from www.sciencemag.org, Aug. 2007, 5 pages.

Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.

Lambrinos et al., "A mobile robot employing insect strategies for navigation," Retrieved from the Internat: URL<http://www8.cs.umu.se/kurser/TDBD17/VT04/d1/Assignment%20Papers/lambrinos-RAS-2000.pdf>. 38 pages, Feb. 1999.

Lang et al., "Visual Measurement of Orientation Using Ceiling Features", 1994 IEEE, pp. 552-555, 1994.

Lapin, "Adaptive position estimation for an automated guided vehicle," *SPIE*, vol. 1831 Mobile Robots VII, pp. 82-94, 1992.

LaValle et al., "Robot Motion Planning in a Changing, Partially Predictable Environment," 1994 IEEE International Symposium on Intelligent Control, Columbus, OH, pp. 261-266, Aug. 1994.

Lee et al., "Development of Indoor Navigation system for Humanoid Robot Using Multi-sensors Integration", ION NTM, San Diego, CA pp. 798-805, Jan. 2007.

Lee et al., "Localization of a Mobile Robot Using the Image of a Moving Object," *IEEE Transaction on Industrial Electronics*, 50(3):612-619, Jun. 2003.

Leonard et al., "Mobile Robot Localization by tracking Geometric Beacons," *IEEE Transaction on Robotics and Automation*, 7(3):376-382, Jun. 1991.

Li et al. "Robust Statistical Methods for Securing Wireless Localization in Sensor Networks," Information Processing in Sensor Networks, 2005, Fourth International Symposium on, pp. 91-98, Apr. 2005.

Li et al., "Making a Local Map of Indoor Environments by Swiveling a Camera and a Sonar," Proceedings of the 1999 IEEE/RSJ International Conference on Intelligent Robots and Systems, pp. 954-959, 1999.

Lin et al., "Mobile Robot Navigation Using Artificial Landmarks," *Journal of robotics System*, 14(2): 93-106, 1997.

Linde, Dissertation—"On Aspects of Indoor Localization," Available at: https://eldorado.tu-dortmund.de/handle/2003/22854, University of Dortmund, 138 pages, Aug. 2006.

Lumelsky et al., "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," IEEE, pp. 2359-2364, 2002.

Ma, Thesis—"Documentation on Northstar," California Institute of Technology, 14 pages, May 2006.

Madsen et al., "Optimal landmark selection for triangulation of robot position," Journal of Robotics and Autonomous Systems, vol. 13 pp. 277-292, 1998.

Malik et al., "Virtual Prototyping for Conceptual Design of a Tracked Mobile Robot," Electrical and Computer Engineering, Canadian Conference on, IEEE, PI. pp. 2349-2352, May 2006.

Martishevcky, "The Accuracy of point light target coordinate determination by dissectoral tracking system", SPIE vol. 2591, pp. 25-30, Oct. 23, 2005.

Maschinemarkt Wurzburg 105, No. 27, pp. 3, 30, Jul. 5, 1999 (with English translation).

Matsutek Enterprises Co. Ltd, "Automatic Rechargeable Vacuum Cleaner," http://matsutek.manufacturer.globalsources.com/si/6008801427181/pdt1/Home-vacuum/10 . . . , Apr. 2007, 3 pages.

McGillem et al., "Infra-red Lacation System for Navigation and Autonomous Vehicles," 1988 IEEE International Conference on Robotics and Automation, vol. 2, pp. 1236-1238, Apr. 1988.

McGillem,et al. "A Beacon Navigation Method for Autonomous Vehicles," *IEEE Transactions on Vehicular Technology*, 38(3):132-139, Aug. 1989.

McLurkin "Stupid Robot Tricks: A Behavior-based Distributed Algorithm Library for Programming Swarms of Robots," Paper submitted for requirements of BSEE at MIT, May 2004, 127 pages.

McLurkin, "The Ants: A community of Microrobots," Paper submitted for requirements of BSEE at MIT, May 1995, 60 pages.

Michelson, "Autonomous navigation," McGraw-Hill—Access Science, Encyclopedia of Science and Technology Online, 2007, 4 pages.

Miro et al., "Towards Vision Based Navigation in Large Indoor Environments," Proceedings of the IEEE/RSJ International Conference on Intelligent Robots and Systems, Beijing, China, pp. 2096-2102, Oct. 2006.

MobileMag, "Samsung Unveils High-tech Robot Vacuum Cleaner," Retrieved from the Internet: URL<http://www.mobilemag.com/content/100/102/C2261/>. 4 pages, Mar. 2005.

Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.

Moore et al., "A simple Map-bases Localization strategy using range measurements," *SPIE*, vol. 5804 pp. 612-620, 2005.

Munich et al., "ERSP: A Software Platform and Architecture for the Service Robotics Industry," Intelligent Robots and Systems, 2005. (IROS 2005), pp. 460-467, Aug. 2005.

Munich et al., "SIFT-ing Through Features with ViPR", IEEE Robotics & Automation Magazine, pp. 72-77, Sep. 2006.

Nam et al., "Real-Time Dynamic Visual Tracking Using PSD Sensors and extended Trapezoidal Motion Planning", Applied Intelligence 10, pp. 53-70, 1999.

Nitu et al., "Optomechatronic System for Position Detection of a Mobile Mini-Robot," *IEEE Ttransactions on Industrial Electronics*, 52(4):969-973, Aug. 2005.

On Robo, "Robot Reviews Samsung Robot Vacuum (VC-RP3OW)," Retrieved from the Internet: URL <www.onrobo.com/reviews/AT_Home/vacuum_cleaners/on00vcrb30rosam/index.htm>. 2 pages, 2005.

OnRobo "Samsung Unveils Its Multifunction Robot Vacuum," Retrieved from the Internet: URL <www.onrobo.com/enews/0210/samsung_vacuum.shtml>. 3 pages, Mar. 2005.

Pages et al., "A camera-projector system for robot positioning by visual serving," Proceedings of the 2006 Conference on Computer Vision and Pattern Recognition Workshop (CVPRW06), 8 pages, Jun. 2006.

Pages et al., "Optimizing Plane-to-Plane Positioning Tasks by Image-Based Visual Servoing and Structured Light," *IEEE Transactions on Robotics*, 22(5):1000-1010, Oct. 2006.

Pages et al., "Robust decoupled visual servoing based on structured light," 2005 IEEE/RSJ, Int. Conf. on Intelligent Robots and Systems, pp. 2676-2681, 2005.

Park et al., "A Neural Network Based Real-Time Robot Tracking Controller Using Position Sensitive Detectors," IEEE World Con-

(56) References Cited

OTHER PUBLICATIONS gress on Computational Intelligence., 1994 IEEE International Conference on Neutral Networks, Orlando, Florida pp. 2754-2758, Jun./Jul. 1994.
Park et al., "Dynamic Visual Servo Control of Robot Manipulators using Neutral Networks," *The Korean Institute Telematics and Electronics*, 29-B(10):771-779, Oct. 1992.
Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.
Paromtchik et al., "Optical Guidance System for Multiple mobile Robots," Proceedings 2001 ICRA. IEEE International Conference on Robotics and Automation, vol. 3, pp. 2935-2940, May 2001.
Penna et al., "Models for Map Building and Navigation", IEEE Transactions on Systems. Man. and Cybernetics., 23(5):1276-1301, Sep./Oct. 1993.
Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.
Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.
Pirjanian et al., "Distributed Control for a Modular, Reconfigurable Cliff Robot," Proceedings of the 2002 IEEE International Conference on Robotics & Automation, Washington, D.C. pp. 4083-4088, May 2002.
Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.
Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.
Pirjanian, "Challenges for Standards for consumer Robotics," IEEE Workshop on Advanced Robotics and its Social impacts, pp. 260-264, Jun. 2005.
Pirjanian, "Reliable Reaction," Proceedings of the 1996 IEEE/SICE/RSJ International Conference on Multisensor Fusion and Integration for Intelligent Systems, pp. 158-165, 1996.
Prassler et al., "A Short History of Cleaning Robots," Autonomous Robots 9, 211-226, 2000, 16 pages.
Remazeilles et al., "Image based robot navigation in 3D environments," Proc. of *SPIE*, vol. 6052, pp. 1-14, Dec. 2005.
Rives et al., "Visual servoing based on ellipse features," *SPIE*, vol. 2056 Intelligent Robots and Computer Vision pp. 356-367, 1993.
Roboking—not just a vacuum cleaner, a robot!, Jan. 21, 2004, infocom.uz/2004/01/21/robokingne-prosto-pyilesos-a-robot/, accessed Oct. 10, 2011, 5 pages.
Robot Buying Guide, "LG announces the first robotic vacuum cleaner for Korea," Retrieved from the Internet: URL<http://robotbg.com/news/2003/04/22/lg_announces_the_first_robotic_vacu>. 1 page, Apr. 2003.
Robotics World, "A Clean Sweep," 5 pages, Jan. 2001.
Ronnback, "On Methods for Assistive Mobile Robots," Retrieved from the Internet: URL<http://www.openthesis.org/documents/methods-assistive-mobile-robots-595019.html>. 218 pages, Jan. 2006.
Roth-Tabak et al., "Environment Model for mobile Robots Indoor Navigation," *SPIE*, vol. 1388 Mobile Robots, pp. 453-463, 1990.
Sahin et al., "Development of a Visual Object Localization Module for Mobile Robots," 1999 Third European Workshop on Advanced Mobile Robots, (Eurobot '99), pp. 65-72, 1999.

Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.
Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.
Schenker et al., "Lightweight rovers for Mars science exploration and sample return," Intelligent Robots and Computer Vision XVI, *SPIE*Proc. 3208, pp. 24-36, 1997.
Schlemmer, "Electrolux Trilobite Robotic Vacuum," Retrieved from the Internet: URL< www.hammacher.com/publish/71579.asp?promo=xsells>. 3 page, Mar. 2005.
Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Special Reports, "Vacuum Cleaner Robot Operated in Conjunction with 3G Celluar Phone," 59(9): 3 pages, Retrieved from the Internet: URL<http://www.toshiba.co.jp/tech/review/2004/09/59_0>. 2004.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
SVET Computers—New Technologies—Robot Vacuum Cleaner, Oct. 1999, available at http://www.sk.rs/1999/10/sknt.01.html, 1 page, accessed Nov. 1, 2011.
Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.
Takio et al., "Real-Time Position and Pose Tracking Method of Moving Object Using Visual Servo System," 47th IEEE International Symposium on Circuits and Systems, pp. 167-170, 2004.
Teller, "Pervasive pose awareness for people, Objects and Robots," http://www.ai.mit.edu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
The Sharper Image, eVac Robotic Vacuum—Product Details, www.sharperiamge.com/us/en/templates/products/pipmorework1printable.jhtml, 1 page, Accessed Mar. 2005.
TheRobotStore.com, "Friendly Robotics Robotic Vacuum RV400—The Robot Store," www.therobotstore.com/s.nl/sc.9/category.-109/it.A/id.43/.f, 1 page, Apr. 2005.
Thrun, Sebastian, "Learning Occupancy Grid Maps With Forward Sensor Models," Autonomous Robots 15, 28 pages, Sep. 1, 2003.
TotalVac.com, RC3000 RoboCleaner website, 2004, Accessed at http://ww.totalvac.com/robot_vacuum.htm (Mar. 2005), 3 pages.
Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.

(56) References Cited

OTHER PUBLICATIONS

Tribelhorn et al., "Evaluating the Roomba: A low-cost, ubiquitous platform for robotics research and education," *IEEE*, pp. 1393-1399, 2007.
Tse et al., "Design of a Navigation System for a Household Mobile Robot Using Neural Networks," Department of Manufacturing Engg. & Engg. Management, City University of Hong Kong, pp. 2151-2156, 1998.
UAMA (Asia) Industrial Co., Ltd., "RobotFamily," 2005, 1 page.
UBOT, cleaning robot capable of wiping with a wet duster, Retrieved from the Internet: URL<http://us.aving.net/news/view.php?articleId=23031>. 4 pages, accessed Nov. 2011.
Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.
Watts, "Robot, boldly goes where no man can," The Times—pp. 20, Jan. 1985.
Wijk et al., "Triangulation-Based Fusion of Sonar Data with Application in Robot Pose Tracking," *IEEE Transactions on Robotics and Automation*, 16(6):740-752, Dec. 2000.
Wolf et al., "Robust Vision-Based Localization by Combining an Image-Retrieval System with Monte Carol Localization,", *IEEE Transactions on Robotics*, 21(2):208-216, Apr. 2005.
Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.
Wong, "EIED Online>> Robot Business", ED Online ID# 13114, 17 pages, Jul. 2006.
Yamamoto et al., "Optical Sensing for Robot Perception and Localization," 2005 IEEE Workshop on Advanced Robotics and its Social Impacts, pp. 14-17, 2005.
Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.
Yujin Robotics,"An intelligent cleaning robot," Retrieved from the Internet: URL<http://us.aving.net/news/view.php?articleId=7257>. 8 pages, accessed Nov. 2011.
Yun et al., "Image-Based Absolute Positioning System for Mobile Robot Navigation," IAPR International Workshops SSPR, Hong Kong, pp. 261-269, Aug. 2006.
Yun et al., "Robust Positioning a Mobile Robot with Active Beacon Sensors," *Lecture Notes in Computer Science*, 2006, vol. 4251, pp. 890-897, 2006.
Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.
Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.
Zhang et al., "A Novel Mobile Robot Localization Based on Vision," *SPIE* vol. 6279, 6 pages, Jan. 2007.
Written Opinion of the International Searching Authoirty, PCT/US2004/001504, dated Aug. 20, 2012, 9 pages.
Invitation to Pay Additional Fees, PCT/US2008/063174, dated Oct. 13, 2008, 6 pages.
International Search Report and Written Opinion in International Application No. PCT/US2008/063174, dated Feb. 18, 2009, 22 pages.
International Preliminary Report on Patentability in International Application No. PCT/US2008/063174, dated Nov. 19, 2009, 14 pages.
Office Action in JP Application No. 2014-137674, dated Mar. 9, 2015, 7 pages (English translation included).
Radio Frequency Identification: Tracking ISS Consumables, Author Unknown, 41 pages.
Miwako Doi "Using the symbiosis of human and robots from approaching Research and Development Center," Toshiba Corporation, 16 pages, available at http://warp.ndl.go.jp/info:ndljp/pid/258151/www.soumu.go.jp/johotsusin/policyreports/chousa/netrobot/pdf/030214_1_33_a.pdf, Feb. 26, 2003.
Popec.net Make your digital life http://v--'N'N.popco.net/zboard/view.php?id=tr_review&no=40 accessed Nov. 1, 2011.
Robotic Vacuum Cleaner—Blue website: http://www.shaperimage.com/us/en/catalog/productview.jhtml?sku=S1727BLU, accessed Mar. 18, 2005, 3 pages.
Everyday Robots "Everyday Robots: Reviews, Discussion and News for Consumers", www.everydayrobots.com/index.php?option=content&task=view&id=9, Apr. 20, 2005, 7 pages.
Zoombot Remote Controlled Vaccuum—RV-500 New Roomba 2, website: http://cgi.ebay.com/ws/eBayISAPI.d11?ViewItem&category=43526&item=4373497618&rd=1, accessed Apr. 20, 2005, 7 pages.
Examination report dated Jun. 9, 2011 for corresponding application JP 2010-507685.
Feature definition; Hitachi Appliances, Inc., retrieved from the World Wide Web at http://kadenfan.hitachi.co.jp/robot/feature/feature.html, accessed Nov. 19, 2008.
USPTO, Non-Final Office Action for U.S. Appl. No. 12/118,117, mailed Oct. 31, 2011, 35 pages.
USPTO, Non-Final Office Action for U.S. Appl. No. 13/245,095, mailed Nov. 23, 2011, 18 pages.
USPTO, Non-Final Office Action for U.S. Appl. No. 13/245,119, mailed Nov. 25, 2011, 18 pages.
Korean Intellectual Property Office, "English Translation of KIPO's Notice of Preliminary Rejection", issued on Apr. 13, 2012, Korean Patent Application No. 10-2011-7029801 (6 pages).
Kwon et al., "Table Recognition through Range-based Candidate Generation and Vision based Candidate Evaluation," /CAR 2007, The 13th International Conference on Advanced Robotics Aug. 21-24, 2007, Jeju, Korea, 918-923 (2007).
Extended European Search Report issued in European Application No. 15189554.7 on Feb. 5, 2016, 9 pages.
Office Action in JP Application No. 2014-252884, dated Dec. 1, 2015, 6 pages (with English translation).
Extended European Search Report issued in European Application No. 15201946.9 on May 6, 2016, 8 pages.
Notice of Opposition issued in European Application No. 12195256.8 on Jul. 20, 2016, 12 pages.

* cited by examiner

COMPACT AUTONOMOUS COVERAGE ROBOT

CROSS REFERENCE TO RELATED APPLICATIONS

This U.S. patent application is a continuation, and claims priority under 35 U.S.C. §120, from U.S. patent application Ser. No. 13/719,784, filed Dec. 19, 2011, entitled Compact Autonomous Coverage Robot, which is a continuation of U.S. patent application Ser. No. 13/245,118, filed Sep. 26, 2011, entitled Compact Autonomous Coverage Robot, which is a continuation of U.S. patent application Ser. No. 12/118,117, filed May 9, 2008 (now U.S. Pat. No. 8,239,992), which claims priority under 35 U.S.C. §119(e) to U.S. Provisional Application 60/938,699, filed on May 17, 2007 and U.S. Provisional Application 60/917,065, filed on May 9, 2007. The disclosure of each of these prior applications is considered to be part of the disclosure of this application and each of these prior applications is hereby incorporated by reference in its entirety.

The contents of U.S. Pre-grant Publications 2003/0192144, 2006/0200281, and 2007/0016328, and also U.S. Pat. Nos. 6,748,297 and 6,883,201 are hereby incorporated herein by reference in their entireties.

TECHNICAL FIELD

This disclosure relates to autonomous coverage robots for cleaning floors or other surfaces.

BACKGROUND

Autonomous robots are robots which can perform desired tasks in unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted.

Mobile robots for cleaning floors have been described in, for example, U.S. Pat. No. 6,883,201 to JONES et al. ("JONES"), which discloses an autonomous floor-cleaning robot that traverses a floor while removing debris using rotating brushes, vacuums, or other cleaning mechanisms. JONES further describes a robot having a generally round form factor supported by three wheels, which can rotate freely to maneuver around obstacles, inter alia.

SUMMARY

Presently disclosed is a compact mobile robot for cleaning floors, countertops, and other related surfaces, such as tile, hardwood or carpeted flooring. The robot has a rectangular front form factor that facilitates cleaning along wall edges or in corners. In one example, the robot includes both a rounded section and a rectangular section, in which a cleaning mechanism within the rectangular section is disposed proximally to opposite side corners of the rectangular section. As an advantage, the robot can maneuver so as to bring the rectangular section flush with a wall corner or wall edge, with the cleaning mechanism extending into the wall corner or wall edge.

In one aspect, an autonomous coverage robot includes a chassis having forward and rearward portions and a drive system carried by the chassis. The forward portion of the chassis defines a substantially rectangular shape. The robot includes a cleaning assembly mounted on the forward portion of the chassis and a bin disposed adjacent the cleaning assembly. The bin is configured to receive debris agitated by the cleaning assembly. A bin cover is pivotally attached to a lower portion of the chassis and configured to rotate between a first, closed position providing closure of an opening defined by the bin and a second, open position providing access to the bin opening. The robot includes a body attached to the chassis and a handle disposed on an upper portion of the body. A bin cover release is configured to control movement of the bin cover between its first and second positions. The bin cover release is actuatable from substantially near the handle.

Implementations of this aspect of the disclosure may include one or more of the following features. In some implementations, the bin cover release is configured to move between a first, locking position which locks the bin cover in its first, closed position and a second, disengaged position which allows the bin cover to move to its second, open position. The bin cover release may be a spring biased latch. In some examples, the bin cover release includes a button disposed on the handle configured to actuate the latch, thereby allowing actuation of the bin cover release while holding the handle. In some implementations, the drive system includes right and left differentially driven drive wheels rotatably mounted to the rearward portion of the chassis. The drive system is capable of maneuvering the robot to pivot in place.

In another aspect, an autonomous coverage robot includes a chassis having forward and rearward portions, and a drive system carried by the rearward portion of the chassis. The drive system is configured to maneuver the robot over a cleaning surface. The robot includes a controller in communication with the drive system. The controller is configured to maneuver the robot to pivot in place. The robot includes a cleaning assembly mounted on the forward portion of the chassis. The robot includes a bump sensor in communication with the controller which is configured to detect movement in multiple directions. A body is flexibly attached to the chassis and substantially covers the chassis. Contact with the body is translated to the bump sensor for detection. The controller is configured to alter a drive direction of the robot in response to a signal received from the bump sensor. The bump sensor includes a sensor base, a sensor shroud positioned adjacent the sensor base and connected to the body, an emitter housed by the sensor shroud, and at least three detectors carried by the sensor base. The emitter emits a signal onto the sensor base, and the detectors are configured to detect the emitted signal. Movement of the sensor shroud causes movement of the emitted signal over the detectors. In some implementations, the robot includes a bin disposed adjacent the cleaning assembly and configured to receive debris agitated by the cleaning assembly.

Implementations of this aspect of the disclosure may include one or more of the following features. In some implementations, the bump sensor detects 360 degrees of movement of the body about the bump sensor. Preferably, the bump sensor includes four detectors arranged in a rectangular configuration with respect to each other. The sensor shroud defines an orifice through which the emitter emits its signal onto the sensor base. The emitter comprises an infrared light emitter and the detectors comprise infrared light detectors, the orifice collimating the emitted signal onto the sensor base. In some examples, the robot includes a bumper guide configured to confine body movements to along two directions. The bumper guide may include two orthogonal grooves defined by the body and configured to receive a guide pin disposed on the chassis. The forward portion defines a substantially rectangular shape, in some examples. The drive system, in some examples, includes right and left drive wheels differentially driven by corresponding right and left motors.

In yet another aspect, an autonomous coverage robot includes a chassis having forward and rearward portions, and a drive system carried by the rearward portion of the chassis. The forward portion defines a substantially rectangular shape and the rearward portion of the chassis defines an arcuate shape. The drive system is configured to maneuver the robot over a cleaning surface and includes right and left drive wheels differentially driven by corresponding right and left motors. The robot includes a controller in communication with the drive system. The controller is configured to maneuver the robot to pivot in place. The robot includes a cleaning assembly mounted on the forward portion of the chassis. The robot includes an accelerometer in communication with the controller, which controls the drive system in response to a signal received from the accelerometer. In some implementations, the robot includes a bin disposed adjacent the cleaning assembly and configured to receive debris agitated by the cleaning assembly.

Implementations of this aspect of the disclosure may include one or more of the following features. In some implementations, the controller alters a drive direction of the robot in response to a signal received from the accelerometer indicating an abrupt speed change. The controller alters a drive direction of the robot in response to a signal received from the accelerometer indicating stasis of the robot. The controller reduces a drive speed of the robot in response to a signal received from the accelerometer indicating a maximum speed. In some examples, the maximum speed is between about 200 mm/s and about 400 mm/s.

Implementations of the above aspects of the disclosure may include one or more of the following features. In some implementations, the cleaning assembly includes a first roller brush rotatably mounted substantially near a front edge of the chassis. The cleaning assembly may include a second roller brush rotatably mounted substantially parallel to and rearward of the first roller brush, the first and second roller brushes rotate in opposite directions. The bin is disposed rearward of the first and second roller brushes and forward of the drive system. Each roller brush includes right and left end brushes extending from respective ends of the roller brush beyond a lateral extend of the body, each end brush extending at angle φ of between 0° and about 90° from a longitudinal axis defined by the roller brush. In other implementations, the cleaning assembly includes a front roller brush rotatably mounted substantially near the front edge of the chassis, and right and left side roller brushes rotatably mounted orthogonal to the front brush substantially near the respective right and left side edges of the chassis. The bin is disposed rearward of the front roller brush and substantially between the right and left side roller brushes and forward of the drive system.

In another aspect, an autonomous coverage robot includes a chassis having forward and rearward portions, and a drive system carried by the rearward portion of the chassis. The forward portion defines a substantially rectangular shape and the rearward portion defines an arcuate shape. The drive system is configured to maneuver the robot over a cleaning surface and includes right and left drive wheels differentially driven by corresponding right and left motors. The robot includes a controller in communication with the drive system. The controller is configured to maneuver the robot to pivot in place. The robot includes a cleaning assembly mounted on the forward portion of the chassis and includes a first roller brush rotatably mounted substantially near a front edge of the chassis and a second roller brush rotatably mounted substantially parallel to and rearward of the first roller brush. The first and second roller brushes rotate in opposite directions. A bin is disposed rearward of the cleaning assembly and is configured to receive debris agitated by the cleaning assembly. A bin cover is pivotally attached to a lower portion of the chassis and is configured to rotate between a first, closed position providing closure of an opening defined by the bin and a second, open position providing access to the bin opening. The robot includes a bin cover release configured to control movement of the bin cover between its first and second positions. A handle is disposed on the chassis. The bin cover release is actuatable from substantially near the handle. A body is flexibly attached to the chassis and substantially covers the chassis. The body is movable in relation to the handle and the chassis. The robot includes a bump sensor in communication with the controller and configured to detect movement in multiple directions. Contact with the body is translated to the bump sensor for detection. The controller is configured to alter a drive direction of the robot in response to a signal received from the bump sensor.

Implementations of this aspect of the disclosure may include one or more of the following features. In some implementations, the bump sensor includes a sensor base, a sensor shroud positioned adjacent the sensor base and connected to the body, an emitter housed by the sensor shroud, and at least three detectors carried by the sensor base. The emitter emits a signal onto the sensor base and the detectors detect the emitted signal. Movement of the sensor shroud causes movement of the emitted signal over the detectors.

In some implementations, the robot includes a bumper guide configured to confine body movements to along two directions. The bumper guide may include two orthogonal grooves defined by the body and configured to receive a guide pin disposed on the chassis.

The robot may include an idler wheel disposed on the bin cover. In some examples, the rearward portion of the chassis defines a substantially semi-circular shape and the idler wheel is position at least ⅓ the radius of the substantially semi-circular shaped rearward portion forward of the drive wheels.

In specific examples, the drive wheels are disposed less than 9 cm rearward of the cleaning assembly. The robot may include a power source disposed in the rearward portion of the chassis substantially between the right and left wheels. The power source is disposed adjacent and rearward of the bin. The cleaning assembly further comprises a brush motor configured to drive the first and second roller brushes. In some examples, the brush motor is disposed substantially near a forward edge of the chassis. The first roller brush may be disposed substantially near a forward edge of the chassis.

Implementations of the disclosure may include one or more of the following features. In some implementations, the right and left drive wheels are rotatably mounted to the rearward portion of the chassis, and the drive system is capable of maneuvering the robot to pivot in place. Preferably, the rearward portion of the chassis defines an arcuate shape; however other shapes are possible as well, such as rectangular or polygonal. In some examples, the rearward portion of the chassis defines a substantially semi-circular shape and the axes of the right and left drive wheels are disposed on or rearward of a center axis defined by the rearward portion of the chassis. In some implementations, the chassis and the body together have a length of less than 23 cm and a width of less than 19 cm.

In some implementations, the robot includes at least one proximity sensor carried by a dominant side of the robot. The at least one proximity sensor responds to an obstacle substantially near the body. The controller alters a drive direction in response to a signal received from the at least one proximity sensor.

In some implementations, the robot includes at least one cliff sensor carried by a forward portion of the body and arranged substantially near a front edge of the body. The at least one cliff sensor responds to a potential cliff forward of the robot. The drive system alters a drive direction in response to a signal received from the cliff sensor indicating a potential cliff. In some examples, right and left front cliff sensors are disposed at the respective right and left corners of a forward portion of the robot. This allows the robot to detect when a either of the front corners swing over a cliff edge, so as to avoid moving the drive wheels any closer to the cliff edge. In some implementations, the robot includes at least one cliff sensor carried by a rearward portion of the body and arranged substantially near the rear edge of the body. The at least one cliff sensor responds to a potential cliff rearward of the robot. The drive system alters a drive direction in response to a signal received from the cliff sensor indicating a potential cliff. In some examples, right and left rear cliff sensors are disposed directly rearward of the respective right and left drive wheels. This allow the robot to detect a cliff edge while driving in reverse at an angle or in an arc, in which the drive wheel may encounter the cliff edge before the rear center portion of the robot.

In some implementations, the robot includes an idler wheel disposed on the bin cover. Preferably, the rearward portion of the chassis defines a substantially semi-circular shape, which allows the robot to spin in place without catching any portion of the rearward portion of the chassis on a detected obstacle. The idler wheel is position at least ⅓ the radius of the substantially semi-circular shaped rearward portion forward of the drive wheels. In some examples, the idler wheel is a stasis detector including a magnet disposed in or on the idler wheel, and a magnet detector disposed adjacent the wheel for detecting the magnet as the idler wheel rotates.

In other more general aspects that are combinable with any of the above implementations, an autonomous coverage robot includes a chassis and a drive system carried by the chassis. The drive system is configured to maneuver the robot over a cleaning surface. In some examples, the drive system includes right and left differentially driven drive wheels; however other means of driving the robot are applicable as well, such as skid steer tracks. In some examples, the chassis has forward and rearward portions with the forward portion defining a substantially rectangular shape. Optionally, the rearward portion can define an arcuate shape.

In some implementations, the robot includes a cleaning assembly mounted on the forward portion of the chassis (e.g. substantially near a forward edge of the chassis). A bin is disposed adjacent the cleaning assembly and configured to receive debris agitated by the cleaning assembly. In some examples, a bin cover is pivotally attached to the robot and is configured to rotate between a first, closed position providing closure of an opening defined by the bin and a second, open position providing access to the bin opening.

In other examples, the bin cover is slidably attached to the robot and slides between the first, closed position and the second, open position.

In some implementations, a body is attached to the chassis. The body may conform to the profile of the chassis. In some examples, the body is flexibly or movably attached to the chassis. The robot may include a handle for carrying the robot. The handle can be disposed on the body or on the chassis. If the handle is disposed on the chassis, the body is allowed to move in relation to the handle and/or the chassis. The robot may include a bin cover release configured to control movement of the bin cover between its first and second positions. Preferably, the bin cover release is actuatable from substantially near the handle. However, the bin cover release may be actuatable from substantially near or on the bin cover.

In some implementations, the robot includes a bump sensor, which may be configured to detect movement in multiple directions. In some examples, contact with the body is translated to the bump sensor for detection. The robot may include a controller configured to alter a drive direction of the robot in response to a signal received from the bump sensor. In some examples, the robot includes an accelerometer in communication with the controller, such that the controller controls the drive system in response to a signal received from the accelerometer.

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
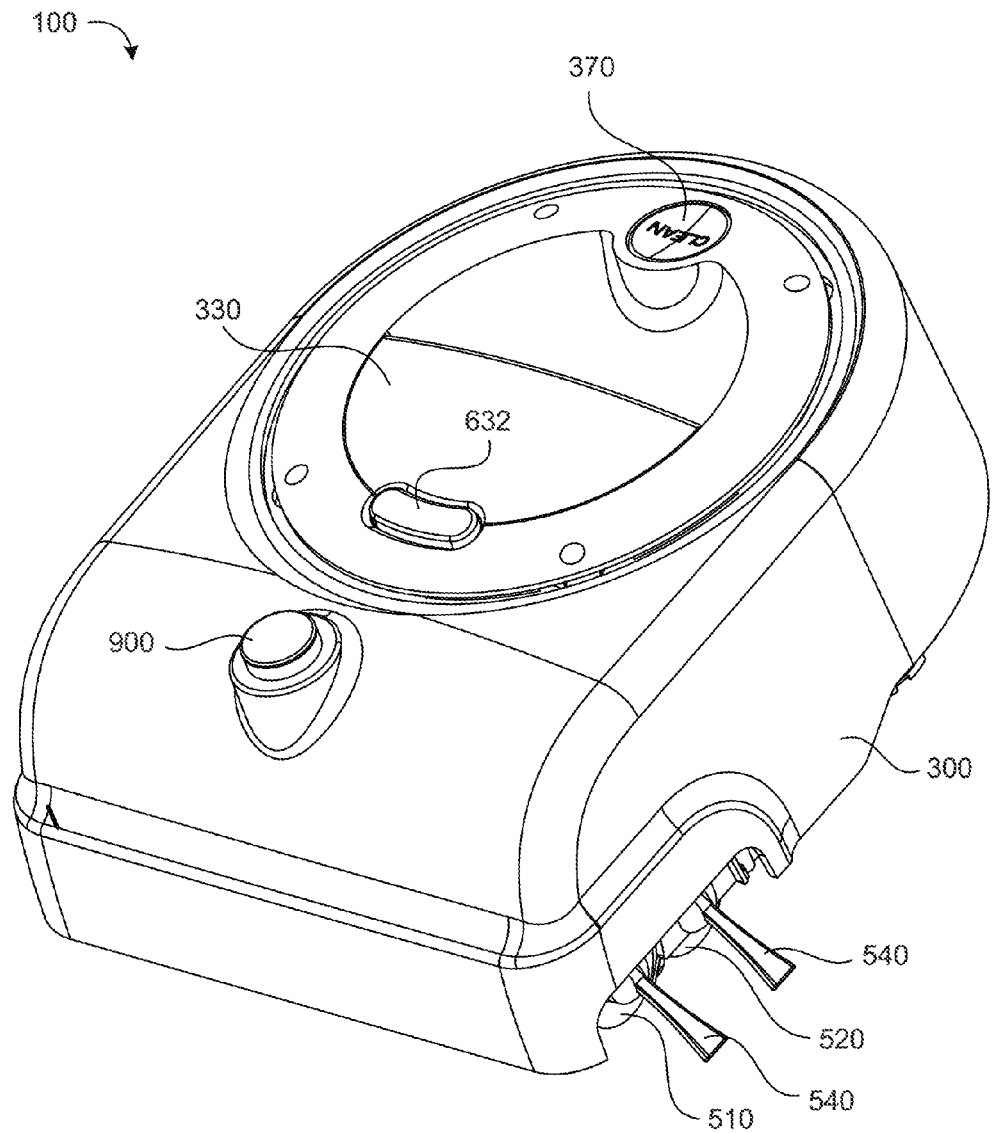
FIG. 1 is a top perspective view of a compact autonomous coverage robot.
Figure 2:
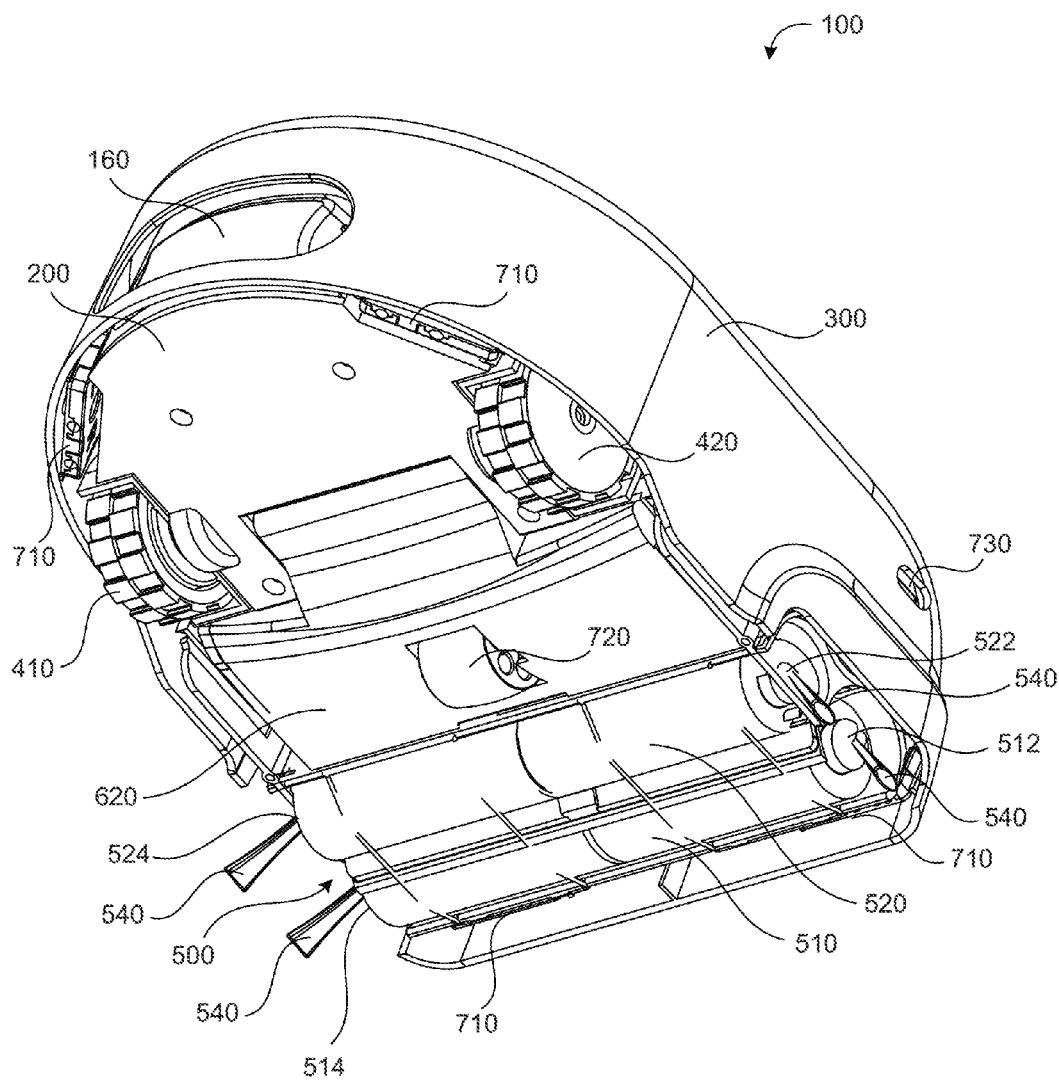
FIG. 2 is a bottom perspective view of the robot shown in FIG. 1.
Figure 3:
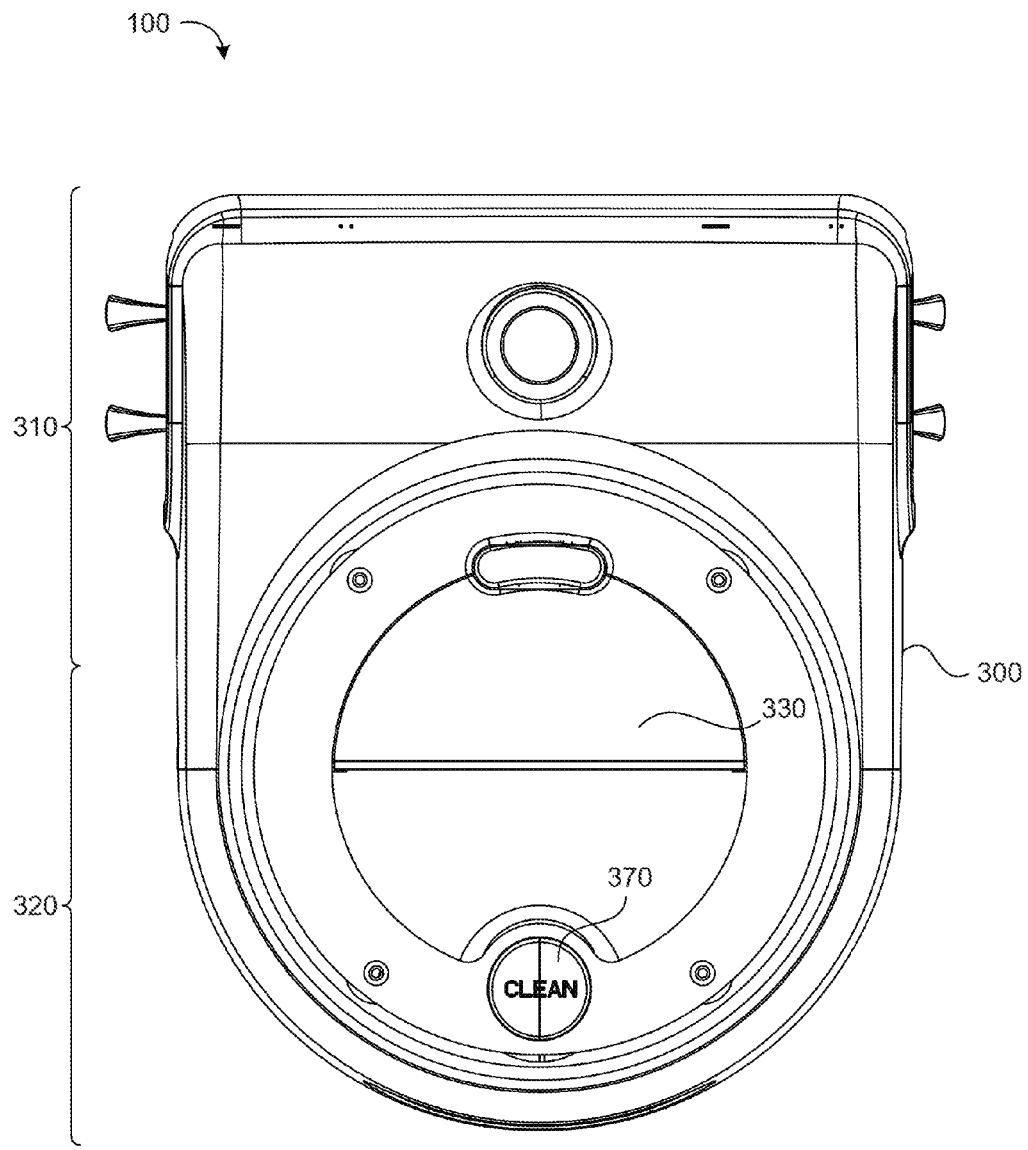
FIG. 3 is a top view of the robot shown in FIG. 1.

Referring to FIGS. 1-3, an autonomous coverage robot 100 includes a chassis 200 having a forward portion 210 and a rearward portion 220. The forward portion 210 of the chassis 200 defines a substantially rectangular shape. In the example shown, the rearward portion 220 of the chassis 200 defines an arcuate shape (e.g., in the example shown the rearward portion 220 is rounded); however, the rearward portion 220 may define other shapes as well, such as, but not limited to, rectangular, triangular, pointed, or wavy shapes.

Figure 5:
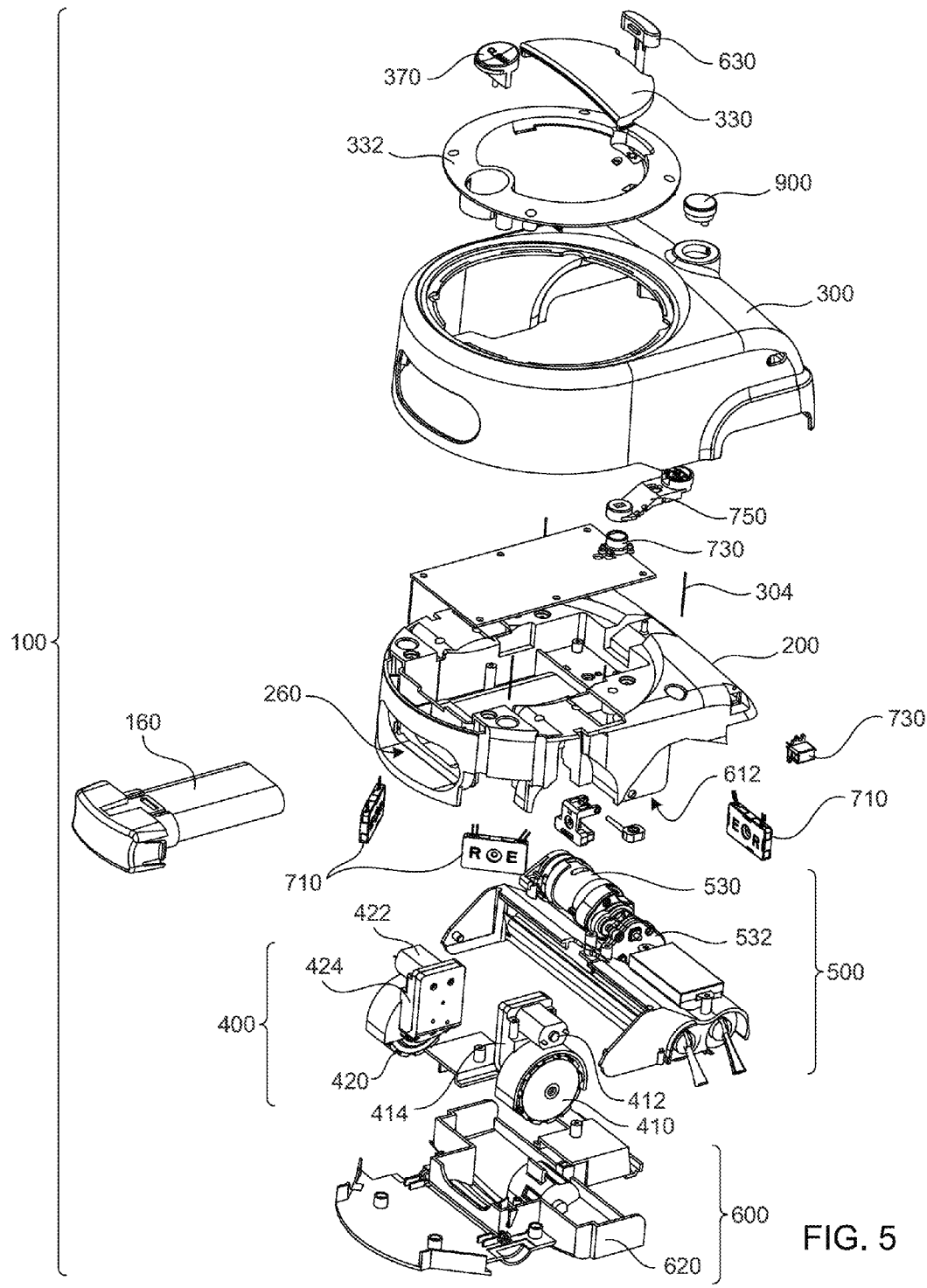
FIG. 5 is an exploded view of the top aspect shown in FIG. 1.
Figure 6:
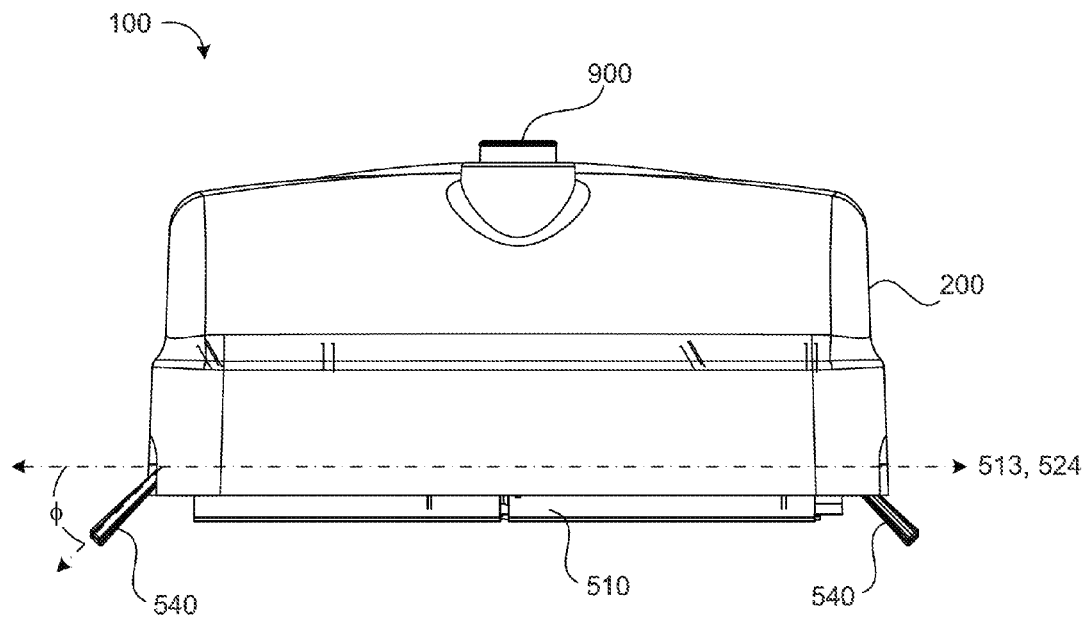
FIG. 6 is a front view of the robot shown in FIG. 1.
Figure 7:
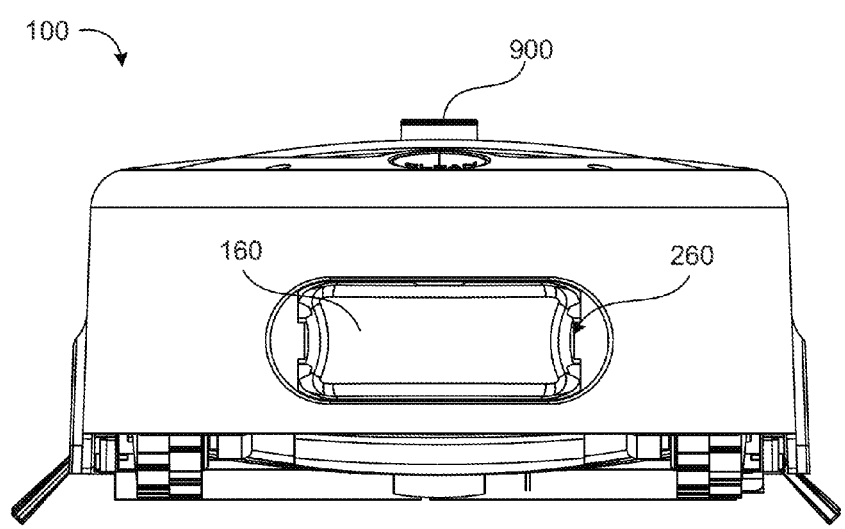
FIG. 7 is a rear view of the robot shown in FIG. 1.

Referring to FIGS. 1 and 5, the robot 100 includes a body 300 configured to substantially follow the contours of the chassis 200. The body 300 may be flexibly connected to the chassis 200 (e.g., by a spring or elastic element), so as to move over the chassis 200. In some examples, a handle 330 is disposed on or defined by an upper portion of the body 300. In other examples, the handle 330 is secured to or extends from a mounting piece 332, which is secured to an upper portion 205 of the chassis 200. The mounting piece 332 can be removable and interchangeable with other mounting pieces 332 that have different arrangements or carry other components (e.g., different handles 330 and/or sensors). The body 300 moves with respect to the mounting piece 332 and the chassis 200. In the example shown, the body 300 floats below the mounting piece 332. The mounting piece 332 can by circular and sized to be offset from a respective opening defined by an upper portion (305) of the body 300, so as to provide a 360° displacement limit for body movement (e.g., 2-4 mm of bumper movement) due to contact with the body (e.g., along a lower portion 303 of the body 300 (see FIG. 8). The robot 100 (including the chassis 200 and the body 300) has a compact footprint with a length of less than 23 cm and a width of less than 19 cm.

Figure 4:
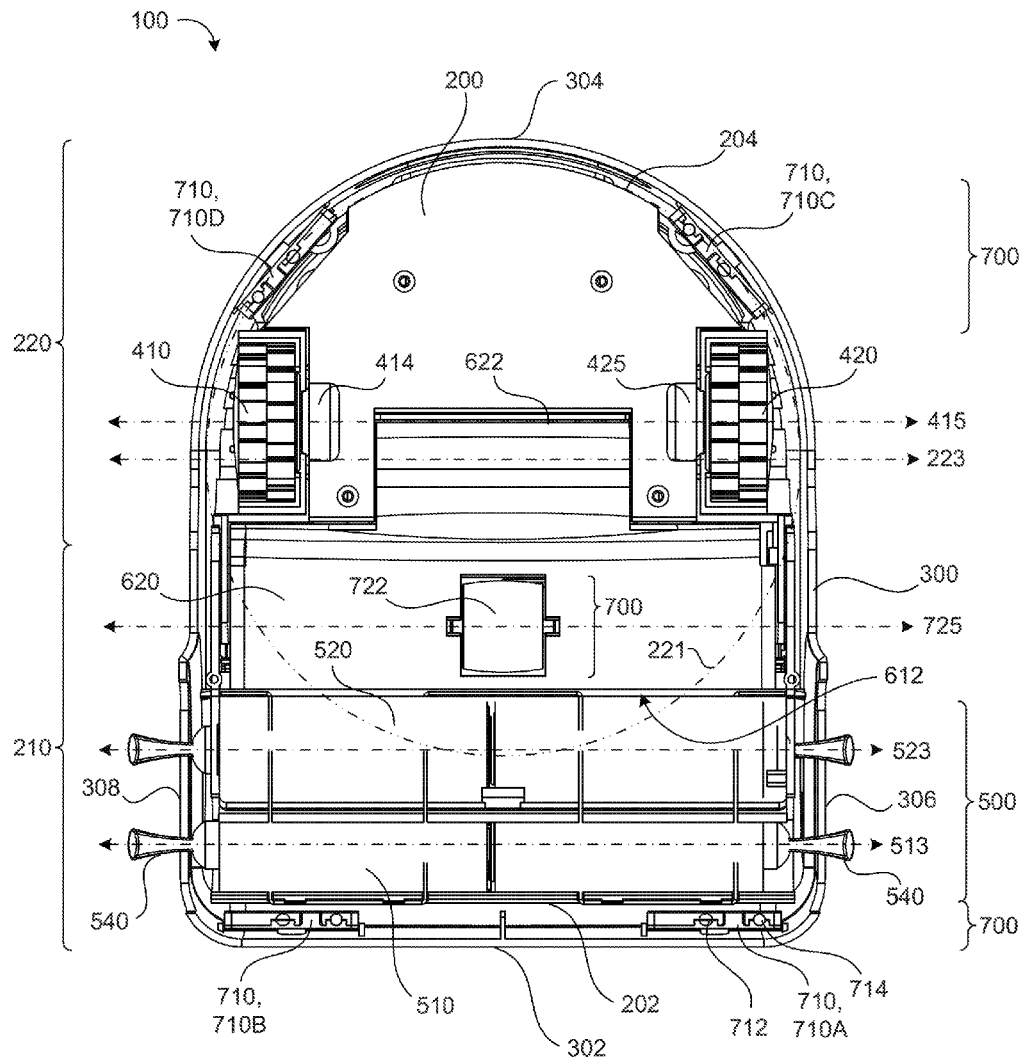
FIG. 4 is a bottom view of the robot shown in FIG. 1.

Referring to FIGS. 4 and 5, the robot 100 includes a drive system 400 carried by the chassis 200 and configured to maneuver the robot 100 over a cleaning surface. In the example shown, the drive system 400 includes right and left drive wheels 410 and 420, respectively, which are differentially driven by corresponding right and left drive motors 412 and 422, respectively. The drive motors 412, 422 are mounted above their respective drive wheels 410, 420, in the example shown, to help maintain the compact footprint of the robot 100. However, other implementations include having the drive motors 412, 422 mounted adjacent (e.g., co-axially with) their respective drive wheels 410, 420. In some examples, the robot includes a gear box 414, 424 coupled between the drive wheel 410, 420 and its respective drive motor 412, 422. The gear boxes 414, 424 and the drive motors 412, 422 are configured to propel the robot at a maximum velocity of between about 200 mm/s and about 400 mm/s (preferably 306 mm/s) and a maximum acceleration of about 500 mm/s$^2$. In some implementations, the center axles of the drive wheels 410, 420 are disposed less than 9 cm (preferably 8 cm) rearward of a cleaning assembly 500, which will be described below. The robot 100 includes a controller 450 in communication with the drive system 400. The controller 450 is configured to maneuver the robot 100 to pivot in place.

The advantage of the conventional cylindrical robot with drives wheels disposed on the diameter of the robot is that it is not hindered from turning in the presence of obstacles. This enables a simple and effective escape strategy—spin in place until no objects are detected forward of the robot. If the robot is non-cylindrical or the axes of wheel rotation are not on a diameter of the robot then the normal and tangential forces on the robot change as the robot rotates while in contact with an object. To ensure that such a non-conventional robot is able to escape an arbitrary collision, the forces and torques applied to the robot by the environmental cannot combine with the robot-generated forces and torques to halt robot motion. In practice this means that the robot shape should be constant width (to within the shell compliance distance) and that the robot's wheels be capable of lateral motion. Particular shapes then yield different requirements for maximum lateral wheel forces and maximum allowable environmental coefficient of friction. However, the robot 100 presently disclosed, in some examples, has a rectangular forward portion 210 to allow cleaning fully into corners.

Referring again to the example shown in FIG. 4, a profile circle 221 defining the substantially semi-circular profile of the rearward portion 220 of the chassis 200 extends into the forward portion 210 of the chassis 200 and has a center axis 223. The drive wheels 410, 420 are positioned on or substantially near the center axis 223 of the profile circle 221. In the example shown, the drive wheels 410, 420 are positioned slightly rearward of the center axis 223 of the profile circle 221. By positioning the drive wheels 410, 420 on or rearward of the center axis 223 of the profile circle 221, the robot 100 can turn in place without catching rearward portion 220 of the chassis 200 on an obstacle.

Referring to FIGS. 2, 4 and 5-9, the robot 100 includes a cleaning assembly 500 mounted on the front portion 210 of the chassis 200 substantially near a front edge 202 of the chassis 200. In the examples shown, the cleaning assembly 500 includes first and second roller brushes 510, 520 rotatably mounted substantially parallel to each other. The roller brushes 510, 520 are driven by a cleaning motor 530 coupled to a middle portion of the roller brushes 510, 520 by a gear box 532. The cleaning motor 530 is positioned above the roller brushes 510, 520 to confine the cleaning assembly 500 to the forward portion 210 of the chassis 200 and to help maintain a compact robot with a relatively small footprint.

Each roller brush 510, 520 may include an end brush 540 disposed at each longitudinal end 512, 514, 522, 524 of the roller brush 510, 520. Each end brush 540 is disposed at an angle ϕ with a longitudinal axis 513, 523 defined by the roller brush 510, 520 of between 0° and about 90° (preferably 45°). The end brush 540 extends beyond the chassis 200 and the body 300 (e.g., beyond respective right and left side edges 306, 308) to agitate debris on or along objects adjacent the robot 100 (e.g., to clean up against walls). Other implementations of the cleaning assembly 500 will be discussed later with reference to another implementation of the robot 100.

Referring to FIGS. 1-5, 8, and 10, the robot 100 includes a bin assembly 600 disposed adjacent the cleaning assembly 500 and configured to receive debris agitated by the cleaning assembly 500. In some examples, the chassis 200 defines a debris chamber or bin 610 (see FIG. 10). In other examples, a bin 610 is disposed below the chassis and positioned to receive debris agitated by the cleaning assembly 500. In the examples shown, the bin 610 is positioned substantially between the cleaning assembly 500 and the drive system 400. Specifically, the bin 610 is forward of the drive wheels 410, 420 and rearward of the roller brushes 510, 520.

Preferably, the debris chamber/bin 610 is defined by, and thus formed integrally with, the chassis 200. In an alternative configuration, the robot 101 may include a modular, removable cartridge or bag serving as the debris chamber/bin 610, such that the user can remove the debris by removing and emptying the cartridge or bag. The cartridge or bag 610 is removably secured to the chassis 200.

A bin cover 620 is pivotally attached to a lower portion 203 of the chassis 200 and configured to rotate between a first, closed position providing closure of an opening 612 defined by the bin 610 and a second, open position providing access to the bin opening 610. In some examples, the bin cover 620 is releasably connected to the chassis 200 by one or more hinges 622. The bin assembly 600 includes a bin-cover release 630 configured to control movement of the bin cover 620 between its first and second positions. The bin-cover release 630 is configured to move between a first, locking position which locks the bin cover 620 in its first, closed position and a second, disengaged position which allows the bin cover 620 to move to its second, open position (see FIG. 8). The bin-cover release 630 is actuatable from substantially near or at the handle 330, thereby allowing actuation of the bin-cover release 630 while holding the handle 330. This allows a user to pick up the robot 100 via the handle 330 with one hand, hold the robot 100 over a trash bin (not shown), and actuate the bin-cover release 630 with the same hand holding the handle 330 to release the bin cover 620 and empty the contents of the bin 610 into the trash bin. In some implementations, the bin cover release 630 is a spring biased latch or latching button attractable by pressing downwardly (e.g., button) or pulling upwardly (e.g., trigger).

Figure 8:
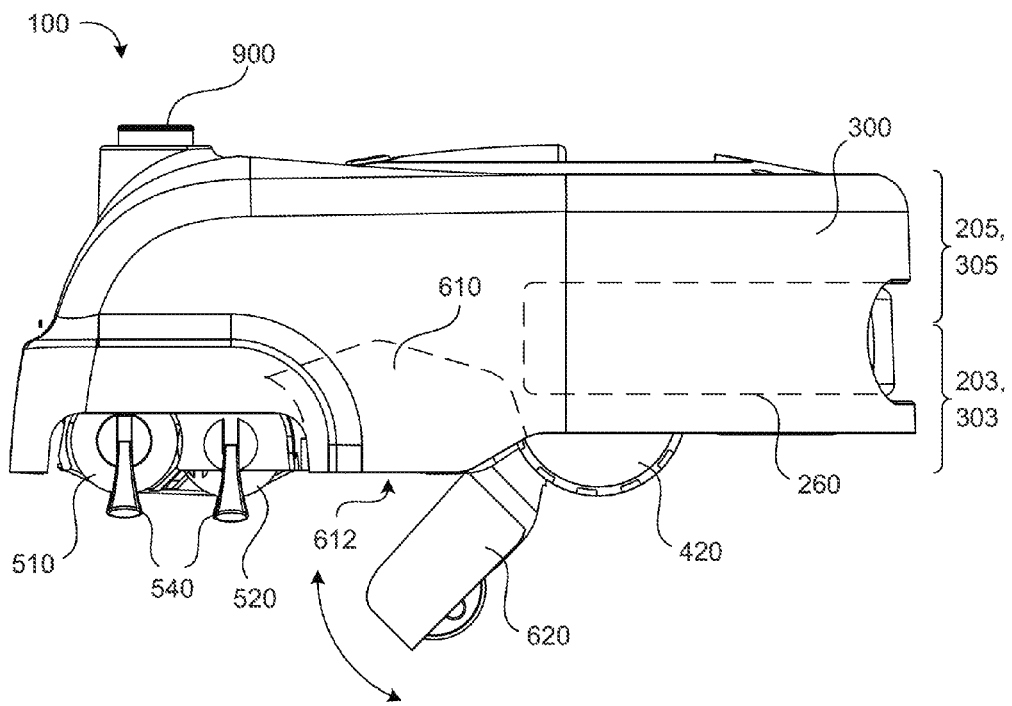
FIG. 8 is a left side view of the robot shown in FIG. 1 with a bin cover in its open position.

The robot 100 includes a power source 160 (e.g., battery) in communication with the drive system 400 and/or the controller 450, and removably secured to the chassis 200. In the examples shown in FIGS. 2, 4, 5, and 7-8, the power source 160 is received by a power receptacle 260 defined by the rearward portion 220 of the chassis 200. In some examples, the power source 160 is positioned substantially under the controller 450 and between the right and left drive wheels 410, 420, while extending forward to a distance sufficient to place a center of gravity of the robot 100 substantially at the center of the chassis 200 or substantially between a first transverse axis 415 defined by the drive wheels 410, 420 and a second transverse axis 425 defined by a free-wheel 722 (e.g., stasis wheel 722) (see FIG. 4). If the weight of the power source 160 is positioned too far rearward, there will not be enough weight over the cleaning assembly 500, allowing the forward portion 210 of the chassis 200 to tip upward. As being a compact robot 100 with a relatively small footprint, the arrangement of components on and within the chassis 200 is important to achieve the compact size of the robot 100 while remaining functional. Referring to FIGS. 5 and 8, the debris chamber/bin 610 impedes the forward placement of the power source 160 (e.g., the power source 160 is limited to positioning in the rearward portion 210 of the chassis 200). Nevertheless, the power source 160 is positioned between the drive wheels 410, 420 and as far forward as possible, substantially abutting the bin 610, so as to place the center of gravity of the robot forward of the first transverse axis 415 defined by the drive wheels 410, 420. By placing the center of gravity forward of the drive wheels 410, 420, the robot 100 is less likely to tip up and backwards (e.g., when going over thresholds).

Referring to FIGS. 1-11, the robot 100 includes a navigational sensor system 700 in communication with the controller 450 that allows the robot 100 to be aware of its surroundings/environment and react in prescribed manners or behaviors according to its sensed perception of its surroundings/environment. A description of behavior control can be found in detail in Jones, Flyun & Seiger, Mobile Robots: Inspiration to Implementation second edition, 1999, AK Peters, Ltd., the text of which is hereby incorporated by reference in its entirety. The navigational sensor system 700 includes one or more cliff sensors 710, a stasis detector 720, a proximity sensor 730, at least one bump sensor 800, and/or an omni-directional receiver 900. Using input from the navigational sensor system 700, the controller 450 generates commands to be carried out by the robot 100. As a result, the robot 100 is capable of cleaning surfaces in an autonomous fashion.

The cliff sensors 710 may be used to sense when the robot 100 has encountered the edge of the floor or work surface, such as when it encounters a set of stairs. The robot 100 may have behaviors that cause it to take an action, such as changing its direction of travel, when an edge is detected. In the examples shown in FIGS. 2, 4, 5, and 10, the body 300 of the robot 100 houses four cliff sensors 710 along a perimeter of the body 300, with two cliff sensors 710 substantially along a front edge 302 of a forward portion 310 of the body 300 (preferably near forward outer corners or lateral edges) and two cliff sensors 710 substantially along a rearward edge 304 of a rearward portion 320 of the body 300 (preferably near rearward outer corners or lateral edges) (see FIG. 4). Each cliff sensor 710 includes an emitter 712 that sends a signal and a receiver 714 configured to detect a reflected signal. In some implementations, cliff sensors 1074 may be installed within a mounting apparatus that stabilizes and protects the sensor and which positions the sensor to point towards the window installed onto the bottom of the mounting apparatus. Together the sensor, the mounting apparatus and the window comprise a cliff sensor unit. Reliability of the cliff sensor 710 may be increased by reducing dust buildup. In some implementations, a window may be installed on the bottom of the mounting apparatus which includes a shield mounted within a slanted molding composed of a material which prevents dust build up, such as an antistatic material. The shield component and the molding may be welded together. To further facilitate the reduction in dust and dirt buildup, the shield may be mounted on a slant to allow dirt to more easily slide off. In some implementations, a secondary cliff sensor 710 may be present behind existing cliff sensors 710 to detect floor edges in the event that a primary cliff sensor 710 fails.

Robots defining shapes of constant width can turn in place about their centroid locus of the respective shape. A shape of constant width is a convex planar shape whose width, measured by the distance between two opposite parallel lines touching its boundary, is the same regardless of the direction of those two parallel lines. The width of the shape in a given direction is defined as the perpendicular distance between the parallels perpendicular to that direction. The Reuleaux triangle is the simplest example (after the circle) of shapes of constant width. However, in the examples shown, the robot 100 has a rectangular shaped forward portion 210 of the chassis 200, and thus not a robot of constant width, which can prevent the robot from spinning in place to escape from various stuck positions, such as with canyoning situations, inter alia. Canyoning situations arise when the robot 100 drives down a narrow corridor (with side walls) or plank (with side cliffs) that is slightly wider than the robot 100. When the robot 100 reaches the end of the corridor or plank it can only escape by driving in reverse back out of the corridor or off of the plank. If the robot 100 tries to spin in place (e.g., to rotate 180°) one of the robot's corners will hit a wall or go off a cliff. In the case of cliffs, the placement of cliff sensors 710 substantially along a rearward edge 304 of the body 300 or a rearward edge 204 of the chassis 200 allows the robot 100 to backup intelligently to escape without backing off a cliff. Similarly, the bump sensor 800, which will be described below, detects reward bumps, allowing the robot 100 to back out of narrow corridors.

Referring to FIGS. 2, 4, 5 and 11A, the stasis detector 720 indicates when the robot 100 is moving or stationary. In the examples shown, the stasis detector 720 includes a stasis wheel 722 with a magnet 724 either embedded in or disposed on the wheel 722. A magnetic receiver 726 (e.g., inductor) is position adjacent the wheel 722 to detect the magnet 724 moving past. The magnetic receiver 726 provides an output signal to the controller 450 that indicates when the magnet 724 moves past the magnetic receiver 726. The controller 450 can be configured to determine how fast and far the robot 100 is traveling based on the output signal of the magnetic receiver 726 and the circumference of the stasis wheel 722. In other implementations, the stasis detector 720 includes a stasis wheel 722 with circumferential surface having at least two different reflective characteristics (e.g., white and black). A stasis emitter and receiver pair (e.g., infrared) is disposed adjacent the stasis wheel 722. The stasis emitter is configured to emit a signal onto the circumferential surface of the stasis wheel 722, and the stasis receiver is configured to detect or receive a reflected signal off of the circumferential surface of the stasis wheel 722. The stasis detector 720 monitors the transitions between reflection states and non-reflection states to determine if the robot 100 is moving, and perhaps even the rate of movement.

Again due to the compact nature of the robot 100 and the compact positioning of components, the stasis wheel 722 acts as a third wheel for stable ground contact. If the stasis wheel 722 was placed forward of the cleaning assembly 500, it would need to be a caster wheel, rather than a directional wheel, which would drag in an arc when the robot 100 turns. However, the need for a rectangular forward portion 210 of the chassis 200, so as to fully clean in corners, prohibits placement of the stasis wheel 722 forward of the cleaning assembly 500 (e.g., which would result in a shape other than rectangular). A wheel is needed forward of the drive wheels 410, 420 to lift the forward portion 210 of the chassis 200 to an appropriate height for cleaning and brush rotation.

Referring to again FIG. 4, the stasis wheel 722 is disposed in the bin cover 620, just rearward of the cleaning assembly 500 and forward of the drive system 400 and the power source 160. The stasis/idler wheel 722 is positioned forward of the drive wheels 410, 420, forward of the center axis 223 of the profile circle 221, and within the profile circle 221. This positioning of the stasis wheel 722 allows the robot 100 to turn in place without substantially dragging the stasis wheel 722 across its rolling direction, while also providing support and stability to the forward portion 210 of the chassis 200. Preferably, the stasis wheel 722 is positioned at least ⅓ the radius of the center axis 223. The forward positioning of the stasis wheel 722 and the power source 160 is obstructed by the cleaning assembly 500. As a result, decreasing the size of the cleaning assembly 500 would allow further forward placement of the stasis wheel 722 and the power source 160 or a decrease in the overall length of the robot 100.

Figure 11A:
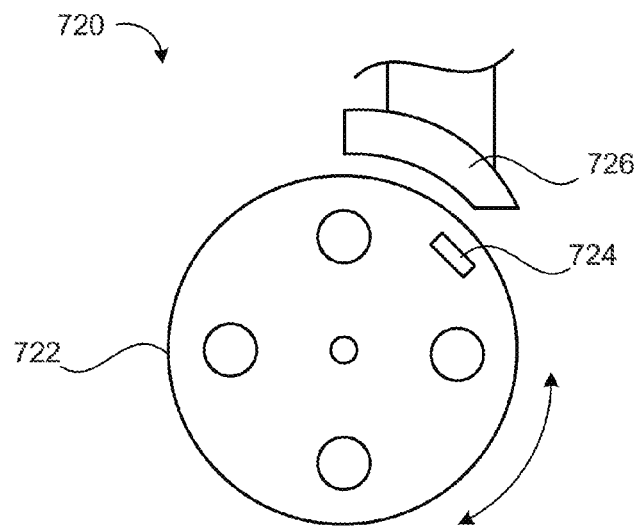
FIG. 11A is a side view of a stasis detector.
Figure 11B:
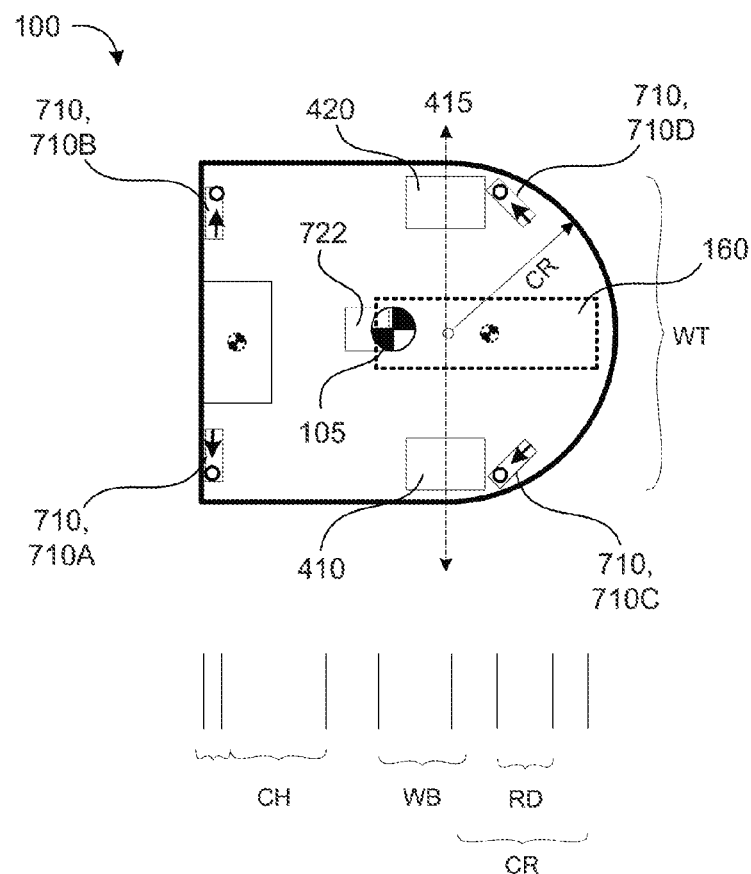
FIG. 11B is a top schematic view of a compact autonomous coverage robot.
Figure 11C:
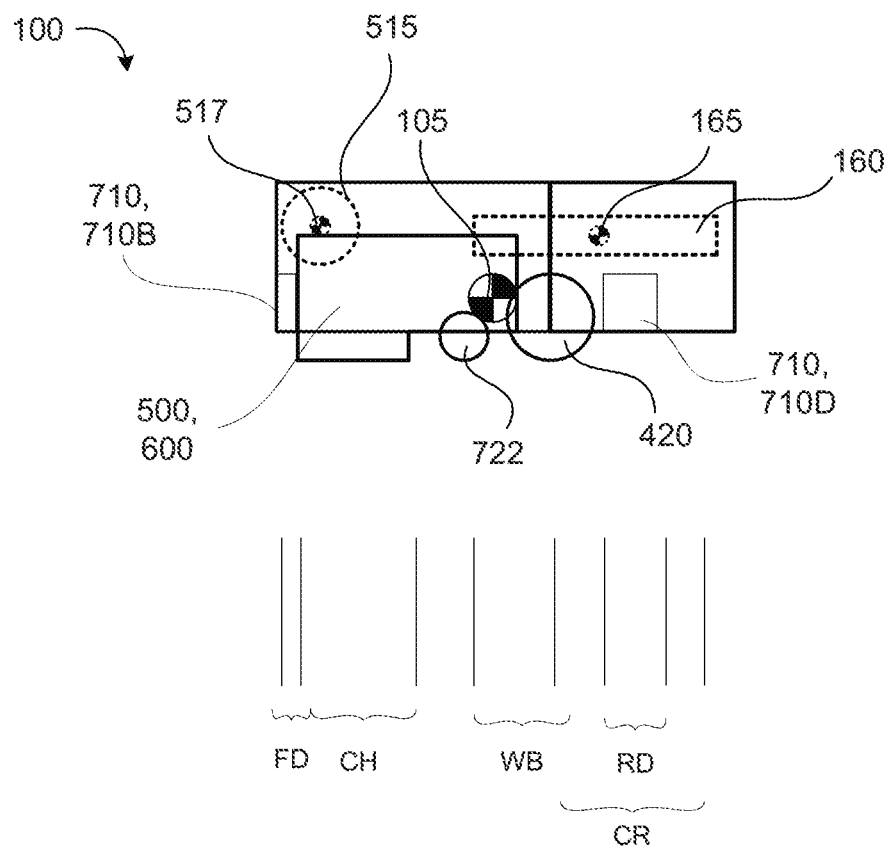
FIG. 11C is a side schematic view of a compact autonomous coverage robot.

The examples shown in FIGS. 11B-11C illustrate the placement of components in the robot 100 to achieve a compact morphology as well as stability for movement. Where LD=flat cliff detector 710 A, 710B thickness, CH=cleaning head 500 front-to-back length, WB=wheelbase, RD=angled cliff detector 710C, 710D front to back length, WT=Wheel Track, and CR=circular radius (>½ wheel track), the tombstone shaped robot 100 has a length that is: 1) greater than LD+CH+WB+CR and 2) Equal to or less than 1.4 CR, where 3) RD<½ CR, WB>⅓ CR, CG is within WB. The placement of the components to satisfy the above relationship places the center of gravity 105 of the robot forward of the drive wheels 410, 420 and within the circular radius CR. The figures also illustrate the placement of two of the heaviest components, which include the power source 160 having a center of gravity 165 and the brush motor 515 having a center of gravity 517. The brush motor 515 is positioned as far forward as possible to place its center of gravity 517 as far forward as possible, so as to offset the weight of the power source 160. Similarly, the power source 160 is positioned as far forward as possible to place its center of gravity 165 as far forward as possible as well. However, forward placement of the power source 160 is generally obstructed by the cleaning assembly 500 and the bin 610.

Figure 9:
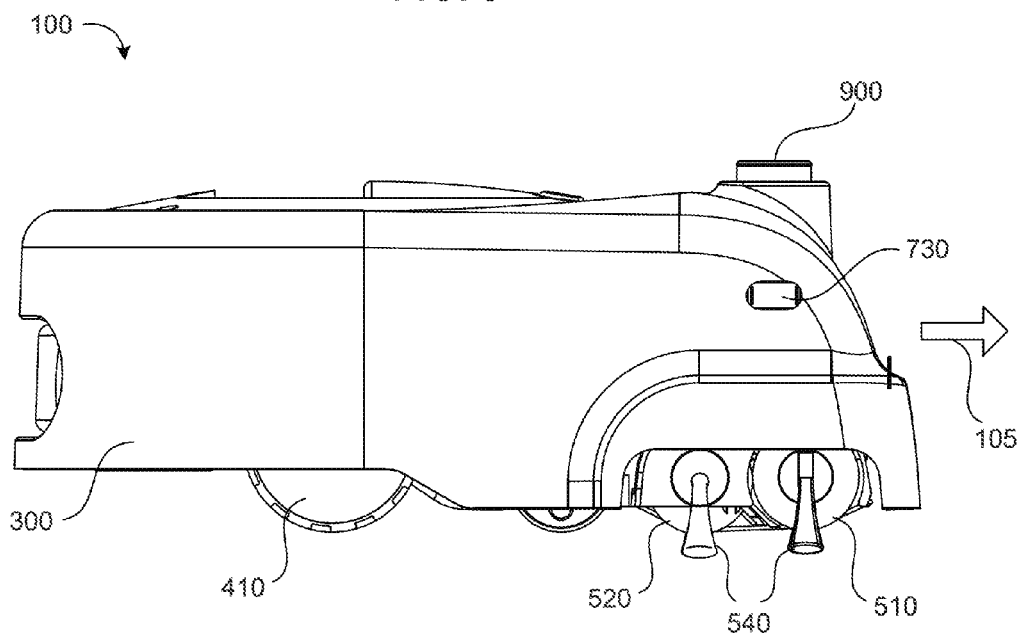
FIG. 9 is right side view of the robot shown in FIG. 1.

Referring to FIGS. 1, 5 and 9, the proximity sensor 730 may be used to determine when an obstacle is close to or proximate the robot 100. The proximity sensor 730 may, for example, be an infrared light or ultrasonic sensor that provides a signal when an object is within a given range of the robot 100. In the examples shown, the proximity sensor 730 is disposed on a side (e.g., right side) of the robot 100 for detecting when an object, such as a wall, is proximate that side.

In a preferred implementation, as shown, the side of the robot 100 having the proximity sensor 730 is the dominant side of the robot 100, which in this case is the right-hand side relative to a primary direction of travel 105. In some examples, the wall proximity sensor 730 is an infrared light sensor composed of an emitter and detector pair collimated so that a finite volume of intersection occurs at the expected position of a wall. This focus point is approximately three inches ahead of the drive wheels 410, 420 in the direction of robot forward motion. The radial range of wall detection is about 0.75 inches. The proximity sensor 730 may be used to execute wall following behaviors, examples of which are described in U.S. Pat. No. 6,809,490, the entire contents of which is hereby incorporated by reference in its entirety.

In some implementation, the proximity sensor 730 includes an emitter and a detector disposed substantially parallel. The emitter has an emission field projected substantially parallel to a detection field of the detector. The proximity sensor 730 provides a signal to the controller 450, which determines a distance to a detected object (e.g., a wall). The proximity sensor 730 needs to be calibrated to accurately detect and allow the controller 450 to determine an object distance. To calibrate the proximity sensor 730 to the albedo (e.g., color or reflectivity) of an adjacent object, the robot 100 bumps into the object on its dominant side and records a reflection characteristic. In the example of an infrared emitter and detector, the controller 450 records a reflection intensity at the moment of contact with the object, which is assumed to be a wall. Based on the recorded reflection intensity at the known calibration distance between the edge of the body 300 and the proximity sensor 730, the controller 450 can determine a distance to the wall thereafter while driving alongside the wall. The controller 450 can implement servo control on the drive motors 412, 422 to drive at a certain distance from the wall, and hence wall follow. The robot 100 may periodically turn into the wall to side-bump the wall and re-calibrate the proximity sensor 730. If the proximity sensor 730 senses an absence of the wall, the robot 100 may decide to re-calibrate the proximity sensor 730 upon recognition of the wall again.

The robot 100 can actively wall follow on its dominant side by using the proximity sensor 730. The robot 100 can passively wall follow on its non-dominant side (or the dominant side if the proximity sensor 730 is not present or active). After bumping into an object (e.g., sensed by the bump sensor 800), the robot 100 can assume that the object is a wall and turn to follow the wall. The robot 100 may back-up before turning, so as to not catch a front corner of the body 300 on the object/wall, thus re-triggering the bump sensor 800 in a forward direction. After turning (e.g., about 90°), the robot 100 drives straight (e.g., along the wall) and slightly turns into the wall, so as to scrape along the wall. The robot 100 can sense that it's scraping along the wall by detecting a side-bump via the multi-directional bump sensor 800, which will be described below. The robot 100 can continue to passively wall follow until the bump sensor 800 no longer detects a side-bump on the current wall-following side of the robot 100 for a certain period of time.

Figure 12A:
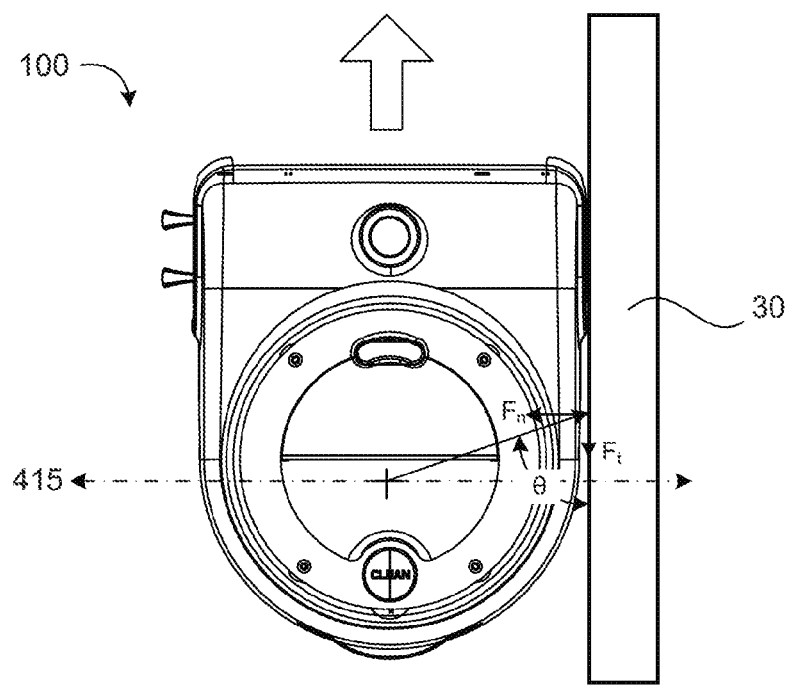
FIG. 12A is a top view of a compact autonomous coverage robot scraping along a wall.

The robot 100 can passively wall follow due in-part to its flat sides of the body 300 and the rear placement of the drive wheels 410, 420. The flat sides allow the robot 100 to scrape along the wall (e.g., substantially parallel to the wall). The positioning of the drive wheels 410, 420 in the rear portion 220 of the chassis 200 allows the robot 100 to swing its forward portion 210 of the chassis 200 into the wall, so as to scrape along the wall. Referring to FIG. 12A, the robot 100 moving forward while in contact with a wall 30 is subject to two forces—a force normal to the wall, $F_n$, and a force tangential to the wall, $F_t$. These forces create opposing torques about a point midway between the wheels, the natural center of rotation of the robot. It can be shown that the torque, $\tau$, is:

$$\tau = rF(\cos\theta \sin\theta - \mu \sin^2\theta)$$

Where $\mu$ is the coefficient of friction between the wall and the robot. Given a value for $\mu$ there is some critical angle $\theta_c$ where the torques are balanced. For $\theta < \theta_c$ the first term to the right in the equation is larger and the robot tends to align with the wall. If $\theta > \theta_c$ then the second term is larger and the robot 100 tends to turn into the wall.

Certain robot geometries, such as the tombstone shape of the robot disclosed can achieve useful values for $\theta_c$. Note that the standard cylindrical geometry has $\theta_c = \pi/2$ regardless of the robot's approach angle to the wall. Thus, passive wall following cannot be achieved with this configuration. To successfully passively wall follow, the offset between the natural axis of robot rotation and the contact point with the wall should be as far forward as possible when robot motion is aligned with the wall. Also, the maximum wall step height that allows passive recovery is an important consideration and is affected by robot shape.

In some examples, the robot 100 can semi-passively wall follow. The robot 100 wall follows on its dominant side, which has the side proximity sensor 730. After detecting an object, assumed to be a wall, by either the bump sensor 800 or the proximity sensor 730, the robot 100 turns to align the dominant side of the robot 100 with the assumed wall. The robot 100 then proceeds to drive along the wall while turning slightly into the wall so as to scrape along the wall. The robot 160 maintains contact with the wall by sensing contact with the wall via the bump sensor 800 or the proximity sensor 730 and the controller 450 implements servo control or the drive motors 412, 422 to drive accordingly along the wall.

Figure 12B:
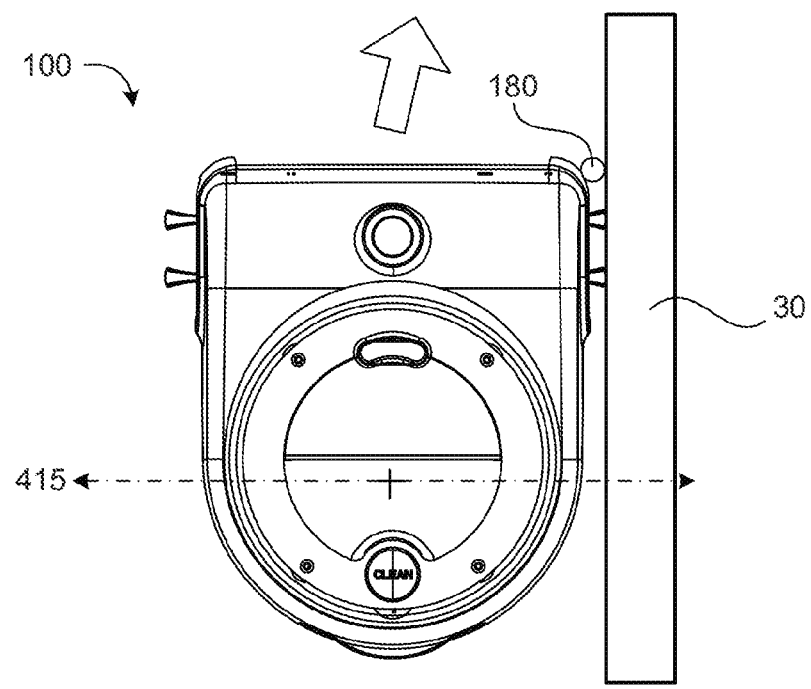
FIG. 12B is a top view of a compact autonomous coverage robot bumping a wall.

In some examples, as shown in FIG. 12B, the robot 100 includes a contact element 180 (e.g., a roller, bearing, bushing, or soft contact point) disposed at one or both of the front corners of the robot 100 to aid wall following. Preferably, the contact element 180 is at least disposed on the front corner of the dominant side of the robot 100. As the robot 100 moves along the wall, it contacts the will with the contact element 180, instead of merely scraping along the wall. In some implementations, the contact element 180 is a side brush that notes along a vertical axis and extends beyond the body 300. The side brush maintains a buffer space between a wall and the robot body 300.

The bump sensor 800 is used to determine when the robot 100 has physically encountered an object. Such sensors may use a physical property such as capacitance or physical displacement within the robot 100 to determine when it has encountered an obstacle. In some implementations, the bump sensor 800 includes contract sensors disposed about the periphery of the body 300. In preferred implementations, the bump sensor 800 is configured to detect movement of the body 300 over the chassis 200. Referring to FIGS. 5, 10 and 13A-13D, the body 300 of the robot 100 functions as a bumper and is flexibly coupled to the chassis 200 by one or more elastic elements 309 (e.g., springs, flexible pins, elastomeric pegs, etc) (see FIG. 5). The elastic elements 309 allow the bumper style body 300 to move in at least two directions (preferably three directions). In some examples, the bump sensor 800 includes a bump sensor base 810 carrying at least three (preferably four) detectors 820 (e.g., light or infrared light detectors, such as a photo-detector) equally spaced on the bump sensor base 810. In the example shown, the bump sensor base 810 is a printed circuit board carrying the detectors 820. The printed circuit board—bump sensor base 810 is in communication with and may carry the controller 450. The bump sensor 800 includes a bump sensor shroud 830 defining a cavity 832 that is positioned over and covering the bump sensor base 810. The bump sensor shroud 830 houses an emitter 840 (e.g., light or infrared light emitter), which emits a signal 842 (e.g., light) through an orifice 834 defined by the bump sensor shroud 830 through a wall 836 of the cavity 832. The orifice 834 collimates the signal 842, so as to have a directed path. As the bump sensor shroud 830 moves over the bump sensor base 810, the signal 842 moves over the detectors 820, which provide corresponding signals to the controller 450 (e.g., proportional to signal intensity). Based on the detector signals, the controller 450 is configured to determine the direction of movement of the body 300 over the chassis 200, and optionally the rate of movement. The bump sensor 800 may detect 360 degrees of movement of the bump sensor shroud 830 over the bump sensor base 810. The drive system 400 and/or the controller 450 are configured to alter a drive direction of the robot 100 in response to the detector signal(s) received from the detectors 820.

Figure 13A:
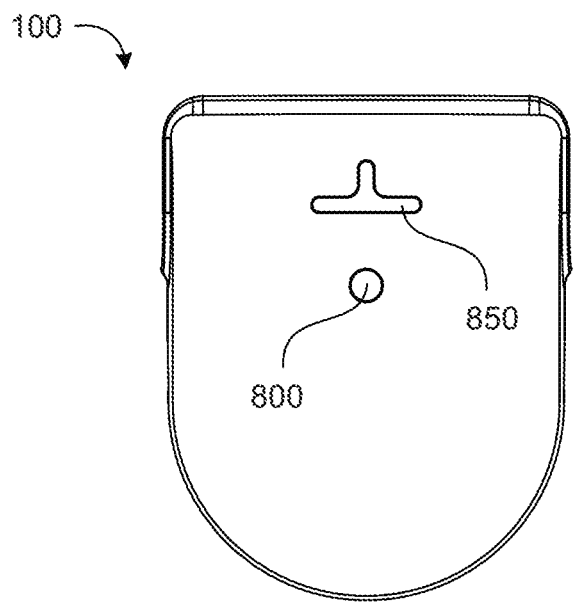
FIG. 13A is a top schematic view of a compact autonomous coverage robot with a bumper guide.
Figure 13B:
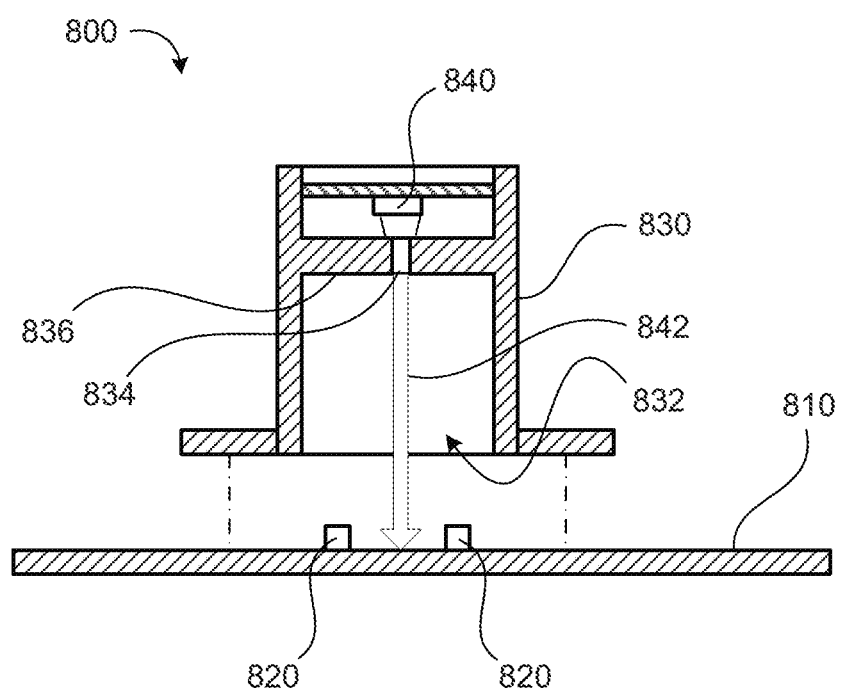
FIG. 13B is a side section view of a bump sensor.
Figure 13C:
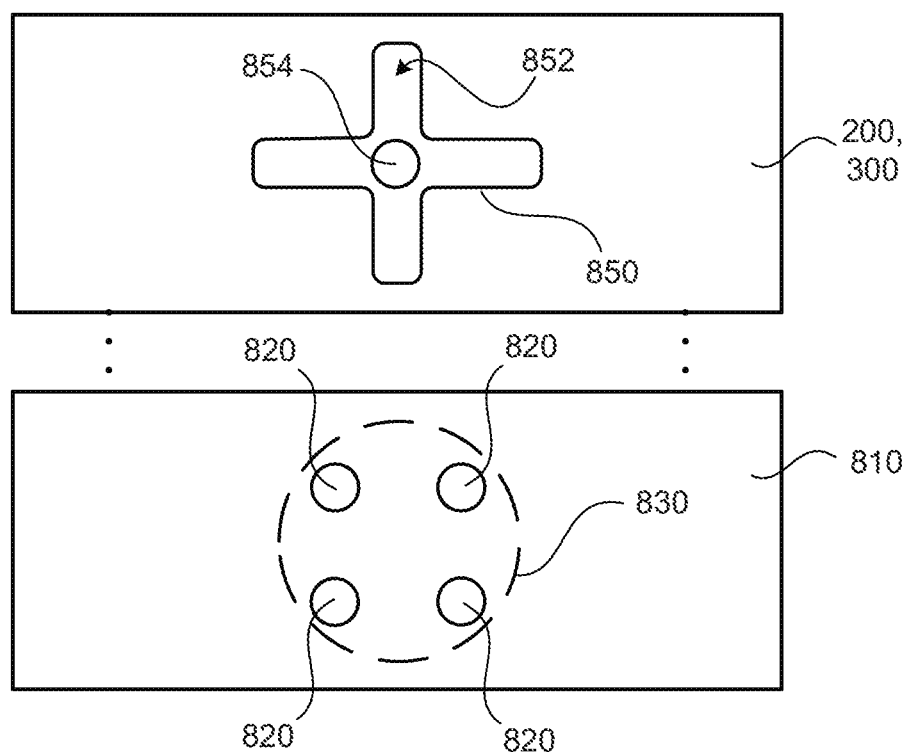
FIG. 13C is a top schematic view of a bump sensor system with a bumper guide.

In the example shown in FIGS. 13A and 13C, the bump sensor 800 includes a bumper guide 850 that guides the body 300 along two directions of movement. As noted above, the body 300 is coupled to the chassis by elastic elements 309 that allow the body 300 to be displaces both by translation and rotation. The bumper guide 850 may be configured as a "T", cross shaped, or orthogonal groove(s) 852 formed in a member that moves with the bumper 300 (relative to the chassis 300), mated to at least one guide pin 854 on the chassis 200 that doesn't move (relative to the chassis 200). In other implementations, the bumper guide 850 is defined in a portion of the chassis 200 and the guide pin 854 is secured to the bumper body 300. When the bumper 300 is displaced, bumper guide 850 tends to guide the bumper 300 in that area along an arm of the bumper guide 850, which permits "translate" bumps as is and tends to otherwise reduce rotational components or guide rotation into translation, improving the detection of the bump sensor 800.

Figure 10:
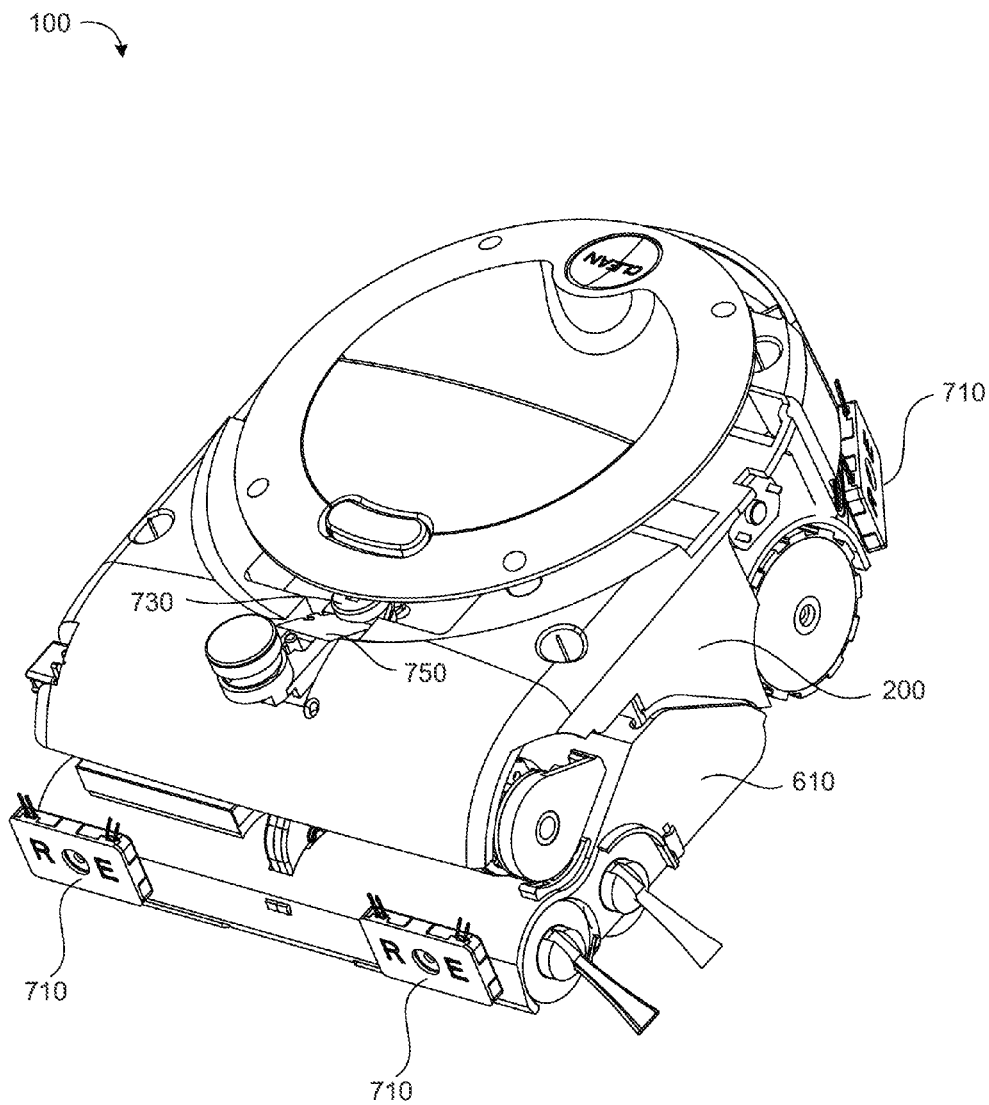
FIG. 10 is top perspective view of a compact autonomous coverage robot.
Figure 13D:
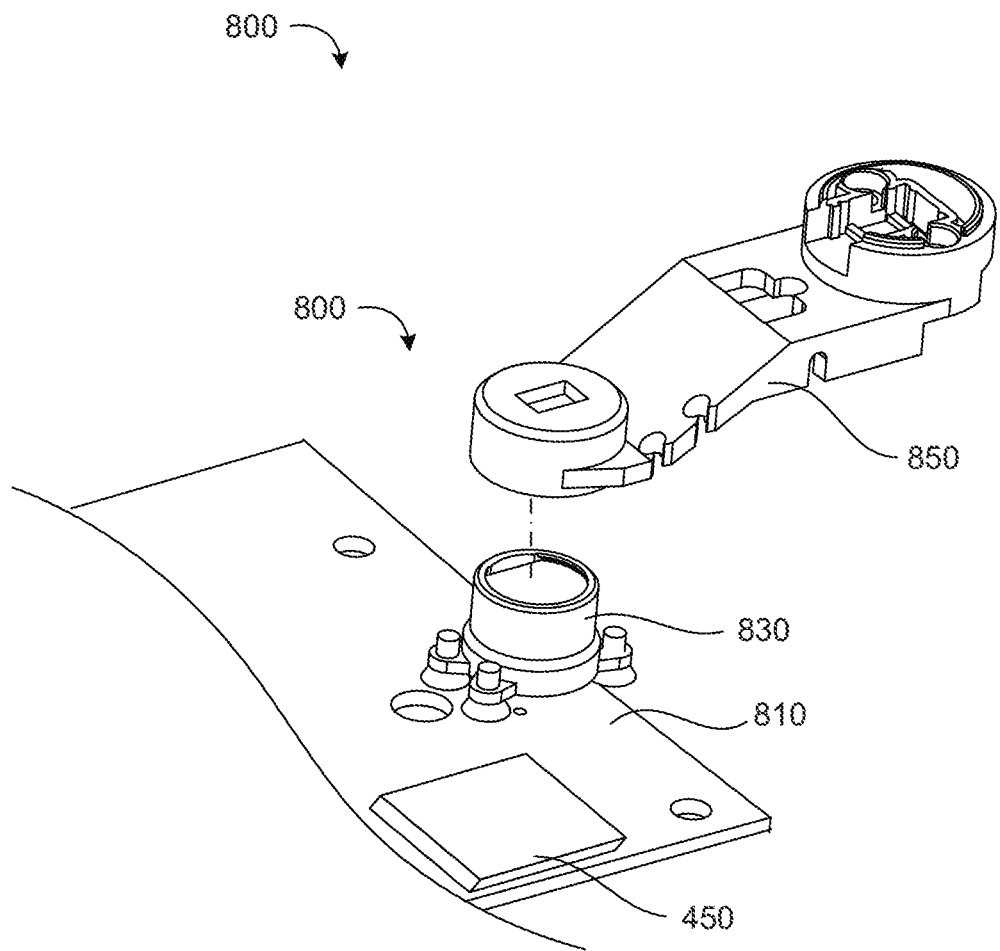
FIG. 13D is a perspective view of a bump sensor system.

In the examples shown in FIGS. 5, 10 and 13D, the bump sensor 800 includes a bumper connector arm 850 secured between the bump sensor shroud 830 and the bumper style body 300. The bumper connector arm 850 translates movement of the body 300 to the bump sensor shroud 830. The bump sensor shroud 830 can be secured to the bump sensor base 710 and be comprised of an elastic material such that the bump sensor shroud 830 can move by elastic deflection in relation to the bump sensor base 810. In other examples, the bump sensor shroud 830 is positioned over the bump sensor base 710 and allowed to move freely in relation to the bump sensor base 810.

The robot 100 has a forward drive direction and carries the omni-directional receiver 900 on an upper portion 305 of the body 300 above the forward portion 202 of the chassis 200. FIG. 1 illustrates an example position of the omni-directional receiver 900 on the robot 100, as being the highest part of the robot 100. The omni-directional receiver 900 may be used to sense when the robot 100 is in close proximity to a navigation beacon (not shown). For example, the omni-directional receiver 900 may relay a signal to a control system that indicates the strength of an emission, where a stronger signal indicates closer proximity to a navigation beacon.

Figure 14:
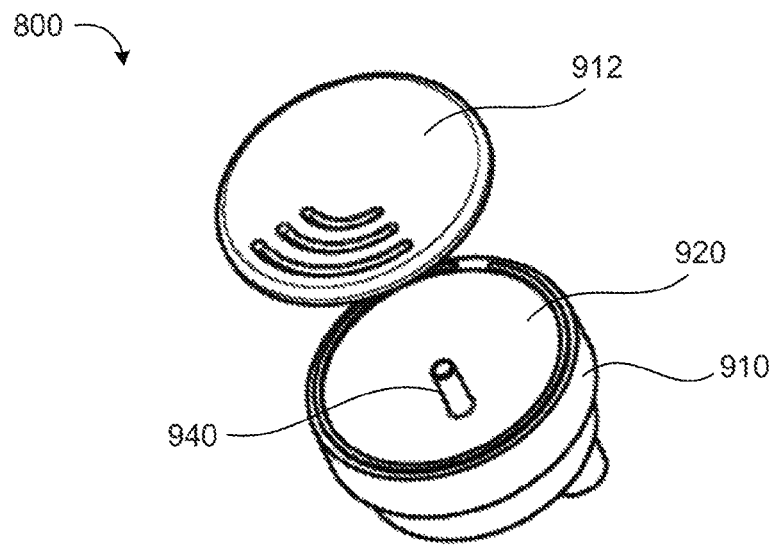
FIG. 14 is a contour shaded diagram of the view of the compact cleaning robot shown in FIG. 3.
Figure 15:
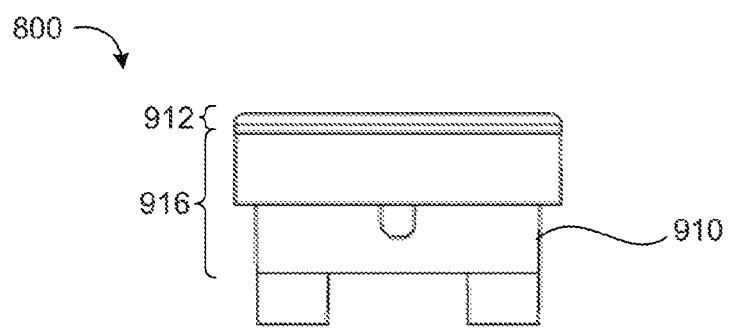
FIG. 15 is a perspective exploded view of an omni-directional sensor.
Figure 16:
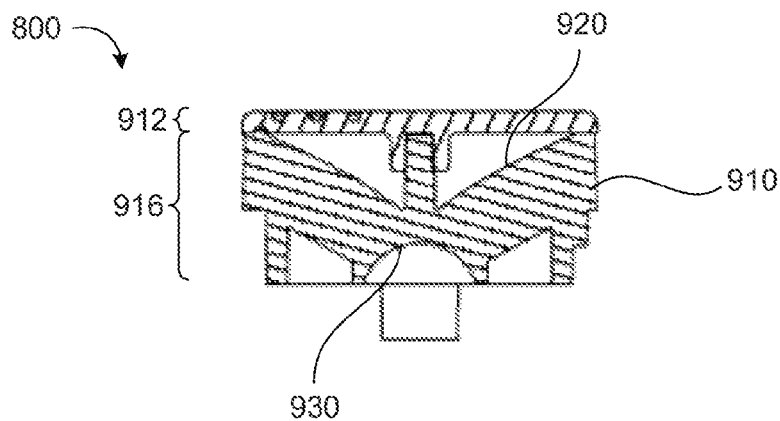
FIG. 16 is a side view of the omni-directional sensor shown in FIG. 15.

FIGS. 14-16 show perspective, side, and cut-away views of the omni-directional receiver 900. The omni-directional receiver 900 includes a housing 910, a conical reflector 920 and an emission receiver 930. The housing 910 has an upper portion 912 and an inner cavity 916. The upper portion 912 may allow a transmission of an emission into the inner cavity 916. The conical reflector 920 is located on an upper surface of the cavity 916 to reflect emissions falling on the upper portion 912 of the housing 910 into the inner cavity 916. The emission receiver 930 is located in the inner cavity 916 below the conical reflector 920. In some implementations, the omni-directional receiver 900 is configured to receive transmissions of infrared light (IR). In such cases, a guide 940 (e.g., a light pipe) may guide emissions reflected off the conical reflector 920 and channel them to the emission receiver 930.

The controller 450 may be configured to propel the robot 100 according to a heading setting and a speed setting. Signals received from the navigational sensor system 700 may be used by a control system to issue commands that deal with obstacles, such as changing the commanded speed or heading of the robot 100. For instance, a signal from the proximity sensor 730 due to a nearby wall may result in the control system issuing a command to slow down. In another instance, a collision signal from the bump sensor 800 due to an encounter with an obstacle may cause the control system to issue a command to change heading. In other instances, the speed setting of the robot 100 may be reduced in response to the contact sensor and/or the heading setting of the robot 100 may be altered in response to the proximity sensor 730.

The controller 450 may include a first independent behavioral routine configured to adjust the speed setting of the robot 100; and a second independent behavioral routine configured to alter the heading setting of the robot 100, in which the first and second independent behavioral routines are configured to execute concurrently and mutually independently. The first independent behavioral routine may be configured to poll the proximity sensor 730, and the second independent behavioral routine may be configured to poll the bump sensor 800. While implementations of the robot 100 discussed herein may use behavioral based control only in part or not at all, behavior based control is effective at controlling the robot to be robust (i.e. not getting stuck or failing) as well as safe.

FIGS. 17-25 illustrate another implementation of the autonomous coverage robot 101. The robot 101 includes a chassis 200 having a forward portion 210 and a rearward portion 220 and a body 300 having a forward portion 301 and a rearward portion 303 configured to substantially follow the contours of the chassis 200. The forward portion 210 of the chassis 200 defines a substantially rectangular shape and the rearward portion 220 defines an elliptical shape. The forward portion 301 of the body 300 may be flexibly connected to the chassis 200. A handle 330 is disposed on or defined by an upper portion 305 of the rearward portion 303 of the body 300.

In an example configuration, the form factor of the robot 101 is about 15 cm in diameter, about 7.5 cm in height, and functions on battery power to clean for about six hours before requiring recharge. Also, for example, the robot 101 may effectively clean the floor of a single average-size room in about 45 minutes, or several smaller areas.

Figure 18:
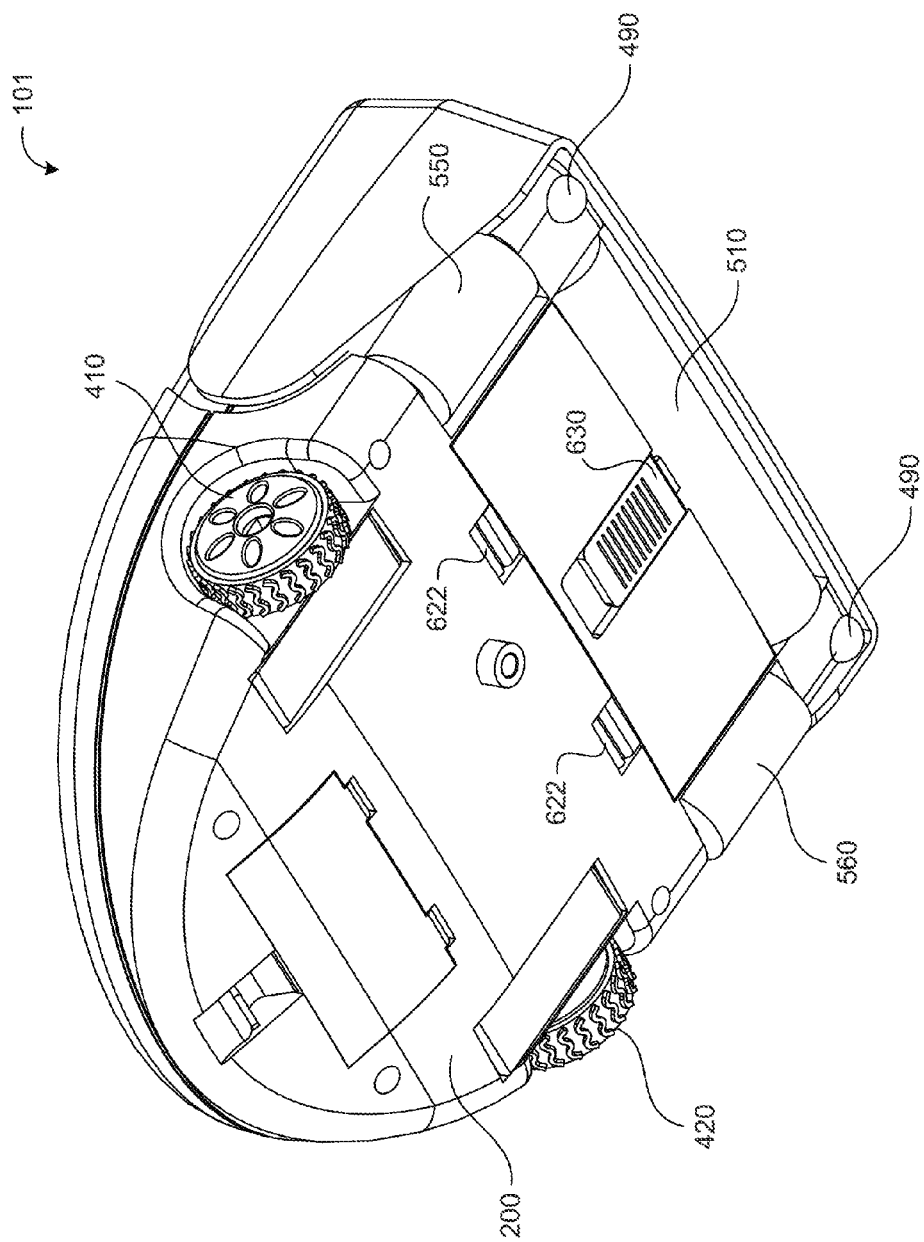
FIG. 18 is a bottom perspective view of the robot shown in FIG. 17.
Figure 19:
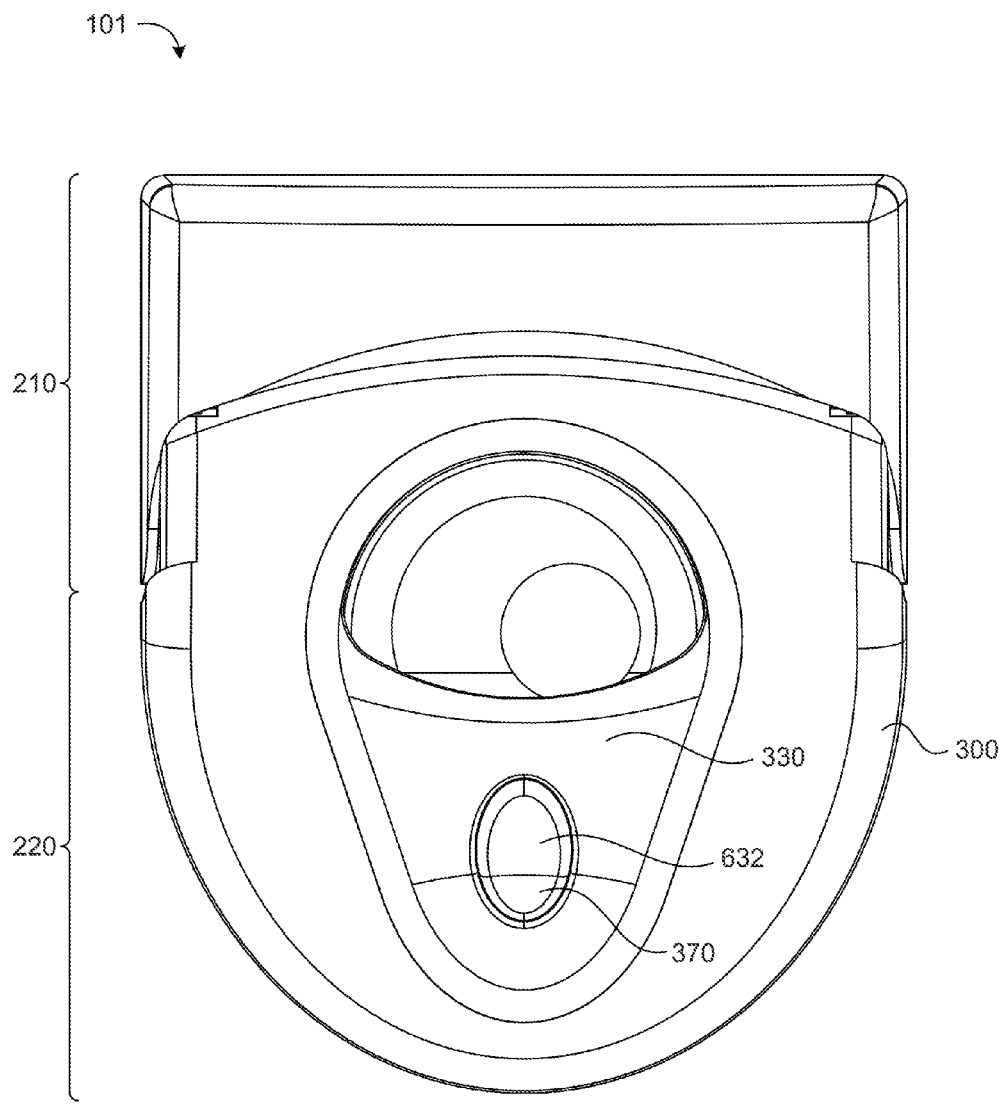
FIG. 19 is a top view of the robot shown in FIG. 17.
Figure 20:
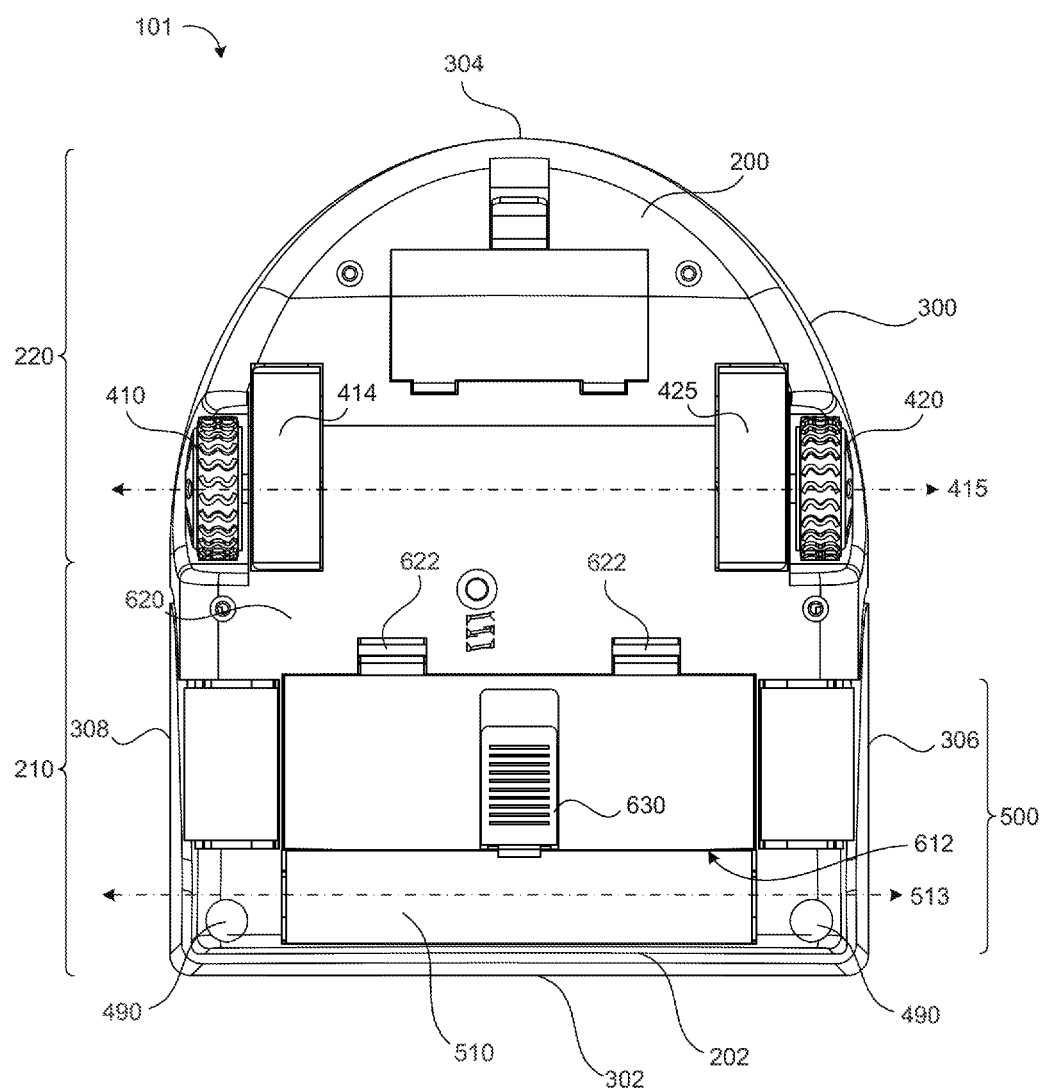
FIG. 20 is a bottom view of the robot shown in FIG. 17.
Figure 21:
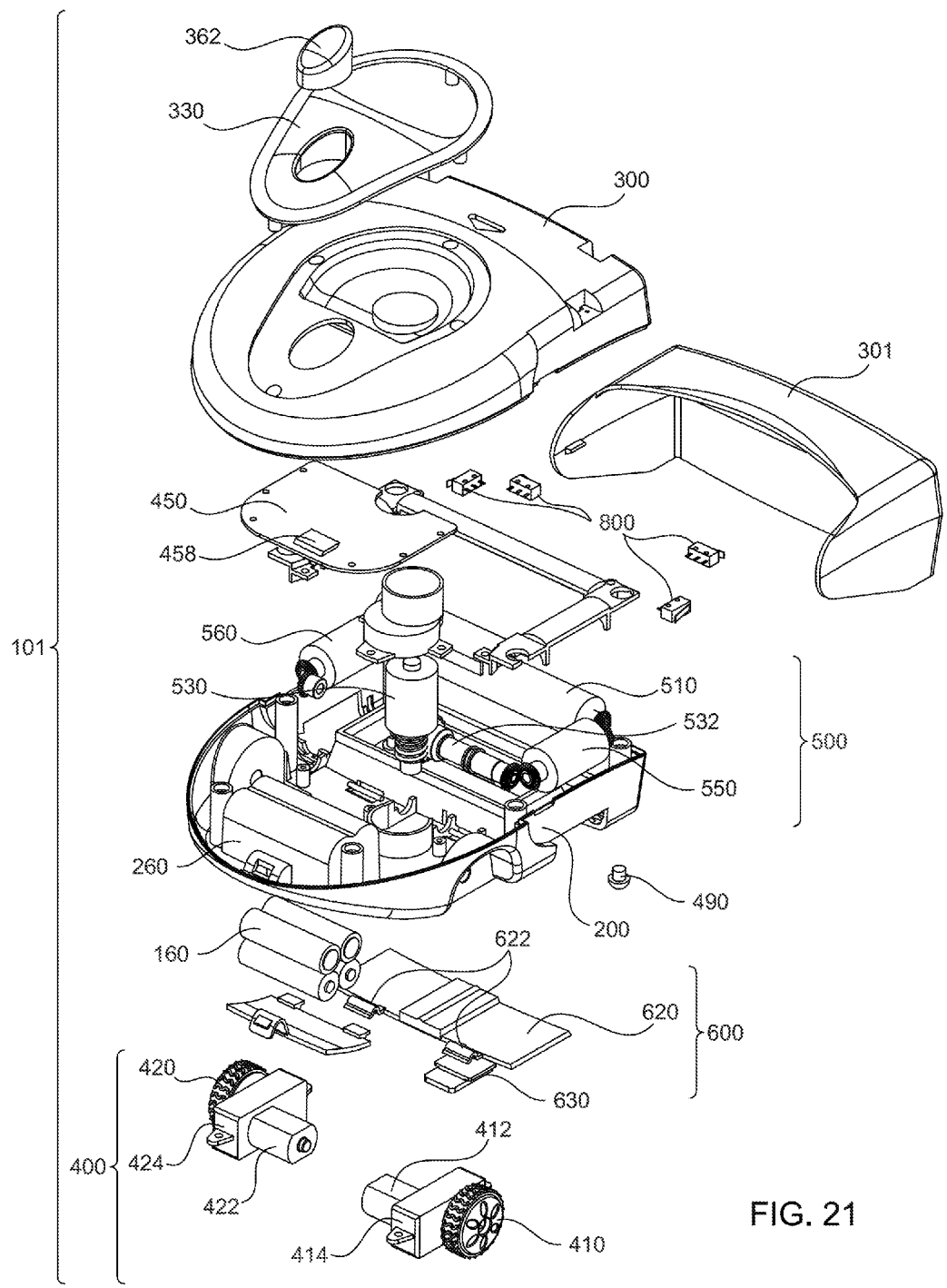
FIG. 21 is an exploded view of the top aspect shown in FIG. 17.
Figure 22:
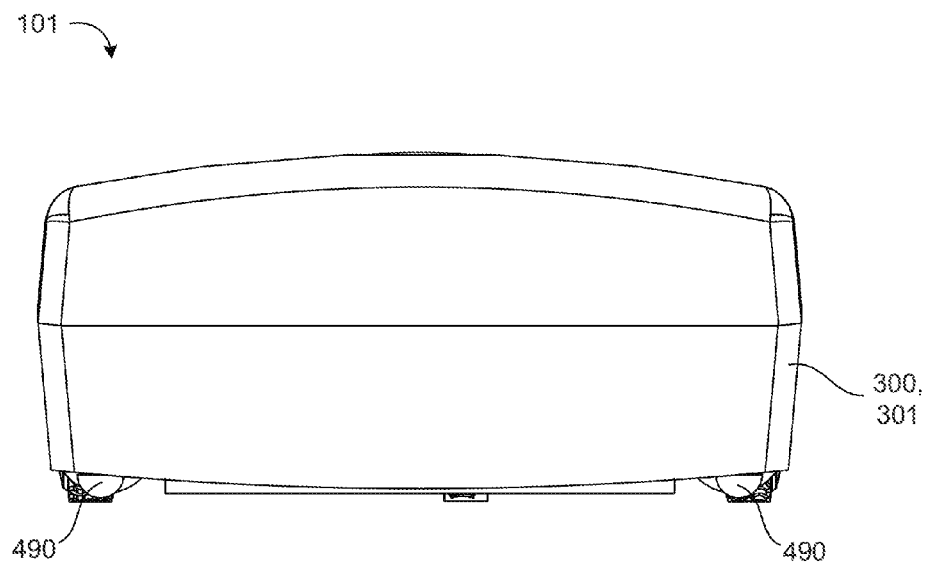
FIG. 22 is a front view of the robot shown in FIG. 17.
Figure 23:
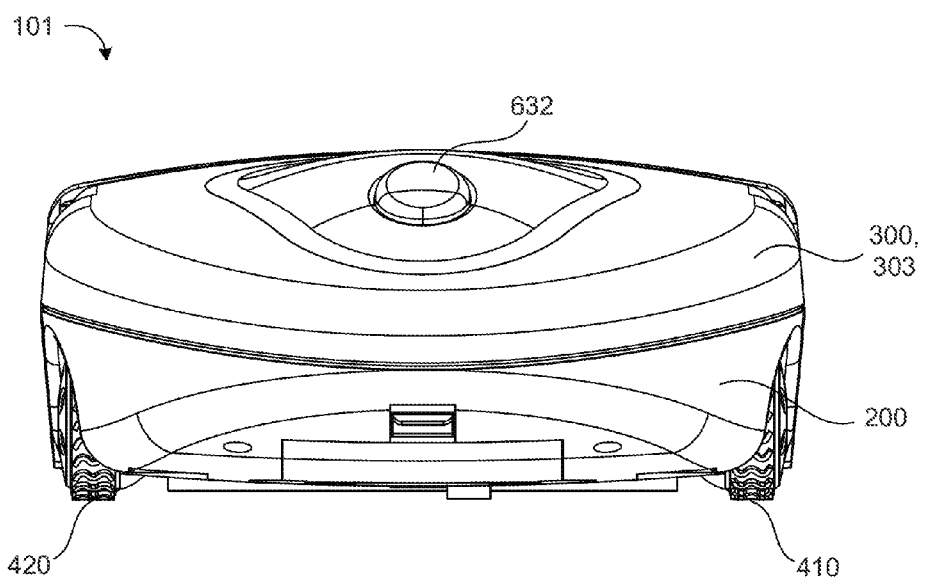
FIG. 23 is a rear view of the robot shown in FIG. 17.

Referring to FIGS. 18, 20 and 21, the robot 101 includes a drive system 400 carried by the chassis 200, as described above. In the implementation shown, the drive motors 412, 422 are disposed adjacent and in-line (e.g., co-axial) with their respective drive wheels 410 and 420. In some examples, the robot includes a gear box 414, 424 coupled between the drive wheel 410, 420 and its respective drive motor 412, 422. The robot 101 includes a controller 450 in communication with the drive system 400. The controller 450 is configured to maneuver the robot 101 to pivot in place.

The robot 101 includes a cleaning assembly 500 mounted on the front portion 210 of the chassis 200 includes a first, front roller brush 510 rotatably mounted substantially near and substantially parallel to the front edge 202 of the chassis 200. The cleaning assembly 500 includes second and third side roller brushes 550, 560 rotatably mounted orthogonally to the front roller brush 510 substantially near respective right and left side edges 306, 308 of the body 300. The roller brushes 510, 550, 560 are driven by a cleaning motor 530 coupled to the roller brushes 510, 550, 560 by a gear box 532. The cleaning motor 530 is positioned rearward of the front roller brush 510 and between the side roller brushes 550, 560.

The robot 101, in a preferred implementation, includes only one kind of cleaning mechanism. For example, the robot 101 shown in FIG. 18 includes bristle-brush rollers for the front roller brush 510 and side roller brushes 550, 560. The bristle-brush rollers may be similar to the brush rollers found in the SCOOBA® robot marketed by iRobot Corporation, for example; or it may be similar to the R2 or R3 brush types used in the ROOMBA® robot, as further examples. In one implementation, the brush does not pick up long hairs or fibers that would tend to become tightly wrapped around the brush, in order to minimize the frequency of maintenance required by the user for removing debris from the brush. Alternatively, the robot 101 may include two or more varieties of cleaning mechanism, such as both a vacuum and bristle brushes, inter alia.

In the some examples, the front roller brush 510 and the side roller brushes 550, 560, each rotate about a horizontal axis parallel to the work surface, thereby providing a horizontal cleaning assembly 500, although the main work width of the coverage robot 100 may include vertically rotating brushes, no brushes in lieu of a vacuum, a reciprocating brush, a circulating belt member, and other known cleaning implements. Each roller brush 510, 520, 550, 560 may have a cylindrical body that defines a longitudinal axis of rotation. Bristles are attached radially to the cylindrical body, and, in some examples, flexible flaps are attached longitudinally along the cylindrical body. As the roller brush 510, 520, 550, 560 rotates, the bristles and the flexible flaps move debris on the work surface, directing it toward the bin 610 in the robot 100. In examples including a vacuum unit, the brushes 510, 520, 550, 560 may also direct debris or dirt toward a suction path under the cleaning robot 100. In the case of a wet cleaning robot, the brushes 510, 520, 550, 560 may have instead a scrubbing function, and a vacuum or other collector may collect waste fluid after scrubbing.

Figure 27:
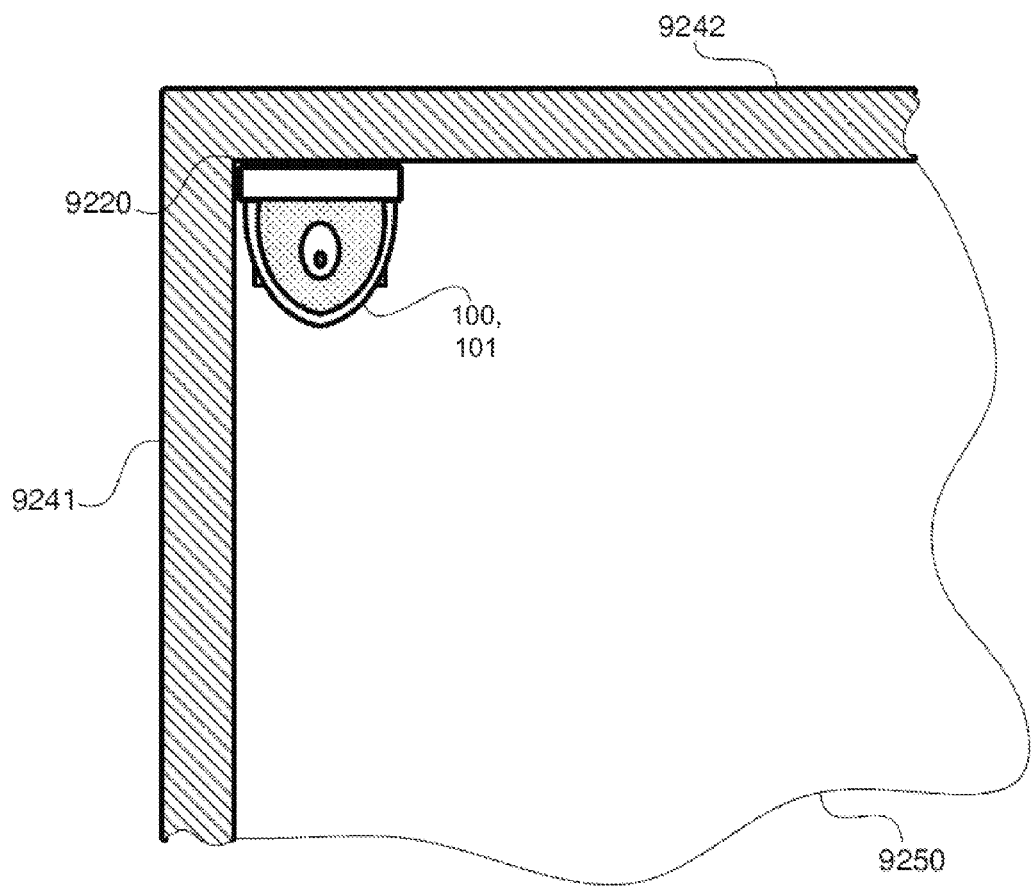
FIG. 27 is a plan view of a compact cleaning robot navigating flush into a wall corner.

In the examples shown, the effective components of the cleaning assembly 500 such as the brushes 510, 550, 560 are disposed toward the extreme front corners of the forward portion 210 of the chassis 200. As a result, the area of floor that the rectangular forward portion 210 of the chassis 200 can cover is maximized, and portions of the floor that are not covered are minimized, as illustrated in FIG. 27.

By including only a single cleaning mechanism, such as the cleaning assembly 500, rather than a combination of two or more varieties of cleaning mechanisms (such as, for example, both a roller brush and a vacuum; or both wet and dry cleaning mechanisms, which may necessitate two or more storage chambers, inter alia), the robot 101 may be made more compact relative to otherwise.

Referring to FIGS. 18, 20, 21 and 24, the robot 101 includes a bin assembly 600, as described above. In the examples shown, the chassis 200 defines the debris chamber or bin 610, which is positioned between the cleaning assembly 500 and the drive system 400. In specific examples, the bin 610 is forward of the drive wheels 410, 420 and rearward of the front roller brush 510. As the front roller brush 510 and the side roller brushes 550, 560 spin against the floor, they agitate debris and sweep the debris into a debris chamber/bin 610 within the robot 101 via an intake slot or other suitable opening leading from the roller brushes 510, 550, 560 to the debris chamber 610.

The bin cover 620, in the example shown, is releasably connected to the chassis 200 by one or more hinges 622 (e.g., living hinge, peg and socket, etc.). In some implementations, the bin-cover release 630 is actuatable from substantially near or at the handle 330, thereby allowing actuation of the bin-cover release 630 while holding the handle 330. In other implementations, the bin-cover release 630 is actuatable near or on the bin cover 620, such that a user holds the handle 330 with one hand and opens the bin cover 620 via the bin-cover release 630 with another hand (see FIG. 24). In some implementations, the bin cover release 630 is a spring biased latch or latching button attractable by pressing downwardly (e.g., button) or pulling upwardly (e.g., trigger).

Figure 24:
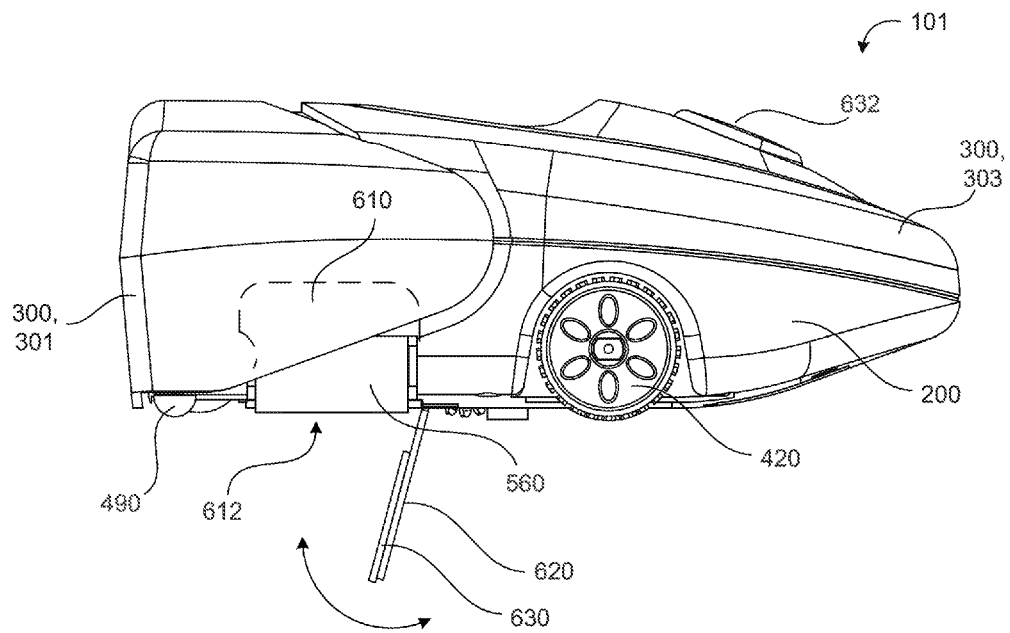
FIG. 24 is a left side view of the robot shown in FIG. 17 with a bin cover in its open position.
Figure 25:
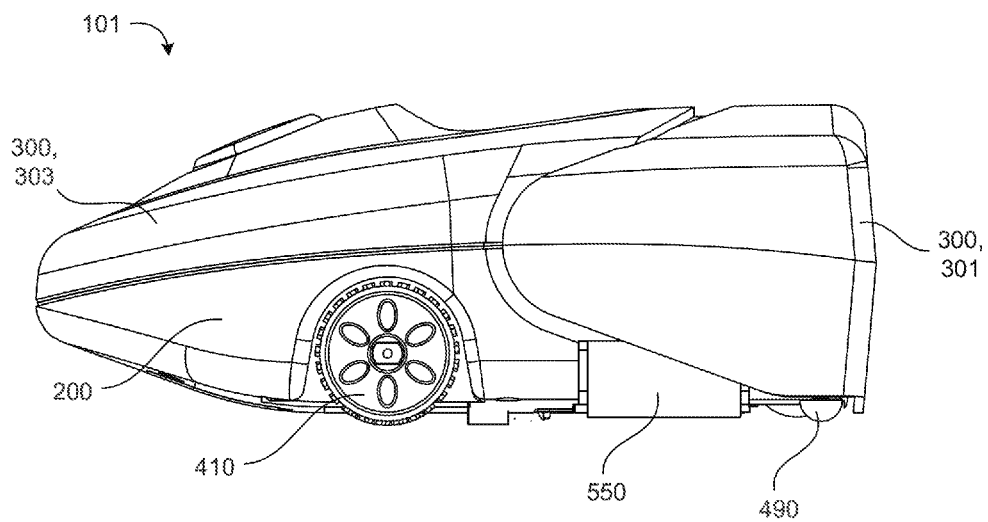
FIG. 25 is right side view of the robot shown in FIG. 17.

In the examples shown, the robot 101 includes a handle 330 is disposed on or defined by an upper portion 305 of the body 300. A user can grasp the handle 330 to lift the robot 101 and transport it manually. In addition, the robot 101 may include one or more buttons 632 proximal to the handle 330. The button 632 is preferably operable by one hand, while the user's hand grips the robot 101 by the handle 330. The button 632 is configured to actuate a bin-cover release 630, which is operable to control holding the bin cover 620 in its closed position and releasing the bin cover 620 to move to its open position. In one example, as illustrated in FIG. 24, when the user operates the button 632, the bin-cover release 630 disengages and the bin cover 620 swings open about the hinges 622. With the bin cover 620 in its open position, the contents of the debris chamber/bin 610 can drop out of the robot 101 under the force of gravity. The robot 101 may also include a spring to ensure that the bin cover 620 opens in case the weight of the debris in the debris chamber 610 is insufficient to swing the bin cover 620 open, for example.

The robot 101 includes a power source 160 (e.g., battery) in communication with the drive system 400 and/or the controller 450, and removably secured to the chassis 200. In the examples shown in FIGS. 20 and 21, the power source 160 is received by a power receptacle 260 defined by the rearward portion 220 of the chassis 200. A power cover 262 is releasably secured to the chassis 200 to hold and/or cover the power source 160 in the power receptacle 260. In the examples shown, the power source 160 is positioned in the rearward portion 220 of the chassis 200, rearward of the drive wheels 410, 420. In this position, the weight of the power source 160 offsets the weight of the cleaning assembly 500 to position a center of gravity of the robot 101 substantially about a center of the chassis 200.

The compact dimensions of the robot 101 allow the robot 101 to navigate under potential obstacles such as chairs, tables, sofas, or other household objects, and perform floor cleaning in these hard-to-reach areas. In addition, the robot 101 may include a clearance sensor disposed on a top surface thereof, such as a sonar range-finder or light-sensitive diode, that scans directly overhead. When the clearance sensor detects the presence of an object within a threshold distance—such as, for example, two feet—the robot 101 may continue moving until the overhead space is clear. Accordingly, the robot 101 may avoid becoming "lost" underneath furniture, out of view of the user, for example.

As the drive system 400 propels the robot 101 over the floor, the front roller brush 510 preferably rotates in the same direction as the drive wheels 410, 420 but at a rate faster than the rate of the robot 101 traversing over the floor, so as to sweep debris into the debris chamber 610. In addition, the side brushes 550, 560 also sweep debris inward at the same time. In one example, the bristles of the brushes 510, 550, 560 may extend downward by about 0.015 to 0.025 inches beyond the extent of the wheels 410, 420, while rotating at between about 600 and about 1600 RPM.

The form factor of the robot 101 may be made more compact by omitting a caster wheel or other support structure. Due to the width of the front brush roller 510, as well as the side brushes 550, 560 disposed at opposite lateral sides of the robot 101, the robot 101 may omit a third caster or free wheel aside from the drive wheels 410, 420 without significantly impacting the balance or stability of the robot 101. Alternatively, the robot 101 may further include support bearings 490, as shown in FIGS. 18, 20, and 22-25, disposed proximal to the extreme opposite corners of the forward portion 210 of the chassis 200. The support bearings 490 may include a single rigid member of a smooth and/or self-lubricating material, such as polytetrafluoroethylene or a polyoxymethylene polymer; or, the support bearings 490 may include a roller bearing or any other suitable mechanism for preventing the robot 101 from tipping or losing balance while providing a low frictional resistance as the robot 101 traverses the floor.

Referring to FIG. 21, the robot 101 includes a navigational sensor system 700 in communication with the controller 450 that allows the robot 101 to be aware of its surroundings/environment and react in prescribed manners or behaviors according to its sensed perception of its surroundings/environment. In the example shown, the navigational sensor system 700 includes one or more bump sensors 800 and/or a stasis detector 720. Using input from the navigational sensor system 700, the controller 450 generates commands to be carried out by the robot 101. As a result, the robot 101 is capable of cleaning surfaces in an autonomous fashion.

The bump sensor 800 is used to determine when the robot 100 has physically encountered an object. Such sensors may use a physical property such as capacitance or physical displacement within the robot 100 to determine when it has encountered an obstacle. In the example shown in FIG. 21, the bump sensor 800 is a contract switch disposed about the periphery of the front portion 210 of the chassis 200, between the chassis 200 and the forward portion 301 of the body 300. The forward portion 301 of the body 300 is flexibly or slidably attached to the chassis 200 in a manner that allows contact with an obstacle to be translated to the bump sensor(s) 800. In preferred implementations, the robot includes bump sensors 800 disposed at the forward corners of the chassis 200, with at least one bump sensor 800 disposed on each side of each corner, thus allowing the robot 100 to determine a direction and/or location of a collision. The forward portion 301 of the body 300 acts as a single mechanical bumper with sensors 800 substantially at the two ends of the bumper for sensing movement of the bumper. When the forward portion 301 of the body 300 is compressed, the timing between the sensor events is used to calculate the approximate angle at which the robot 101 contacted the obstacle. When the forward portion 301 of the body 300 is compressed from the right side, the right bump sensor detects the bump first, followed by the left bump sensor, due to the compliance of the bumper and the bump detector geometry. This way, the bump angle can be approximated with only two bump sensors.

Since the robot 101 preferably has a compact and lightweight form, the momentum carried by the robot 101 may be lighter than a standard-size robot. Accordingly, the robot 101 preferably includes "light touch" or contactless bump sensors. For example, the robot 101 may include one or more accelerometers 458 in communication with the controller 450 (see FIG. 21) for monitoring the robot's acceleration along at least one horizontal axis. When acceleration is detected that exceeds a pre-established threshold, the robot 101 may respond as though a bumper switch had been triggered. As a result, the robot 101 may omit a traditional contact-switch type bump sensor.

In some examples, the robot 101 may utilize the accelerometer 458 as a stasis detector 720. As a benefit, processing accelerometer data for stasis detection may require only a processing rate of about 30 hertz. For example, as the robot 101 is moving over a floor, vibrations cause the accelerometer 458 to detect acceleration of a particular amplitude profile. However, when the robot 101 stops moving, because of either a normal state or it has been blocked by an obstacle, the amplitude of the vibrations detected by the accelerometer 458 decrease accordingly. Therefore, the robot 101 can respond to such decreased acceleration according to a stasis-escape behavior, for example. By monitoring a single accelerometer 458 for purposes of both bump detection and/or stasis detection, the robot 101 may omit bump switches and/or other stasis detection hardware, thus potentially requiring less space aboard the robot 101.

Figure 26:
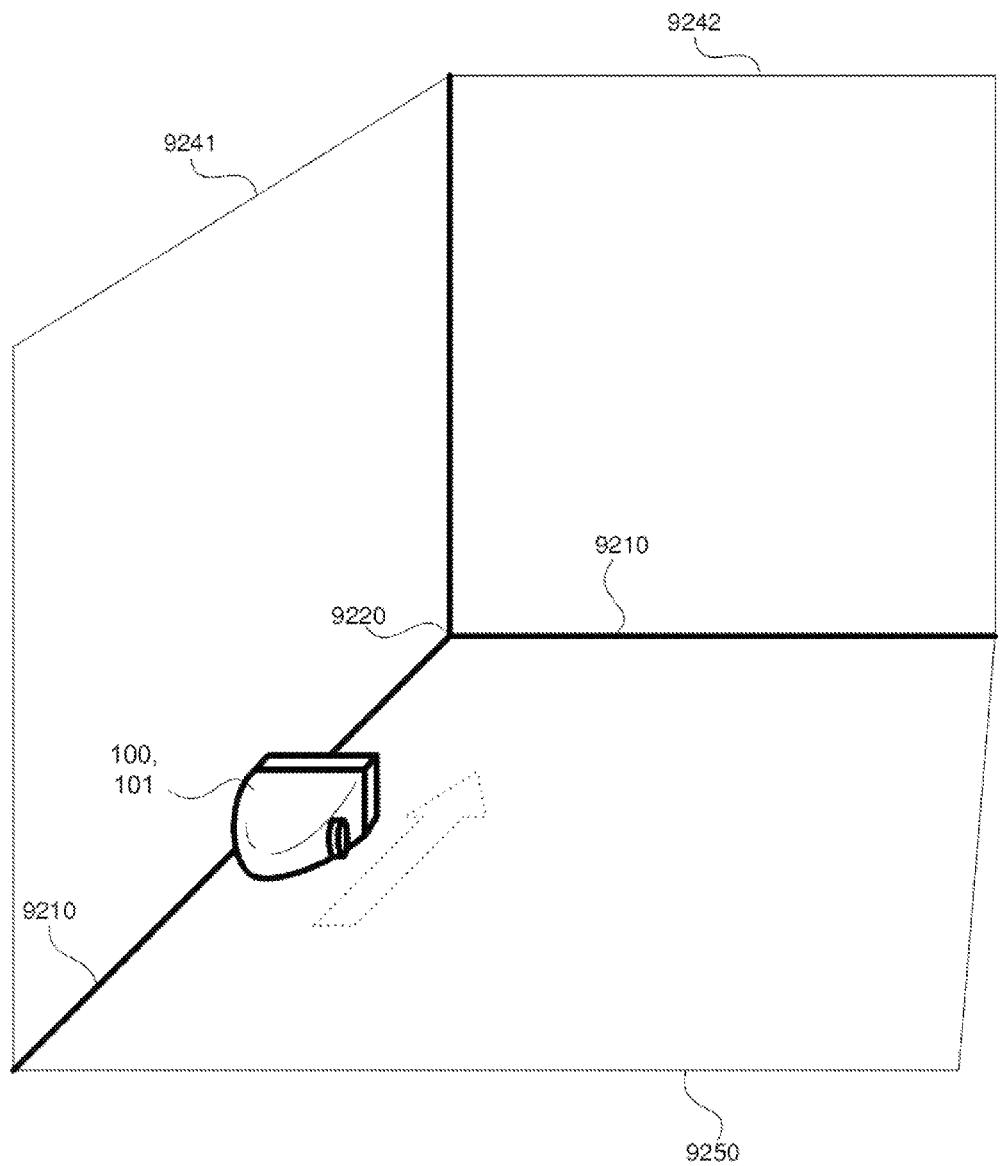
FIG. 26 is an oblique view of a compact cleaning robot having rectangular form traversing along a wall edge.
Figure 28:
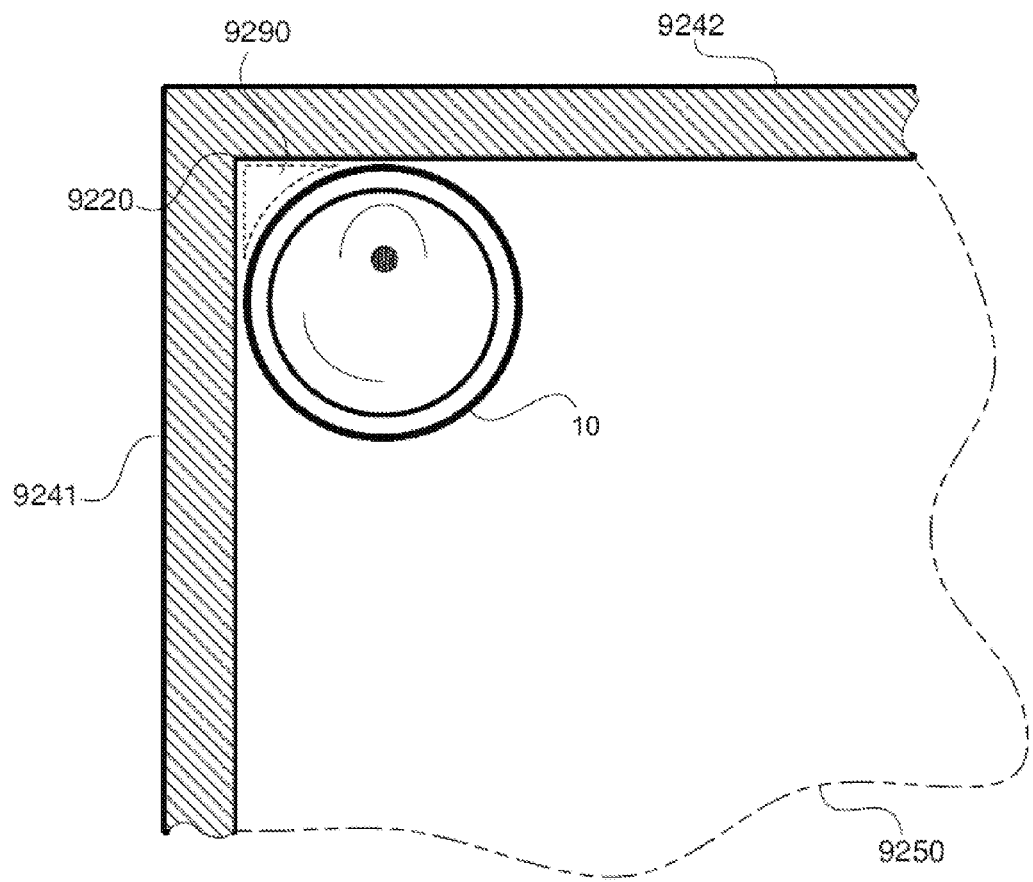
FIG. 28 is a plan view of a round robot navigating into a wall corner, illustrating a gap that the round robot cannot traverse.
Figure 29:
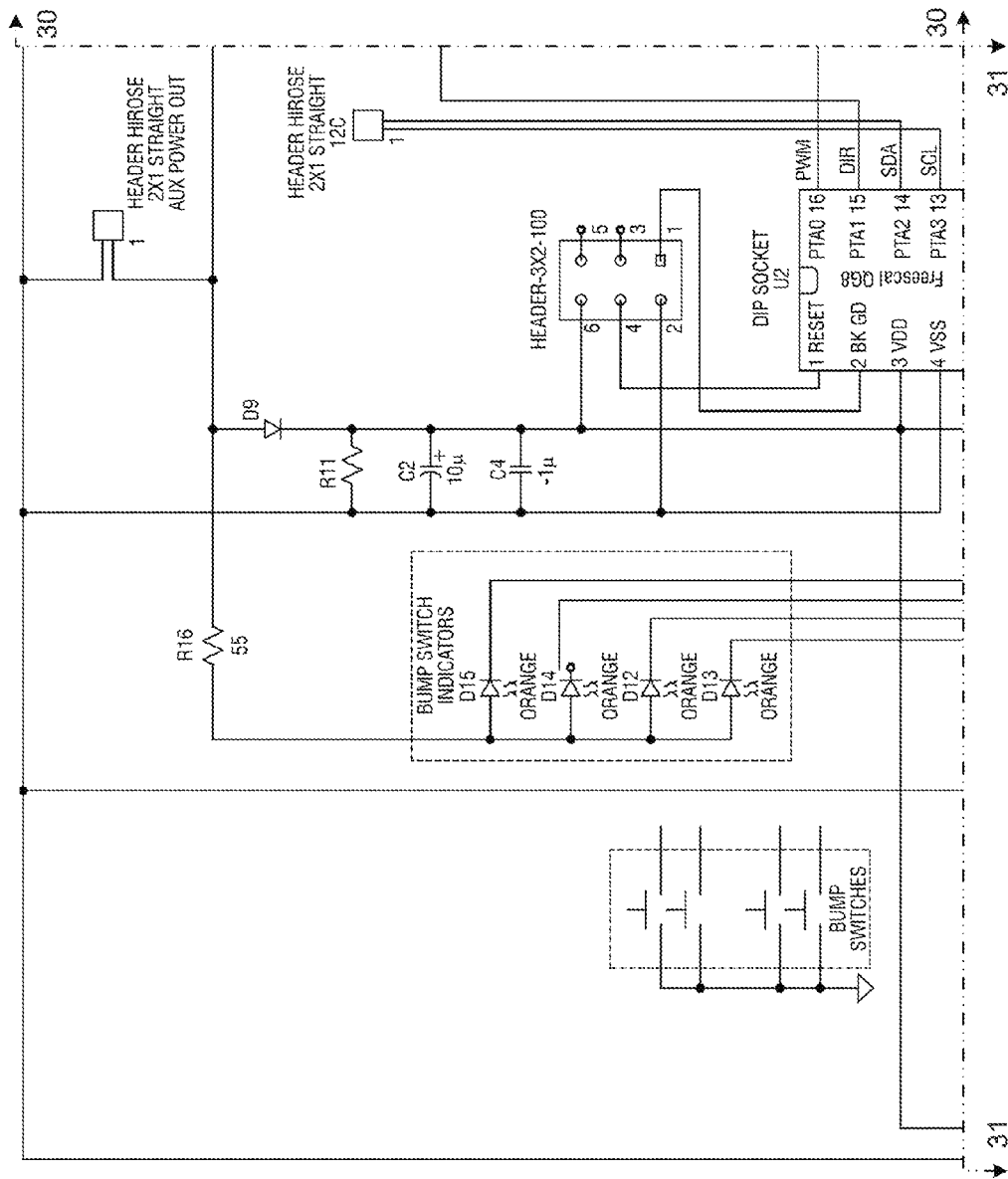
FIG. 29-32 collectively provide a schematic view of a control circuit for an autonomous coverage robot.
Figure 30:
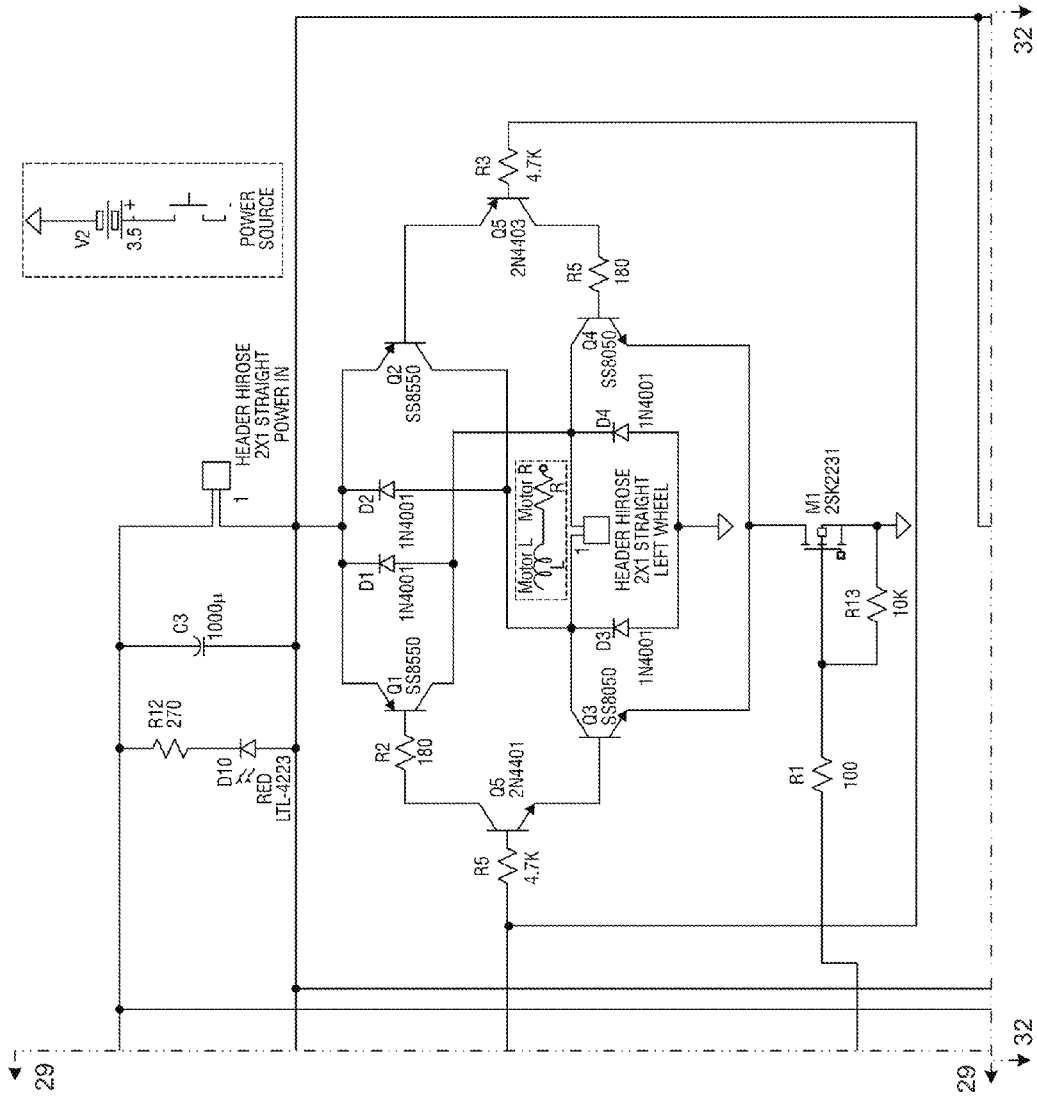
Figure 31:
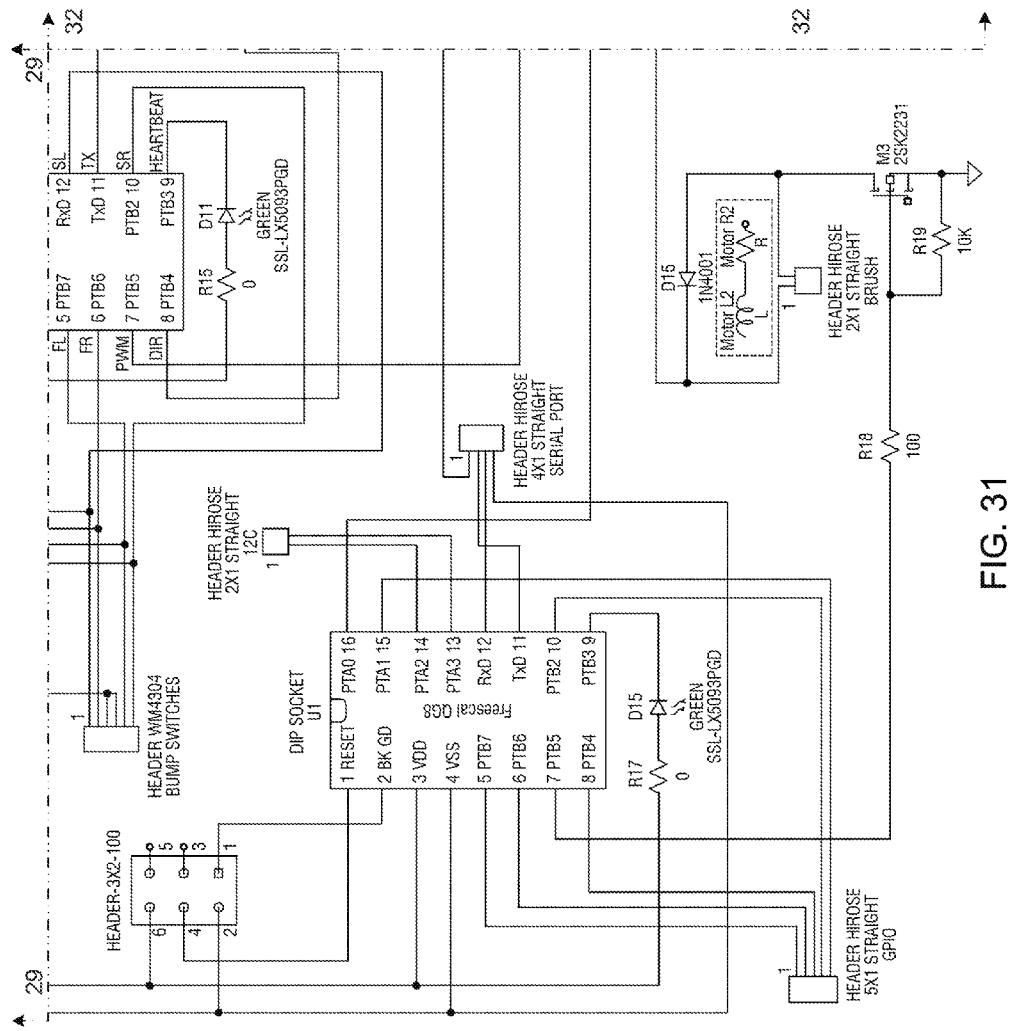
Figure 32:
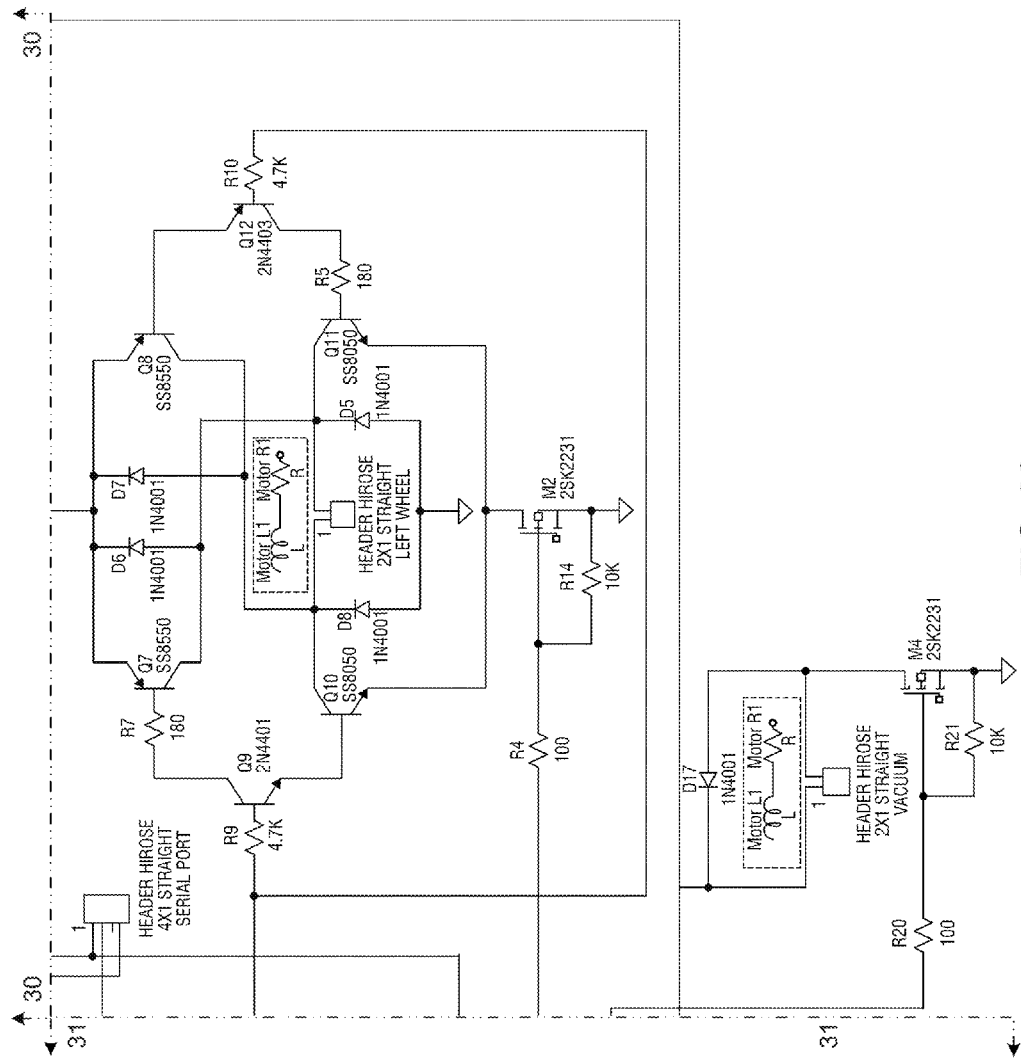

Referring to FIGS. 26-28, the robot 100, 101 can navigate over floor surfaces such as tile, hardwood or carpeting, while collecting debris from the floor within the debris chamber/bin 610. When the robot 100, 101 navigates into a corner, the front roller brush 510 and the end brushes 540 or the side roller brushes 550, 560, respectively, can effectively clean an area that is flush up against the sides of the corner. In comparison, a round-outline robot 10, such as illustrated in FIG. 28, can approach a corner 9220 but cannot move flush against the walls 9241, 9242 intersecting at the corner 9220. As a result, the round-outline robot 10 cannot effectively clean the wedge-shaped area 9290 abutting the corner 9290. As illustrated in FIG. 26, the robot 100, 101 can navigate along a straight path while remaining substantially flush against a wall edge 9210 where a wall 9421 intersects the floor 9250. The robot 100, 101 preferably includes one or more bump sensors 800, 1800 disposed or active within the front portion 210 of the chassis 200; and as the robot 100, 101 taps against the wall 9241, the robot 100, 101 can adjust its heading so as to travel substantially parallel to the wall 9241, for example.

The operation of the robot 101 is preferably controlled by a microcontroller 450, such as a FREESCALE™ QG8 or other microcontroller suitable to receive input from the robot's sensors and operate the motors or other output devices of the robot 101. As illustrated in FIGS. 29-32, for example, the microcontroller 450 receives input from bump sensor 800 and outputs control signals to the drive motors 412, 422 coupled to the right and left drive wheels 410, 420. Alternatively, a microprocessor or other control circuitry may be used. The robot 101 may execute behavior-based control software; or may operate according to simple, single-threaded control loops, inter alia.

The rectangular outline of the front portion 210 of the chassis 200 may cause the corners thereof to collide with obstacles which might not be detected by bump sensors or cliff sensors, in contrast to round-outline robots that can rotate freely without such risk, the robot 101 preferably responds to bumps detected while rotating in place by halting the rotation and backing up directly in reverse. As a result, the robot 101 may be less likely to become inextricably wedged or stuck, notwithstanding the square corners of the front portion 210 of the chassis 200. Alternatively, the robot 101 may behave in accordance with control software generally similar to the ROOMBA™ or SCOOBA™ robots, as examples.

In accordance with a further example, the robot 100, 101 may automatically return to a cradle or base station for storage after completing a cleaning cycle. The robot 100, 101 may also include an electrical interface for recharging on-board batteries. Additionally, the cradle or base station may include a receptacle positioned below a "home" position of the robot 100, 101. When the robot 100, 101 interfaces the cradle and stops at the home position, the robot 100, 101 may automatically actuate the bin-cover release 630 and evacuate the debris from the debris chamber 610 into the cradle's receptacle positioned below the robot 100, 101.

In robot implementations using the omni-directional receiver 900, the base station may include an omni-directional beam emitter and two navigational field emitters. The robot 100 may maneuver towards base station by detecting and advancing along one of the lateral field edges of the overlapping fields aligned with a docking direction until docked with the base station. The robot 100 may detect the emissions of base station with the omni-directional receiver 900 and maneuver to detect an outer lateral field edge of at least one field emission. The robot 100 may then advance along the outer lateral field edge to the aligned lateral field edge of the overlapping fields. Upon detecting the aligned lateral field edge, the robot 100 advances along the aligned lateral field edge until docked with base station.

Figure 33:
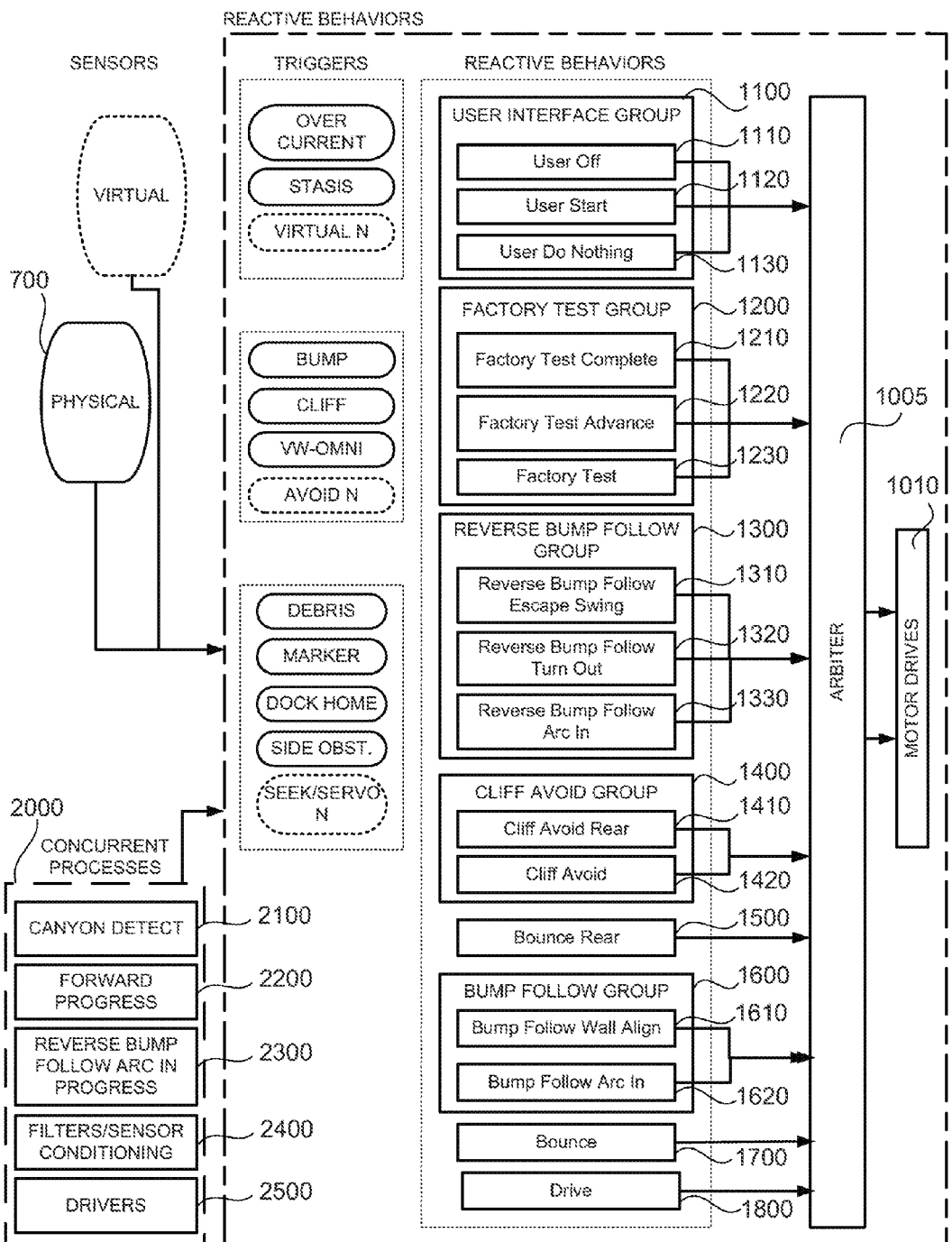
FIG. 33 is a schematic view of a software architecture for a behavioral system of autonomous coverage robot.

FIG. 33 is a block diagram showing a behavioral software architecture within the controller 450. The behavioral software architecture includes goal-oriented behaviors. The robot 100, 101 employs a control and software architecture that has a number of behaviors that are executed by an arbiter 1005 in the controller 450. The arbiter 1005 executes commands on motor drives 1010 in communicates with each drive motor 412, 422. A behavior is entered into the arbiter 1005 in response to a sensor event. In one implementation, all behaviors have a fixed relative priority with respect to one another. The arbiter 1005 (in this case) recognizes enabling conditions, which behaviors have a full set of enabling conditions, and selects the behavior having the highest priority among those that have fulfilled enabling conditions. The diagram shown in FIG. 33 does not necessarily reflect the (fixed) priority hierarchy of the robot 100, 101. In order of decreasing priority, the behaviors are generally categorized as escape and/or avoidance behaviors (such as avoiding a cliff or escaping a corner) and working behaviors (e.g., wall following, bouncing, or driving in a straight line). Movement of the robot 100, 101, if any, occurs while a behavior is arbitrated. If more than one behavior is in the arbiter 1005, the behavior with a higher priority is executed, as long as any corresponding required conditions are met. For example, a cliff avoiding behavior 1400 will not be executed unless a cliff has been detected by a cliff detection sensor, but execution of the cliff avoiding behavior 1400 always takes precedence over the execution of other behaviors that also have satisfied enabling conditions.

The reactive behaviors have, as their enabling conditions or triggers, various sensors and detections of phenomena, but, in general, not (arbitrary) states of a sequence. As shown in FIG. 33, these include sensors for obstacle avoidance and detection, such as cliff sensors 710, stasis detector 720, side proximity sensor 730, bump sensor 800, and/or an omni-directional receiver 900 (e.g., for detection of a virtual wall signal (which may instead be considered a coverage trigger)). Sensors of these types are monitored and conditioned by filters, conditioning, and their drivers, which can generate the enabling conditions as well as record data that helps the behavior act predictably and on all available information (e.g., conversion to one-bit "true/false" signals, recording of likely angle of impact or incidence based on strength or time differences from a group of sensors, or historical, averaging, frequency, or variance information).

Actual physical sensors may be represented in the architecture by "virtual" sensors synthesized from the conditioning and drivers. Additional "virtual" sensors that are synthesized from detectable or interpreted physical properties, proprioceptive or interpreted upon the robot 100, 101, such as over-current of a motor, stasis or stuck condition of the robot 100, 101, battery charge state via coulometry, and other virtual sensors "virtual N."

In some implementations, the robot 100 includes the following behaviors listed in priority order from high to low: 1) User Interface Group 1100, 2) Factory Test Group 1200, 3) Reverse Bump Follow Group 1300, 4) Cliff Avoid Group 1400, 5) Bounce Rear 1500, 6) Bump Follow Group 1600, 7) Bounce 1700, and 8) Drive 1800. A behavior group refers to a set of behaviors that work together to implement an overall behavior. For example, the "User Interface Group" behavior is a set of three behaviors that handles the user interface while the robot is at rest.

Figure 17:
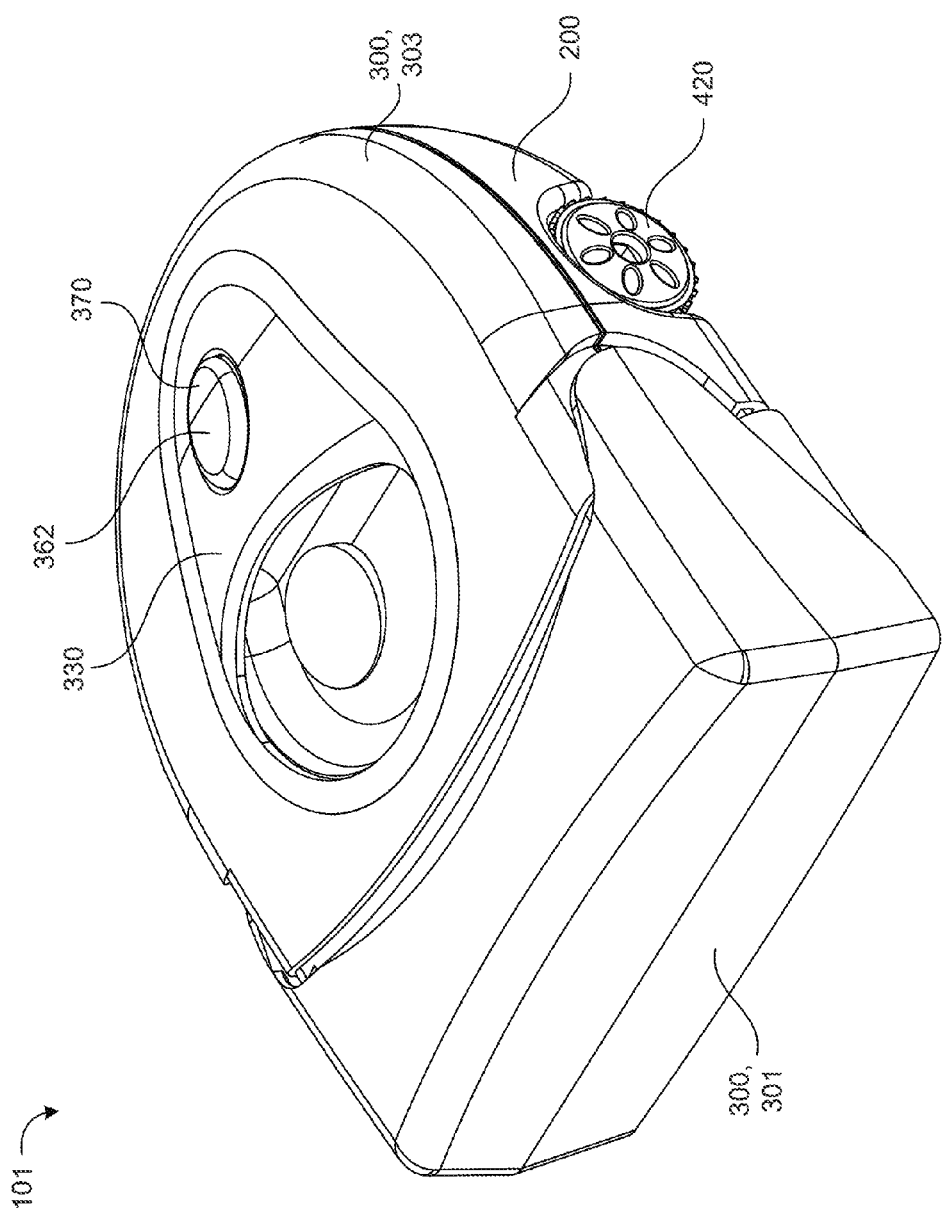
FIG. 17 is a top perspective view of a compact autonomous coverage robot.

The robot may include a user interface 370, which is a single clean/power button in the examples shown in FIGS. 1 and 17, for allowing a user to interact with the robot 100. The following sub-behaviors of the User Interface Group behavior 1100, prioritized from high to low, execute the user interface 370 implemented as a single clean/power button: 1) User Off 1110, 2) User Start 1120, and 3) User Do Nothing 1130. The following sub-behaviors of the Factory Test Group behavior 1200, prioritized from high to low, implement a factory test mode for quality control purposes: 1) Factory Test Complete 1210, 2) Factory Test Advance 1220, and 3) Factory Test 1230.

The following sub-behaviors, prioritized from high to low, implement the Reverse Bump Follow escape behavior 1300: 1) Reverse Bump Follow Escape Swing 1310, 2) Reverse Bump Follow Turn Out 1320, and 3) Reverse Bump Follow Arc In 1330. Due to the rectangular shape of the front portion 210 of the chassis 200, it is possible for the robot 100 to drive into a space that is too narrow to turn around in (e.g., like a parking space). These confinement areas are referred to as canyons. The term "canyon" refers generically to any narrow confinement source. If a cliff is similarly confining the robot 100 to a narrow space, this is referred to as a plank. Since the strategy for escaping these confinement obstacles is the same, the directional cliff sensor and bumper sensor data is aggregated into a set of four "directional confinement" sensors which are the basis for the discussion below. The four sensors are front-left, front-right, rear-left and rear-right. The direction of a reverse bump follow is clockwise if the Reverse Bump Follow Arc In behavior 1330 is driving the robot 100 backward while rotating clockwise. The direction of a reverse bump follow is counterclockwise if the Reverse Bump Follow Arc In behavior 1330 is driving the robot 100 backward while rotating counterclockwise.

The Reverse Bump Follow Escape Swing behavior 1310 causes the robot 100 to turn in place with enough angular progress to deduce that the presence of a canyon. The activation condition for the Reverse Bump Follow Escape Swing behavior 1310 is evaluated at the end of the Reverse Bump Follow Turn Out behavior 1320. After the Reverse Bump Follow Escape Swing behavior 1310 is armed, it executes once and then disables itself until armed again by the Reverse Bump Follow Turn Out behavior 1320. At the start of the Reverse Bump Follow Escape Swing behavior 1310, an escape angle is set to a random number between 120 and 160 degrees. The robot 100 then turns in place in the opposite direction of the reverse bump follow direction until the escape angle is achieved. If any rear directional confinement sources appear while turning in place, the robot 100 moves forward to avoid them. If a front directional confinement source is encountered, the turn in place is aborted. After completion of the turn in place, the success of the escape is determined in the following order. First, if the turn in place was aborted due to detection of a front confinement source, the angular progress of the turn in place is compared to a minimum escape angle which is computed by generating a random number between 80 and 120 degrees. If the angular progress does not exceed this amount, a similar maneuver for the Reverse Bump Follow Turn Out behavior 1320 is performed. This is done to return the robot 100 back to an orientation conducive to continuing the reverse bump follow. Second, if the turn in place was aborted due to detection of a front confinement source, and the angular progress exceeded the minimum escape angle computed above but fell short of the escape angle computed at the beginning of the behavior, the following is done. The reverse bump follow activation is cancelled, and a forward bump follow is triggered if the confinement source that stopped the turn in place was a bump. This improves the chances that the robot 100 will find its way out of a tight spot without detecting a new canyon and retriggering the reverse bump follow. Third, if the turn in place completed due to achieving the escape angle computed at the start of the behavior, the reverse bump follow activation is cancelled.

The Reverse Bump Follow Turn Out behavior 1320 attempts to orient the robot 100 relative to an obstacle such that forward progress can be made while arcing toward the obstacle again. Simply turning in place as a circular robot would is not sufficient for the robot 100 since the rectangular forward portion 210 of the chassis 200 would, at some point, hit the obstacle and prevent the robot 100 from turning in place further. To avoid this problem, the robot 100 instead follows a tight arc to maintain space from the obstacle. The Reverse Bump Follow Turn Out behavior 1320 begins after the backing up along an arc that is performed in the Reverse Bump Follow Arc In behavior 1330 finishes as a result of the rear bumper getting activated. The first task of the Reverse Bump Follow Turn Out behavior 1320 is to release the bumper 300 from the rear hit. This is done by driving the robot 100 forward until the bumper 300 is released. In the course of doing this, front confinement sources are handled in the following way. A front-left confinement source causes the robot 100 to turn clockwise. A front-right confinement source causes the robot 100 to turn counterclockwise. After the bumper 300 is released, the robot 100 computes a constrained random arc radius and angular progress that it must travel in the forward direction in order to reorient the robot 100 for the next iteration of the Reverse Bump Follow Arc In behavior 1330. The robot 100 travels along this arc until the computed angular progress is achieved. While doing this, the robot 100 responds to the front confinement sensor 710, 730, 800 (e.g., cliff sensor 710, proximity sensor 730, and/or bump sensor 800) on the opposite side of the robot 100 to the obstacle being followed. When this is detected, the robot 100 turns in place in the same rotational direction as the arc it is following. The Reverse Bump Follow Turn Out behavior 1320 ends when the computed angular progress is achieved or the front confinement sensor 710, 730, 800 on the same side of the robot 100 as the obstacle being followed is triggered. At the end of the behavior, a random number generator is used to decide whether or not to trigger a Reverse Bump Follow Escape Swing behavior 1310. At a minimum, the probability of triggering the Reverse Bump Follow Escape Swing behavior 1310 will be about 20%. If the angular progress of the Reverse Bump Follow Turn Out behavior 1320 was between about 2 and about 5 degrees, the probability increases to about 50%. If the angular progress is less than 2 degrees, the probability is about 100%.

The Reverse Bump Follow Arc In behavior 1330 attempts to make forward progress while keeping an obstacle close to one side of the robot 100 by driving backward in an arc that begins shallow and gets progressively more severe with elapsed time in the behavior. The Reverse Bump Follow Arc In behavior 1330 executes when the robot 100 is in the reverse bump following mode 1300 and none of the other reverse bump follow behaviors 1310, 1320 are activated. While traveling in the arc, the robot 100 will respond to the front confinement sensor 710, 730, 800 (e.g., cliff sensor 710, proximity sensor 730, and/or bump sensor 800) on the opposite side of the robot 100 to the obstacle. It does this by turning in place in the opposite rotational direction to the arc being followed. The Reverse Bump Follow Arc In behavior 1330 ends when a rear confinement sensor 710, 800 (e.g., cliff sensor 710 and/or bump sensor 800) is triggered or the arc has made over 120 degrees of angular progress.

The Cliff Avoid Group behavior 1400 is a group of escape behaviors that includes the following sub-behaviors, prioritized from high to low: 1) Cliff Avoid Rear 1410, and 2) Cliff Avoid 1420. Referring to FIG. 4, in preferred implementations, the robot 100 has four cliff sensors 710 positioned at the front-right, front-left, rear-right and rear-left extremes of the robot 100. The front-right and front-left cliff sensors 710A, 710B detect when the either of the respective front corners of the robot 100 move over a cliff. Since the drive system 400 is positioned rearward of the cleaning assembly 500, which is located near the front edge, the robot 100 can back-up before an appreciably amount of the robot 100 moves over the cliff edge. The rear-right and rear-left cliff sensors 710C, 710D are positioned directly rearward of the respective right and left drive wheels 410, 420. As a result, the rear-right and rear-left cliff sensors 710C, 710D detect when a rearward portion of the robot 100 moves over a cliff edge before the drive wheels 410, 420 move over the cliff edge, so as to prevent driving in reverse at angle off of a cliff. If the robot 100 included rear cliff sensors 710 only along a center portion of the rearward portion 220 of the chassis 200, the robot 100 could drive in reverse at an angle and move a drive wheel 410, 420 over a cliff edge before detecting the cliff edge.

The Cliff Avoid Rear behavior 1410 executes whenever the rear cliff sensors 710C, 710D are triggered. Front cliffs sensors 710A, 710B are also handled in this behavior 1410 since it is higher priority than Cliff Avoid 1420. At the beginning of the Cliff Avoid Rear behavior 1410, an escape direction of clockwise or counterclockwise is selected. The decision is made in the following order. 1) If front-left cliff sensor 710B is triggered, set to clockwise. 2) If front-right cliff sensor 710A is triggered, set to counterclockwise. 3) If rear-right cliff sensor 710C is triggered, set to clockwise. 4) If rear-left cliff sensor 710D is triggered, set to counterclockwise. After the direction is set, the robot 100 turns in the specified direction along an arc that is centered on a drive wheel 410, 420. While traveling, the front cliff sensors 710 are monitored and used to alter the direction of travel as follows. If the front-right cliff sensor 710A is triggered, the robot 100 turns in place counterclockwise. If the front-left cliff sensor 710B is triggered, the robot 100 turns in place clockwise. The robot 100 continues to travel as described above until both rear cliff sensors 710C, 710D are not triggering.

The Cliff Avoid behavior 1420 only handles the front cliff sensors 710A, 710B of the robot 100 and typically executes when the robot 100 is driving forward. At the beginning of the Cliff Avoid behavior 1420, an escape direction is chosen based on which front cliff sensors 710A, 710B have been triggered. If only the front-left cliff sensor 710B is triggered, the clockwise escape direction is chosen. If only the front-right cliff sensor 710A is triggered, counterclockwise escape direction is chosen. If both front cliff sensors 710A, 710B are triggered, the escape direction is randomly selected. An escape angle is randomly chosen between about 25 and about 50 degrees. The Cliff Avoid behavior 1420 starts by backing up straight until both of the front cliff sensors 710A, 710B are not triggering. Then, the robot 100 turns in place until the escape angle is achieved. If any of the front cliff sensor 710A, 710B is retriggered as part of the turn in place, the entire Cliff Avoid behavior 1420 is retriggered and hence re-executed.

The Bounce Rear behavior 1500 runs when the bumper 300 is activated from the rear direction. This most commonly happens when the robot 100 drives backward to release the front part of the bumper 300 as part of the Bounce behavior 1700. The robot 100 drives forward until the bumper 300 is released, and then continues forward another 5 mm in order to reduce the chance that the turn in place about to be performed will not retrigger a rear bump. A rotational direction for the turn in place is decided based on the direction of the original rear bumper hit. If the hit came from the rear-right side of the robot 100, counterclockwise is chosen. If the hit came from the rear-left side of the robot 100, clockwise is chosen. If the hit was in the center part of the rear, the direction is randomly chosen. An escape angle is randomly chosen between about 10 degrees and about 200 degrees. The robot 100 turns in the chosen direction until the escape angle is achieved.

The Bump Follow Group 1600 includes the following sub-behaviors prioritized from high to low: 1. Bump Follow Wall Align 1610, 2. Bump Follow Arc In 1620. Bump following is used to escape from and clean cluttered areas. It is also used to follow a wall with the goal of dispersing the robot 100 evenly through its floor space.

The Bump Follow Wall Align behavior 1610 is designed to align the side of the robot 100 with an obstacle such as a wall. If the bump-follow-direction is clockwise, the goal is to have the robot's left side against the wall. If the direction is counterclockwise, the goal is to have the robot's right side against the wall. When bump following is enabled, the Bump Follow Wall Align behavior 1610 begins when a front bump is triggered. The location of the bumper hit is used to decide how much the robot 100 should turn in place before performing another iteration of the Bump Follow Arc In behavior 1620. If the bumper 300 is triggered on the side of the bumper 300 that should not be near the obstacle, the robot 100 sets a turn in place goal of between about 25 and about 45 degrees. This larger increment saves time in the alignment process. If the bumper 300 is triggered on the side that should be near the obstacle, the robot 100 turns in place in the direction that swings the bumper 300 into the obstacle even more. The goal of this maneuver is to see if the bumper 300 tends to stay engaged or releases. If it releases, it suggests that the robot 100 is not yet at a very shallow angle to the wall, and a turn in place goal of between about 5 and about 25 degrees is selected. Otherwise, the robot 100 is probably at a shallow angle to the wall, and a turn in place goal of between about 1 and about 5 degrees is selected. If the turn in place goal was selected to be greater than 5 degrees, the robot 100 backs up until the bumper 300 is released. The robot 100 turns in place in the direction that swings the front of the robot 100 away from the obstacle until the target angle is achieved. If the bumper 300 is retriggered during the turn in place, the robot 100 backs up enough to release it.

The Bump Follow Arc In behavior 1620 runs when the bump following mode 1600 is enabled and Bump Follow Wall Align 1610 is not active. The robot 100 drives forward in a shallow arc, at first, in order to make forward progress. As more time elapses, the arc gradually tightens to bring the robot 100 back in contact with the obstacle. This allows the obstacle to be followed closely which can help the robot 100 find its way around it. If the bump follow mode 1600 was selected to maneuver through clutter, the robot 100 can continue arcing in without a bumper hit for up to about 100 degrees of angular progress. At that point, the bump follow 1600 is considered ended due to the robot escaping. If the bump follow mode 1600 was selected to help disperse the robot 100 through its space, it can continue arcing in without a bumper hit for up to about 210 degrees to allow for turning wall corners. At that point, the wall is considered lost and the bump follow behavior 1600 ends.

The Bounce behavior 1700 runs when the bumper 300 is activated from the front direction. The robot 100 drives backward until the bumper 300 is released. It then continues backward another 30 mm in order to reduce the chance that the turn in place about to be performed will not retrigger the bumper 300 from the front. This large additional clearance is required due to the rectangular shape of the forward portion of the bumper 300 creating the potential for the corner of the bumper 300 to swing into contact with the obstacle when turning in place. A rotational direction for the turn in place is decided based on the direction of the original front hit on the bumper 300. If the hit came from the front-right side of the robot 100, counterclockwise is chosen. If the hit came from the front-left side of the robot 100, clockwise is chosen. If the hit was in the center part of the front, the direction is randomly chosen. An escape angle is randomly chosen between about 10 degrees and about 200 degrees. The robot 100 turns in the chosen direction until the escape angle is achieved.

The drive behavior 1800 may run when no other behavior is active. The robot 100 drives straight until it experiences an event that triggers another behavior.

The robot 100 maintains concurrent processes 2000, "parallel" processes that are not generally considered reactive behaviors. As noted, filters and conditioning 2400 and drivers 2500, can interpret and translate raw signals. These processes are not considered reactive behaviors, and exercise no direct control over the motor drives or other actuators.

Some parallel processes 2000 are important in assisting the activation and execution of various behaviors. These processes are software finite state machines that are evaluated at a frequency of 64 Hertz, for example. The period is referred to as the processing interval.

In some implementations, the robot 100 includes a Canyon Detect process 2100, which assists in identifying canyons. A canyon is declared by monitoring four signals. Each of these signals is evaluated every processing interval. When the input signal is true, the output signal becomes true. The output signal becomes false after 100 consecutive processing intervals of the input signal being false. The four input signals are evaluated as follows: 1) The front-left cliff sensor 710B is active and the front-right cliff sensor 710A is inactive, or the rear-left cliff sensor 710D is active and the rear-right cliff sensor 710C is inactive. 2) The front-right cliff sensor 710A is active and the front-left cliff sensor 710B is inactive, or the rear-right cliff sensor 710C is active and the rear-left cliff sensor 710D is inactive. 3) The bumper 300 is depressed at the front-left side of the robot 100. 4) The bumper 300 is depressed at the front-right side of the robot 100. The processed versions of these signals are named, respectively, as follows: 1) cliff-left-held; 2) cliff-right-held; 3) bump-left-held; and 4) bump-right-held. A canyon is detected when cliff-left-held or bump-left-held are true while cliff-right-held or bump-right-held are true. When a canyon is detected, the Reverse Bump Following Group 1300 is enabled.

In some implementations, the robot 100 includes a Forward Progress process 2200. In the Forward Progress process 2200, every processing interval, the forward progress of the robot 100 is added to an accumulator while a fixed distance quantity corresponding to 1 millimeter is subtracted. When this accumulator reaches 100 millimeters, forward progress is declared to be true. The accumulator is not allowed to exceed 200 millimeters. When forward progress is true for 10 seconds, the Reverse Bump Following Group 1300 is enabled to escape the excessively cluttered environment the robot 100 is traveling in.

In some implementations, the robot 100 includes a Reverse Bump Follow Arc In Progress process 2300. While the robot 100 is in the reverse bump following mode 1300, the forward progress of each iteration of the Reverse Bump Follow Arc In behavior 1330 is fed into a low pass filter. At the beginning of a reverse bump follow, this filter is initialized to 60 millimeters. When the output falls below 50 millimeters, the arc in progress is considered poor. This triggers a toggle in the reverse bump follow direction, i.e. the side of the robot 100 where the primary obstacle is assumed to be.

Other robot details and features combinable with those described herein may be found in the following U.S. patent applications, entitled "AUTONOMOUS COVERAGE ROBOT," filed on May 9, 2008, having assigned Ser. No. 12/118,219, and published as U.S. Pat. App. Pub. 2008/0276408 A1; and "AUTONOMOUS COVERAGE ROBOT SENSING," filed on May 9, 2008, having assigned Ser. No. 12/118,250, and published as U.S. Pat. App. Pub. 2008/0281470 A1; the entire contents of the aforementioned applications are hereby incorporated by reference.

A number of implementations have been described. Nevertheless, it will be understood that various modifications may be made without departing from the spirit and scope of the disclosure. Accordingly, other implementations are within the scope of the following claims.

What is claimed is:

1. An autonomous robot comprising:
   a chassis having a substantially rectangular forward portion and a substantially arcuate rearward portion when viewed from above, the forward portion having a forward edge and side edges connected to the forward edge at corners, the side edges positioned on lateral sides of the robot;
   a cleaning assembly carried by the chassis and positioned forward of two drive wheels;
   a proximity sensor carried by the chassis and responsive to object proximity with respect to one or more of the lateral sides of the robot;
   a bumper extending along the forward edge of the chassis and along at least a portion of the side edges of the chassis, the bumper comprising a plurality of capacitive sensors, including a respective pair of capacitive sensors disposed adjacent each of the corners, each of the pairs of capacitive sensors including a forward corner capacitive sensor and a lateral corner capacitive sensor, such that signals from the pair of capacitive sensors adjacent a respective corner are indicative of both direction and location of a contact with an obstacle at or near the respective corner; and
   a drive system carried by the chassis and configured to change a direction of travel of the robot in response to a determined direction and location of the contact between the bumper and the obstacle,
   wherein the drive system is configured to cause the robot to back up, turn in place and perform an obstacle following routine based on the proximity sensor detecting an obstacle on one of the lateral sides of the robot.

2. The autonomous robot of claim 1, wherein the drive system is configured to perform a first obstacle following maneuver in response to the detection of the obstacle proximate one of the lateral sides of the robot and a second obstacle following maneuver in response to detection of the obstacle by the bumper, in which second obstacle following maneuver the robot backs up, turns in place to deactivate the bumper and position the robot to perform an obstacle-following arc, and then maneuvers about the obstacle in an arc while one of the lateral sides of the robot continues to face the obstacle.

3. The autonomous robot of claim 1, further comprising two cliff sensors configured to detect a cliff and disposed along the forward portion of the chassis.

4. The autonomous robot of claim 3, wherein the cliff sensors are located at respective right and left edges of the bumper.

5. The autonomous robot of claim 1, further comprising a battery carried by the chassis rearward of the cleaning assembly, the battery powering the drive system and the cleaning assembly, the cleaning assembly further comprising a roller brush motor to rotate a roller brush.

6. The autonomous robot of claim 1, wherein the bumper is configured to detect contact with the obstacle in one of the direction of travel and a direction perpendicular to the direction of travel without detecting contact with the obstacle in a remaining direction.

7. The autonomous robot of claim 1, wherein the robot is configured to turn to follow a wall in response to contact with the wall by the bumper.

8. The autonomous robot of claim 7, wherein the bumper has flat vertical surfaces directed toward respective lateral sides of the robot, the flat vertical surfaces positioned to skim along the followed wall.

9. The autonomous robot of claim 1, wherein the robot is configured to semi-passively wall follow by:
   detecting a proximate wall,
   turning to align a dominant side of the robot with the proximate wall, and
   driving along the wall while turning slightly into the wall so as to skim along the wall, while repeatedly sensing contact with the wall via the bumper or the proximity sensor.

10. The autonomous robot of claim 1, wherein the robot comprises a navigational sensor system in communication with a controller that controls the drive system to maneuver the robot in response to signals from the navigational sensor system and as a function of sensed surroundings about the robot, the sensed surrounding detected by one or more of the proximity sensor and the plurality of capacitive sensors of the bumper.

11. The autonomous robot of claim 1, wherein the robot comprises a stasis detector responsive to whether the robot is moving or stationary.

12. The autonomous robot of claim 11, wherein the stasis detector comprises a stasis wheel configured to roll along a surface as the robot is maneuvered.

13. The autonomous robot of claim 1, wherein the cleaning assembly comprises a roller brush rotatably mounted adjacent a front edge of the chassis.

14. The autonomous robot of claim 1, wherein the cleaning assembly comprises a side brush mounted so as to extend beyond the chassis.

15. The autonomous robot of claim 1, wherein the autonomous robot further comprises:
a controller in communication with the drive system, the controller configured to maneuver the robot to pivot in place; and
an accelerometer in communication with the controller, the controller configured to control the drive system in response to a signal received from the accelerometer.

16. The autonomous robot of claim 1, wherein the bumper comprises bump sensors responsive to contact between the bumper and an obstacle.

17. The autonomous robot of claim 1, wherein the bumper further comprises bump sensors responsive to relative motion between the bumper and the chassis.

18. The autonomous robot of claim 1, wherein the autonomous robot performs a second obstacle following routine based on detections of the obstacle by the plurality of capacitive sensors, in which the robot backs up and turns in place to deactivate the plurality of capacitive sensors and to place the robot in position to perform an obstacle following arc about the obstacle.

* * * * *